INVENTOR.
FRANK W. HILL

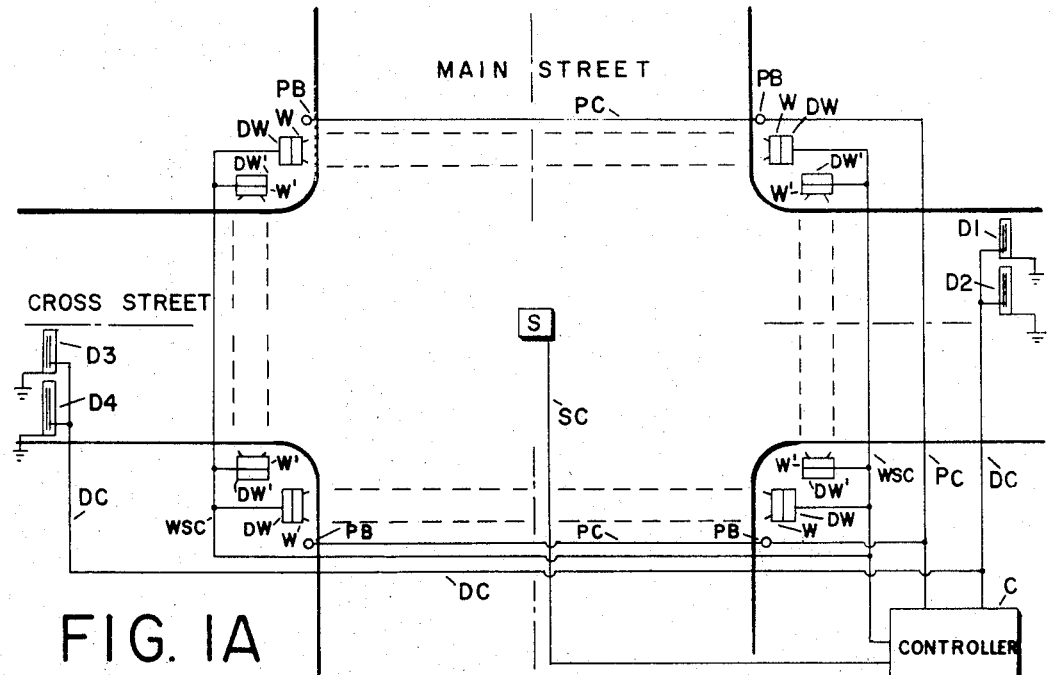
FIG. IA
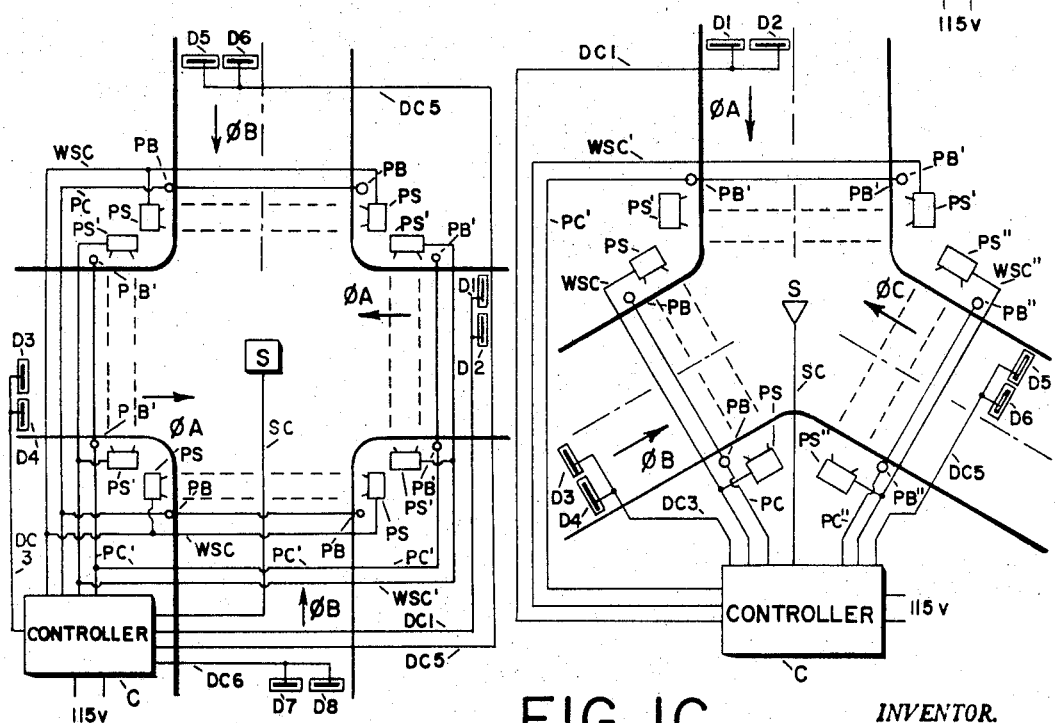
FIG. IB
FIG. IC
INVENTOR.
FRANK W. HILL
BY Williams, Tilberry & Johnk

INVENTOR.
FRANK W. HILL
BY

| 1 | 2 | 3 | 4 | 5 | 6 | 7 | 8 | 9 | 10 | 11 |
|---|---|---|---|---|---|---|---|---|---|---|
| SPECIAL CLEAR- ANCE 2 | MINIMUM AND DENSITY INITIAL | GREEN DWELL | UNIT EXTENSION | VEHICLE CLEAR- ANCE 1 | SPECIAL CLEAR- ANCE 1 | GREEN 2 | GREEN DWELL AND PHASE SELECT | VEHICLE CLEAR- ANCE 2 | RED DWELL 1 | RED DWELL 2 AND OVERLAP CONTROL |
| AMBER | | | | | | | | | | |
| | | MAIN | ST. RED | | | MAIN | ST. | GREEN | | |
| | DON'T | WALK | | | M.S. | WALK | | PED. CL. | | |
| | CROSS | ST. | GREEN | AMBER | | | CROSS | ST. | RED | |
| | C.S. | WALK | | | | DON'T | WALK | | | |
| | | | O P T I O N | | | 1 | | | | |
| | MAIN | ST. | RED | | MAIN | STREET | GREEN | AMBER | | |
| | DON'T | WALK | | | | WALK | 1 | PED. CL. | | |
| | CROSS | STREET | GREEN | AMBER | | | CROSS | ST. | RED | |
| | WALK | 2 | P.C. | | | DON'T | WALK | | | |
| | | | O P T I O N | 2 | | | | | | |

NORMAL GREEN

DELAYED GREEN

ADVANCE GREEN    NORMAL GR.

ADVANCE GREEN    DELAYED GREEN

WALK    DON'T WALK

FIG. 3

INVENTOR.
FRANK W. HILL

INVENTOR.
FRANK W. HILL
BY
Williams, Tilburg & Dirich

Oct. 14, 1969     F. W. HILL     3,473,147
TRAFFIC ACTUATED CONTROL SYSTEM HAVING A CONTROL
UNIT FOR EACH TRAFFIC PHASE
Original Filed Feb. 7, 1961     14 Sheets-Sheet 8

*INVENTOR.*
FRANK W. HILL
BY

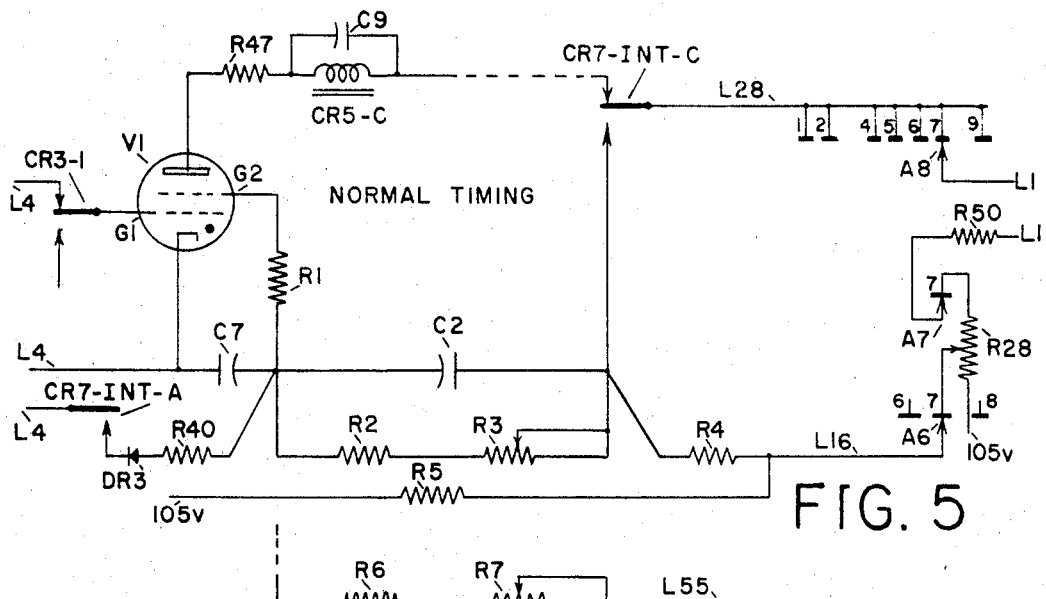
FIG. 5
FIG. 6
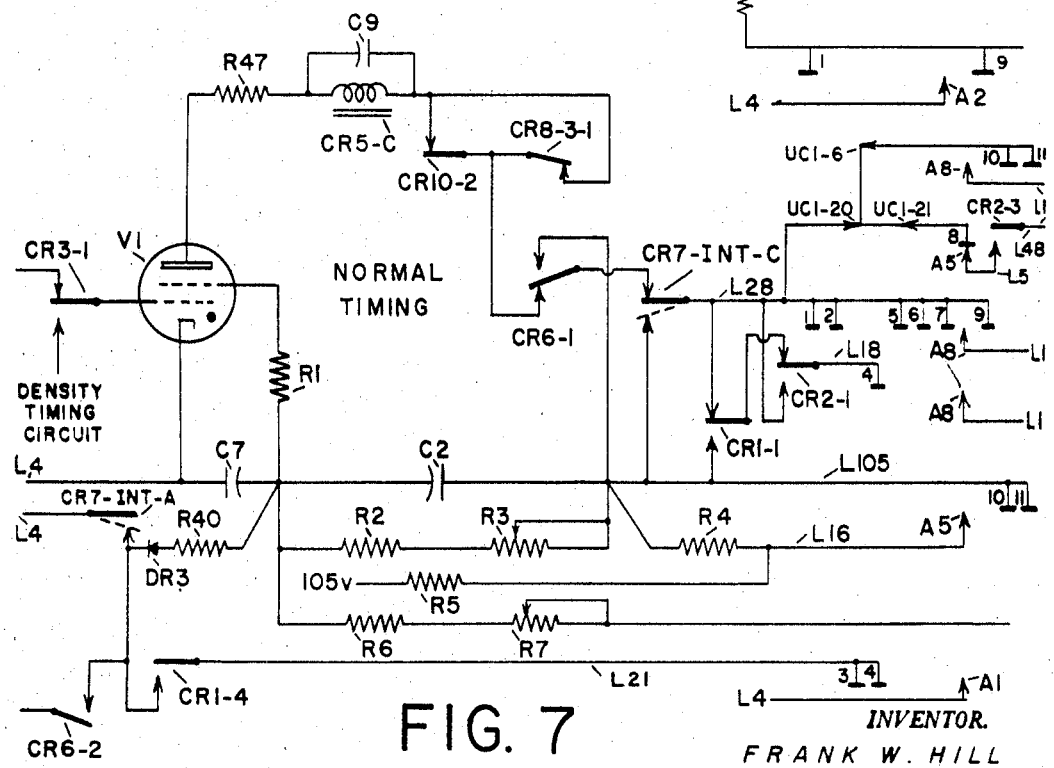
FIG. 7

Oct. 14, 1969   F. W. HILL   3,473,147
TRAFFIC ACTUATED CONTROL SYSTEM HAVING A CONTROL
UNIT FOR EACH TRAFFIC PHASE
Original Filed Feb. 7, 1961   14 Sheets-Sheet 10

INVENTOR.
FRANK W. HILL
BY

INVENTOR.
FRANK W. HILL
BY
Williams, Tilbury & Golick

INVENTOR.
FRANK W. HILL

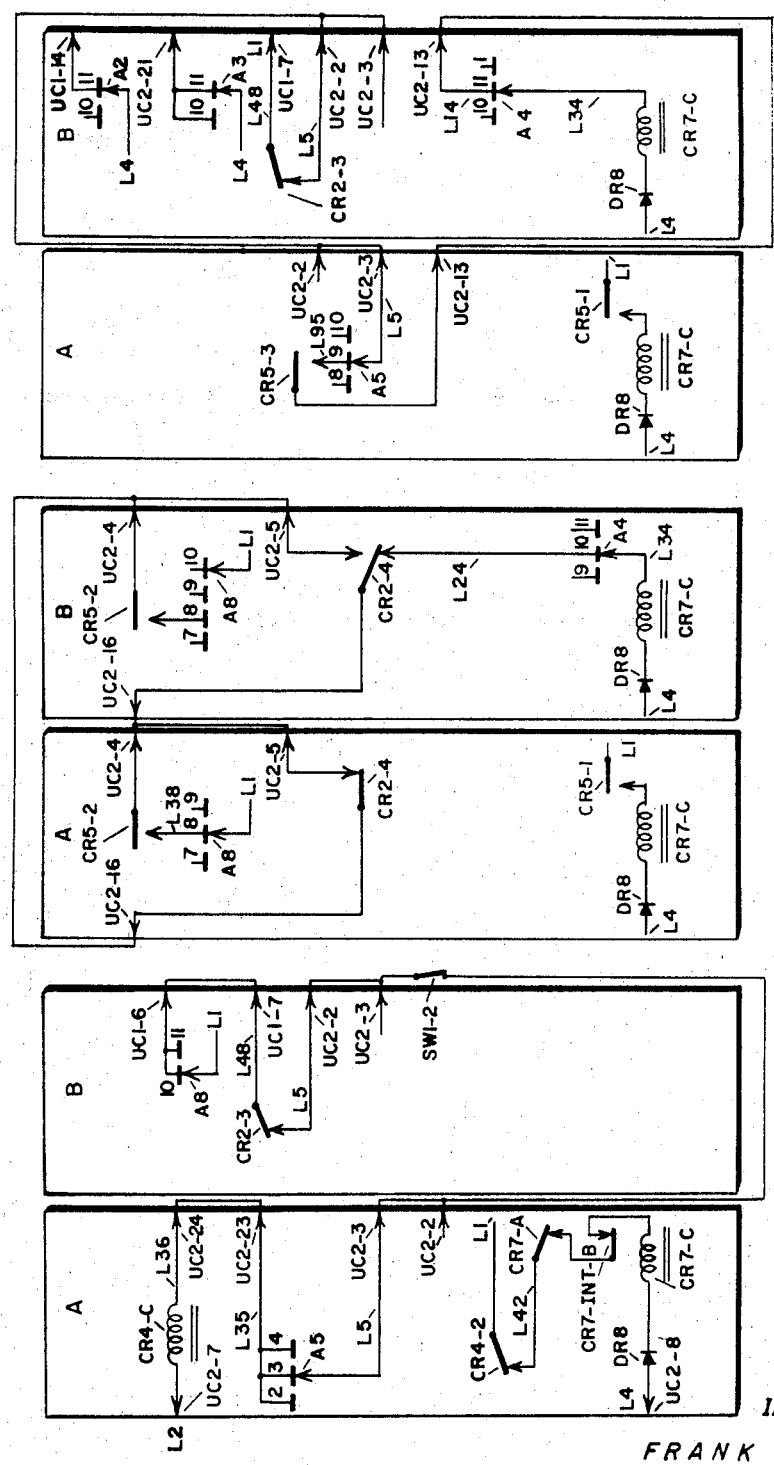

3,473,147
TRAFFIC ACTUATED CONTROL SYSTEM HAVING A CONTROL UNIT FOR EACH TRAFFIC PHASE
Frank W. Hill, Moline, Ill., assignor to E. W. Bliss Company, Canton, Ohio, a corporation of Delaware
Continuation of application Ser. No. 87,708, Feb. 7, 1961.
This application May 21, 1965, Ser. No. 463,449
Int. Cl. G08g 1/01
U.S. Cl. 340—37                                    12 Claims This invention relates to a new local traffic signal controller, and in particular to a unitary timing and control device usable singly or in combination with one or more identical devices to control and time vehicle and pedestrian traffic signals for one or more traffic movements or phases.

This application is a continuing application of my co-pending application entitled "Single Phase Traffic Actuated Unit," Ser. No. 87,708, filed Feb. 7, 1961, and now abandoned.

Heretofore, a number of different types of traffic signal controllers were supplied for use at different types of intersections. For example, a two street intersection having detectors in one of the streets was provided with a two street semi-actuated controller. If a pedestrian movement was desired, a pedestrian controller was interconnected to the vehicle controller. At a three street intersection a three phase controller was supplied. If one or more pedestrian movements were desired, one or more pedestrian timers were interconnected with the three phase controller to provide such control. If a turning movement was desired, a special minor movement controller was necessary.

Accordingly, it is a principal object of the invention to provide a single control unit having a novel circuit arrangement and which may be used in multiple to control vehicle and pedestrian phases at any type of intersection.

Once a control device was designed for a specific need, it was not usable for a different need. It is another object to provide a control unit having a novel circuit and which may be used in multiple as above, or singly, to control and time two vehicle phases and one pedestrian phase at a two street intersection. One vehicle phase is timed after traffic actuation and according to traffic demand, and the other vehicle phase receives the remainder of the time. The pedestrian phase is also timed upon demand.

Prior control devices which were designed for vehicle actuated control were not readily usable with master control devices. Likewise, local controllers responsive to the full range of control by a master controller were not readily convertible to be traffic actuated. It is an object of the invention to provide a control unit usable with a coordinating unit and a timing unit nonresponsive to traffic thereby to provide a semi-actuated, master adjusted controller.

Multiphase controllers in use today have provisions for dwelling with a right of way signal illuminated to one traffic phase and stop signals illuminated to all other phases. In order to divide the functions of a multiphase controller into groups associated with each phase it is necessary that each controlled unit have two dwell conditions, one with a right of way signal energized and one with a stop signal energized.

Another object of the invention is to provide a unitary control device having two dwell conditions, one during which a green signal is energized and one during which a red signal is energized. The two dwell conditions make it possible for one unit to dwell with a right of way signal illuminated to one phase, and all other units to dwell with their stop signals illuminated to all other phases. Thus, each unit may be of equal importance, or of equal dignity. Prior devices made some of the lower volume movements subservient to other movements and were not able to separate the minor movements from the major movements.

As noted above, traffic actuated intersections requiring pedestrain signals also required separate pedestrian timers for each phase. Interconnections had to be made between each pedestrian timer and the intersection controller.

It is an object of the invention to provide novel pedestrian control circuits within the unit for timing walk and clearance signals.

In the past, when special intervals were required for particular intersection configurations it was necessary to use special controllers. It is an object of the present invention to provide a unit with the flexibility to time two right of way periods which may start at the same time and end at different times, start at different times and end at the same time, or start and end at different times. Thus, the unit is able to provide an advance green interval, a normal green period, and a delayed green period and clearance intervals after each as required.

Prior multiphase controllers timed their respective phases in sequence; if a phase had not been traffic actuated and another phase had been actuated, the former phase was timed through rapidly before the desired phase was reached. The signals did not change while the unwanted phase was skipped. It is an object of the present invention to provide a calling circuit which enables an actuated unit to demand right of way from another unit by forcing the other unit to time its clearance intervals and transfer right of way to the actuated unit. A novel feature of the invention is selector circuit closed after an actuated unit has timed its right of way period to permit selection of the next unit to receive right of way.

It is an object of the invention to provide novel dual purpose circuits to reduce the cost and complexity of the invention.

Another object of the invention is to provide a novel timing circuit which limits the duration of the right of way time but which does not interfere with or limit the pedestrian walk and guaranteed clearance times.

Included within this invention are the circuits which enable two or more of the devices to be used as a fully actuated controller for controlling two or more vehicle and pedestrian phase movements.

In accordance with one aspect of the present invention, a traffic control system is provided for controlling at least three phases of traffic flow including a separate control unit for each phase and comprises phase allocating means in each unit for sequentially allocating go dwell, phase selection and stop dwell intervals to its associated traffic phase; phase calling means in at least one unit for developing a phase calling signal representative that traffic intends movement along its associated phase; phase actuating means in at least one other unit responsive to the phase calling signal for developing a phase actuating signal when the allocating means of the same unit is allocating a go dwell interval to its associated traffic phase and each of the other units is allocating a stop dwell interval; cycle actuating means in each unit with the actuating means in the one other unit being responsive to a phase actuating signal developed by the same unit for cycling the allocating means of the same unit to allocate a phase selection interval; means in the one other unit for terminating the phase selection interval; phase selection means in the one other unit for developing a phase selection signal when the phase selection interval of the same unit has terminated; and, phase change over means in the unit having phase calling means and having a normal first condition and a second phase change over condition, the change over means being in its second condition when a phase calling signal is developed by the phase calling means of the same unit; the cycle actuating means in each unit having change over means being responsive when its change over means is in its second condition to a phase selection signal developed by the one other unit to cycle the allocating means of the same unit to allocate its go dwell interval.

In accordance with another aspect of the present invention, a traffic phase control unit is provided which is adapted for use in a traffic control system for controlling at least three phases of traffic flow and includes phase allocating means for sequentially allocating go dwell, phase selection, and stop dwell intervals to its associated traffic phase; phase calling means for developing a phase calling signal when the associated phase is allocated a stop dwell interval representative that traffic intends movement along the associated phase; phase actuating means responsive to a phase calling signal developed by a like unit for developing a phase actuating signal when the allocating means is allocating a go dwell interval to the associated traffic phase; cycle actuating means responsive to the phase actuating signal for cycling the allocating means to allocate a phase selection interval to the associated phase; means for terminating the phase selection interval; phase selection means for developing a phase selection signal when the phase selection interval has terminated; and, phase change over means having a normal first condition and a second phase change over condition when the phase calling signal is developed; the cycle actuating means being responsive when the change over means is in its second condition to a phase selection signal developed by a like unit to cycle the allocating means to allocate a go dwell interval to the associated phase.

To the accomplishment of the foregoing and related ends, said invention, then, consists of the means hereinafter duly described and particularly pointed out in the claims, the annexed drawings and the following description setting forth in detail certain mechanism embodying the invention, such disclosed means constituting, however, but one of the various means in which the principle of the invention may be used.

In said annexed drawings:

FIGURE 1A is a plan view of a typical two street intersection at which a form of the invention may be the sole traffic control device;

FIGURES 1B and 1C are plan views of two and three street fully vehicle and pedestrian actuable intersections whose traffic signals are controlled by units of the invention;

FIGURE 3 is a signal sequence chart showing a number of the signal sequences obtainable with a control unit of the invention;

Figure 4A:
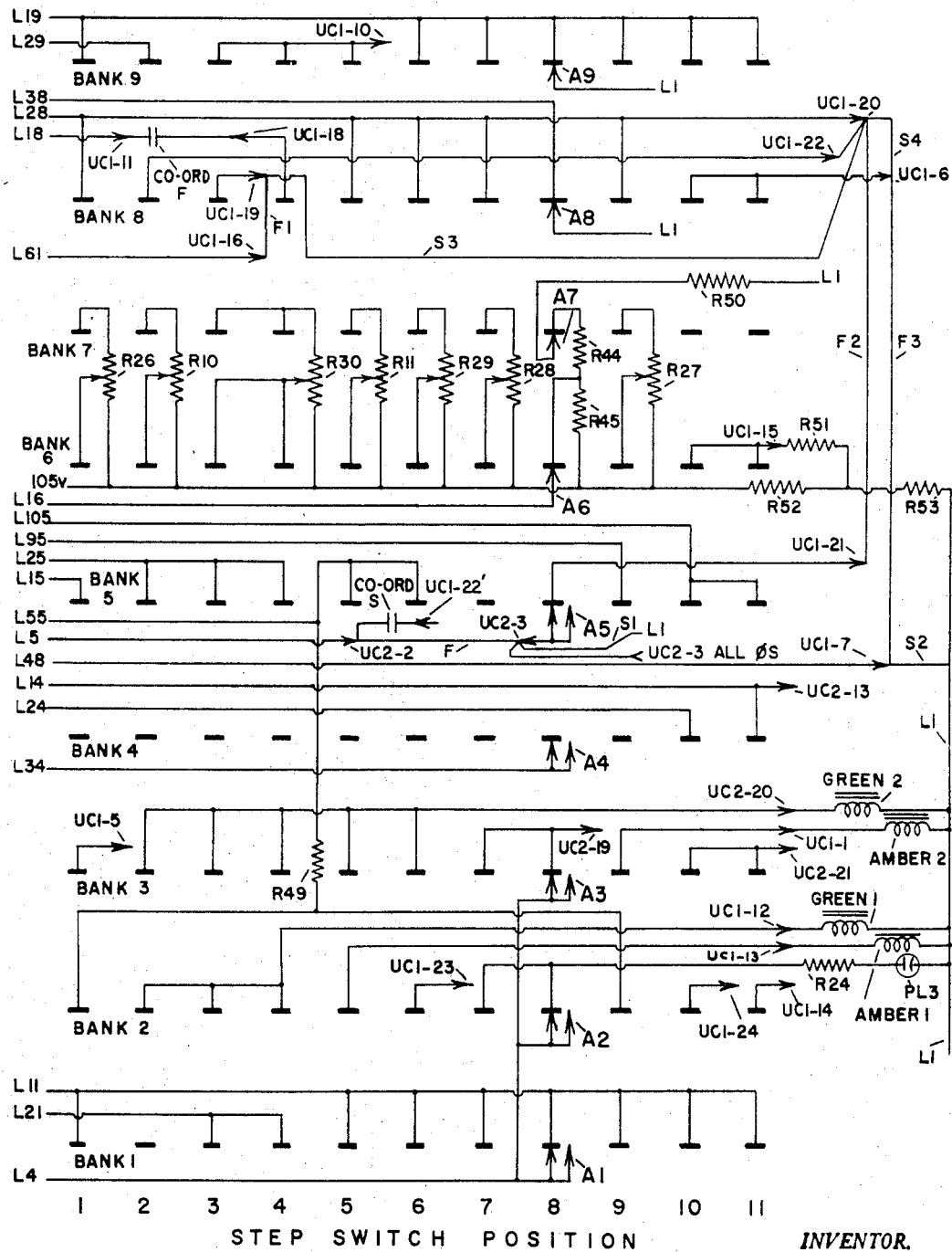
Figure 8:
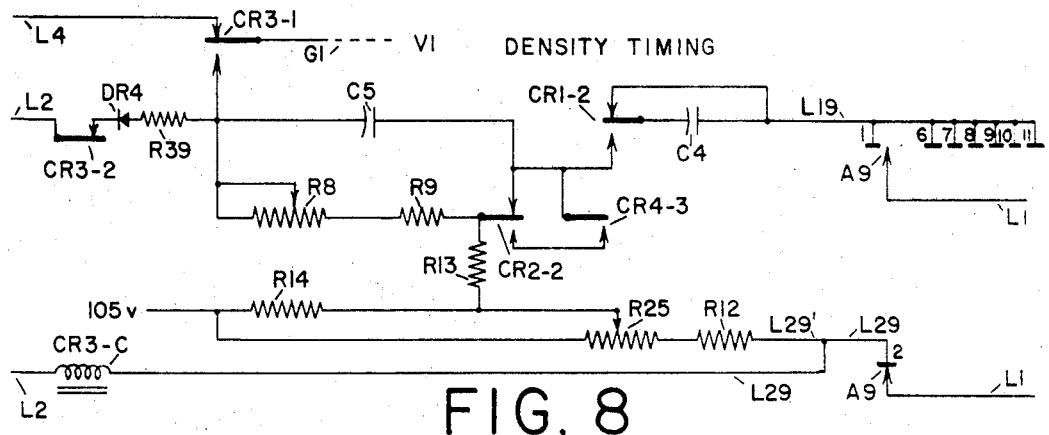
Figure 9:
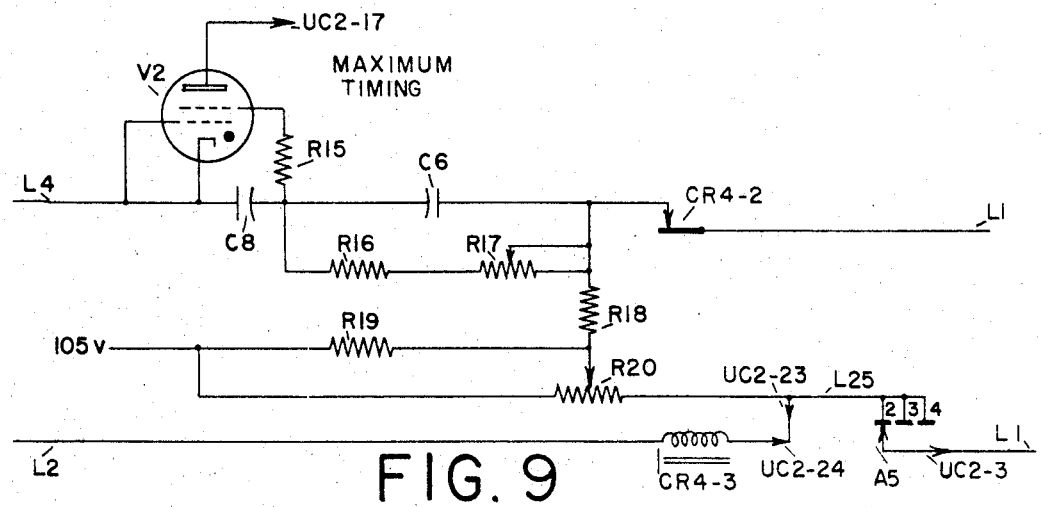
Figure 10:
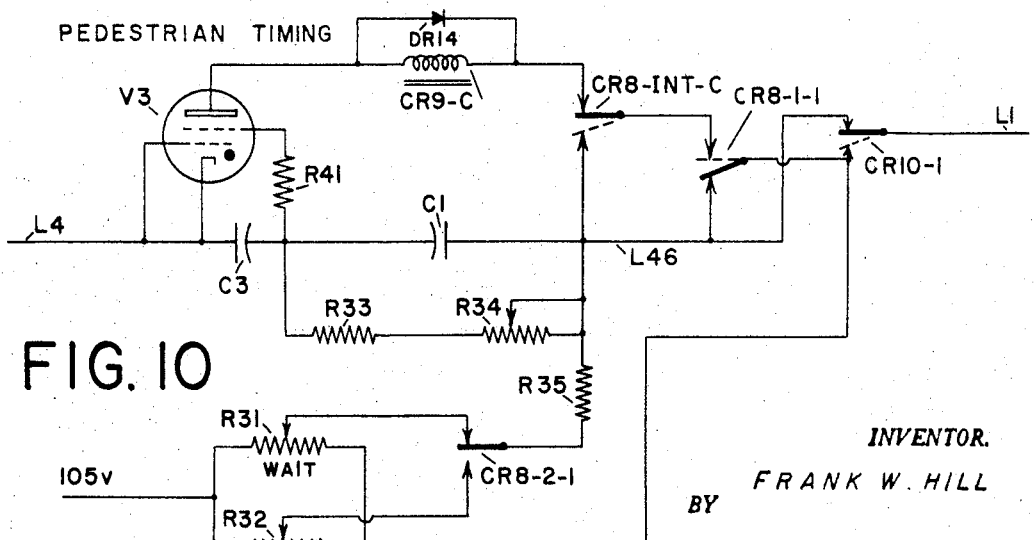
Figure 11:
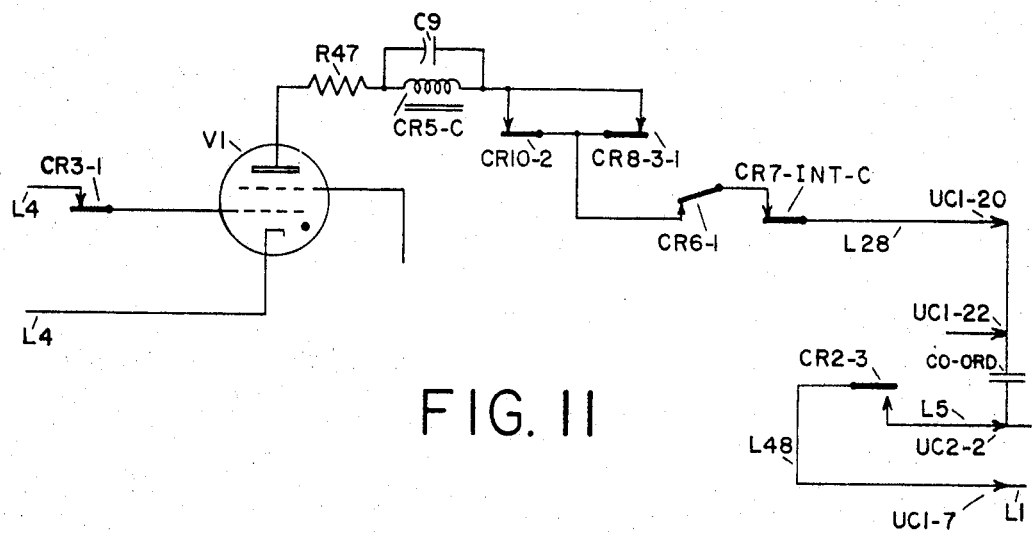
Figure 12:
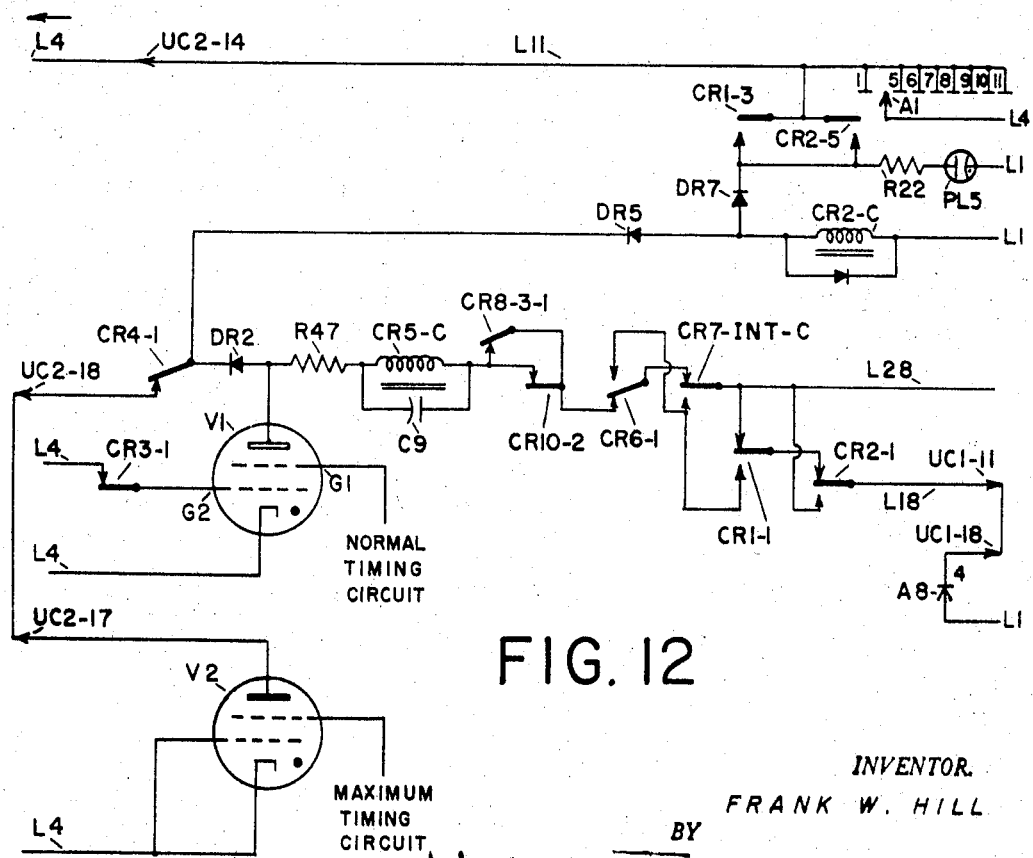
Figure 13:
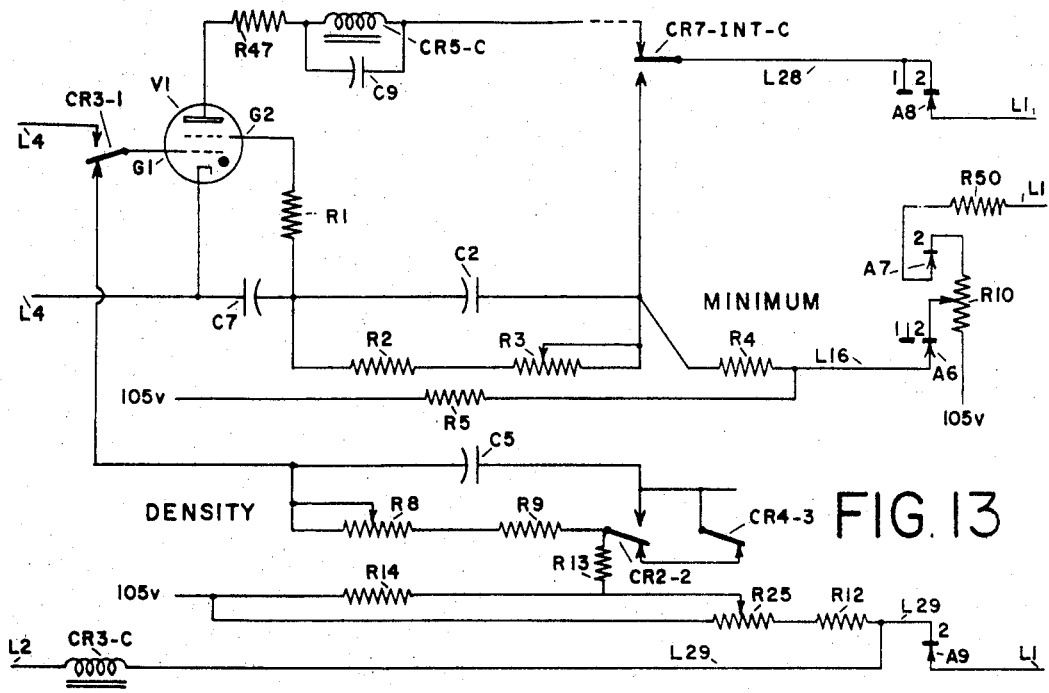
Figure 17:
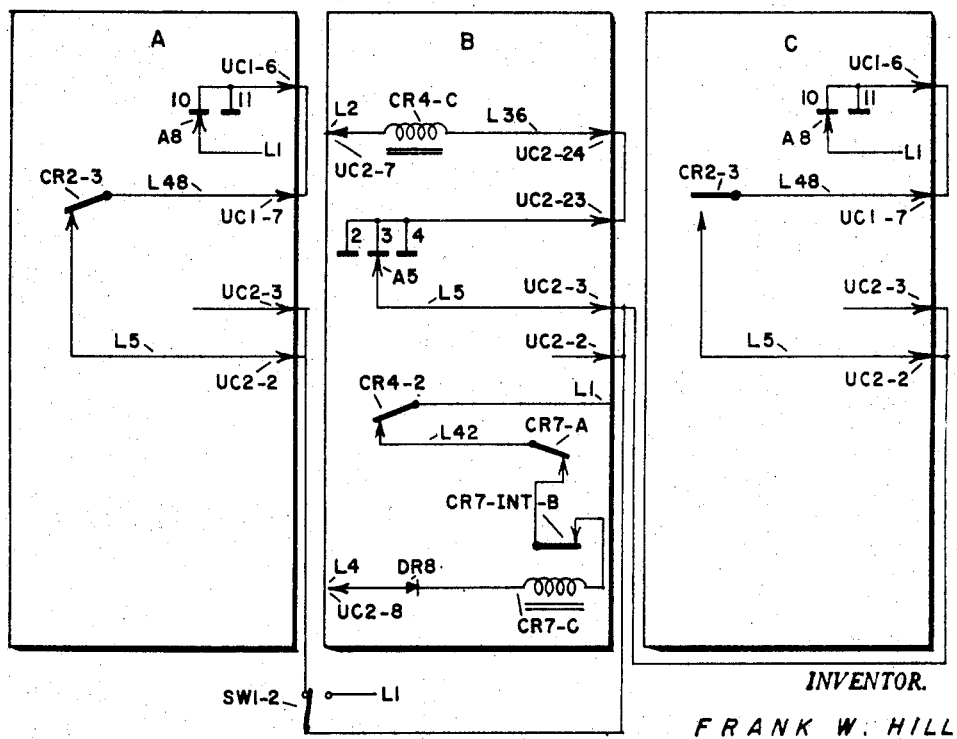
Figure 18:
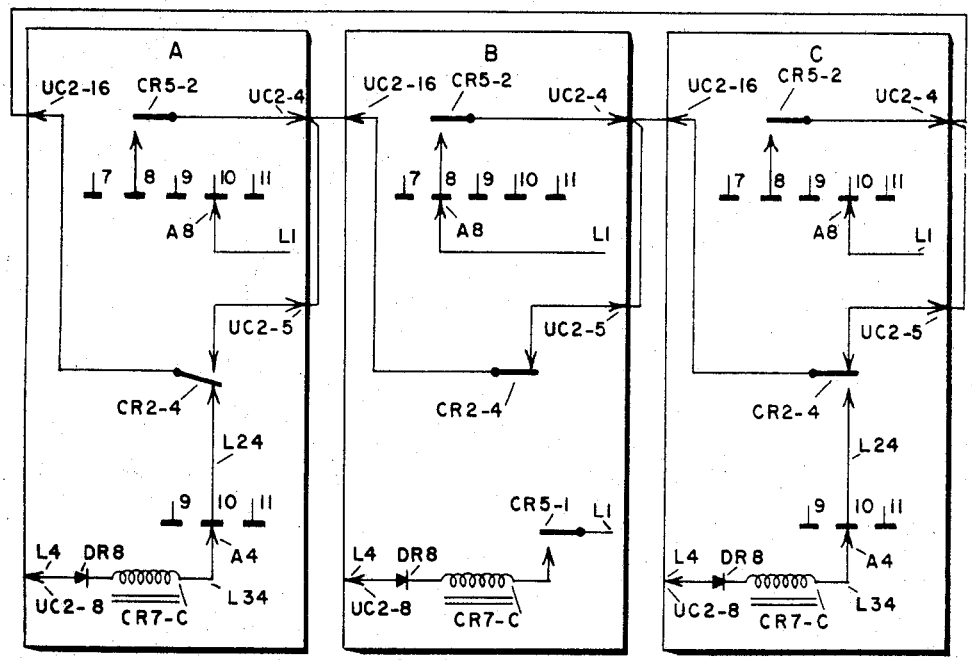
Figure 19:
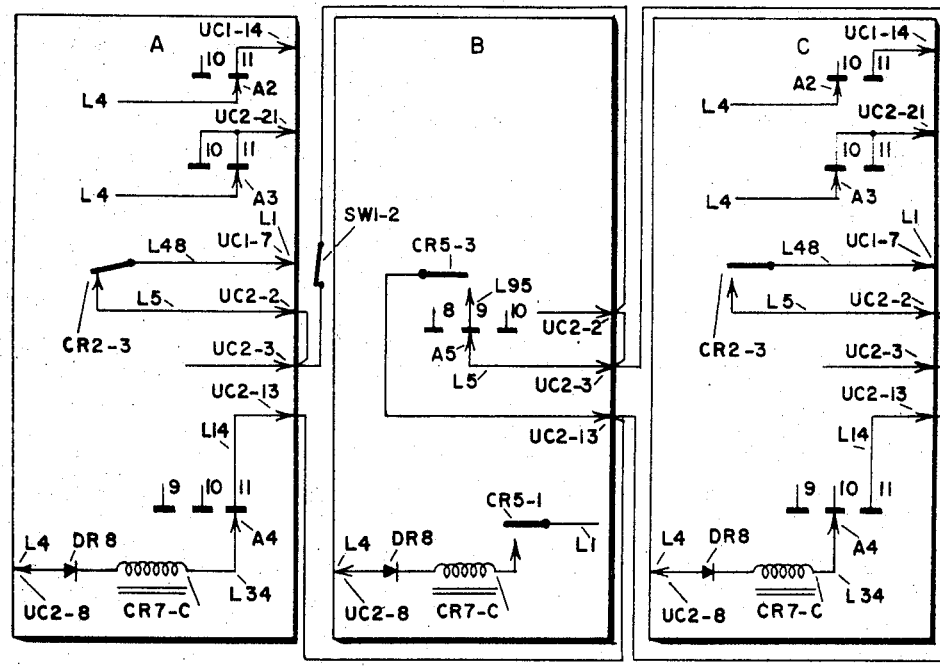

FIGURES 4A–4D, when assembled as shown in FIGURE 4E, constitute a wiring diagram of a preferred form of the control unit;

FIGURE 5 is a simplified line to line wiring diagram of a timing circuit;

FIGURE 6 is a line to line wiring diagram of the additional discharge path provided during short timing intervals;

FIGURE 7 is a line to line wiring diagram of a major portion of the normal timing circuit;

FIGURE 8 is a simplified line to line wiring diagram of the density timing circuit;

FIGURE 9 is a simplified line to line wiring diagram of the maximum timing circuit;

FIGURE 10 is a line to line wiring diagram of the pedestrian timing circuit;

FIGURE 11 is a line to line wiring diagram of one portion of the normal timing plate circuit;

FIGURE 12 is a line to line wiring diagram of the novel circuit including the plate circuit for the combined normal timing and maximum timing circuits;

FIGURE 13 is a diagram of a novel circuit including the density initial and minimum initial timing circuits which together control the conduction of a thyratron;

FIGURE 14 is a diagram of a calling circuit between two units which comprise a two phase fully actuable controller;

FIGURE 15 is a diagram of the phase selecting circuit between two units which comprise a two phase fully actuable controller;

FIGURE 16 is a line to line wiring diagram of the phase overlap control circuit;

FIGURE 17 is a diagram of the calling circuit as employed in a three phase fully actuable controller;

FIGURE 18 is a diagram of the phase selecting circuit in a three phase fully actuable controller;

FIGURE 19 is a diagram of the phase overlap control circuit as employed in a three phase fully actuable controller.

TYPICAL INTERSECTION

FIGURE 1A illustrates one form of intersection whose traffic signals may be controlled by a single actuable unit of the invention employed as a two-phase semi-actuated controller. The wider of the streets is termed the main street and the other street is called the cross street. Traffic actuable detectors D1–D4 are installed in the approach lanes on the cross street and are connected either individually or in parallel to the controller C through the detector cable DC. Traffic signals S are illustrated as being suspended over the intersection but may also be of the type which are installed at the corners of the intersection as has become standard practice. The signals are connected to the controller through a signal cable SC.

The pedestrian crosswalks across all four approaches to the intersection are illustrated by the pairs of parallel dashed lines. Pedestrian signals are illustrated at the ends of each crosswalk and are connected to the controller through the walk signal cable WSC. Each pedestrian signal may be made up of a Walk section and a Don't Walk section. Pedestrian signals for the crosswalks across the main street are labeled W and DW; those for the crosswalks parallel with the main street are labeled W' and DW'. Pedestrian pushbuttons PB are located at the ends of the crosswalks across the main street and are connected to the controller C through cable PC.

Pedestrian signals W and DW are controlled by a pedestrian interval timing circuit within the controller C. Pedestrian signals W' and DW' are connected to be controlled in parallel with the main street right of way movement. Various timing intervals in the controller may be employed for the purpose of timing the cross street walk and clearance intervals. These are illustrated in FIGURE 3, Options 1 and 2.

The signal sequence of Option 1 is most satisfactory for control of a semi-actuated intersection because it provides timed pedestrian clearance intervals for pedestrians crossing both streets. Note that the pedestrian clearance (Don't Walk) signal in the second line is illuminated before the main street amber signal shown in the first line. This provides a guaranteed pedestrian clearance interval not provided by the sequence of Option 2.

The traffic signals S normally dwell with the main street right of way and the cross street stop signal illuminated. The cross street pedestrian signals normally dwell with their Walk W' illuminated and the main street pedestrian signals normally dwell with their Don't Walk message DW illuminated. After operation of one of the pedestrian pushbuttons PB the controller C is actuated and after displaying the caution signals to main street traffic it displays a stop signal to main street traffic and a go signal to cross street traffic and a Walk signal indication on signals W for an adjustable period. Thereafter it displays a Don't Walk message on signals DW for a guaranteed period to permit pedestrians to clear the intersection.

The controller normally dwells in a condition energizing the right of way signals to main street traffic and the stop signals to cross street traffic. The Don't Walk signals DW and the Walk signals W' are normally illuminated. After actuation of one of the detectors D1–D4 the controller C advances to a timing condition and continues to display the Don't Walk signals DW for a fixed time. Thereafter, it times and displays the caution signal to main street traffic, and thence the stop signals to main street traffic and right of way signals to cross street traffic. At the termination of the cross street right of way intervals the cross street caution signals are illuminated, and thereafter the cross street stop signals and the main street right of way signals are illuminated.

If the pedestrian pushbutton has been depressed prior to the beginning of the cross street period the Walk signals W would have illuminated simultaneously with the cross street right of way signals. After a presettable interval the Walk signals W would have been deenergized and the Don't Walk signals DW energized for a presettable time before the cross street caution signals.

While it is apparent that these signal sequences are not altogether new it will be appreciated that the control circuit is novel. The single phase control unit displays its outstanding advantages when employed with one or more like units to control multiphase fully actuated intersections. The controller is illustrated as being employed to control a two street semi-actuated intersection to demonstrate one form of its usefulness.

MULTIPHASE INTERSECTIONS

FIGURE 1B illustrates a two phase fully actuated intersection. The approach lanes on each street contain vehicle actuable detectors, and the pedestrian crosswalks across each street are equipped with pushbuttons and pedestrian signals.

Detectors D1–D4 are located in the approach lanes of one street which may be termed the phase A movement. Pushbuttons PB are located at opposite ends of the crosswalk parallel with the phase A street and are operable to provide pedestrians with protected walk and clearance intervals. Vehicle actuable detectors D5–D8 are located in the approach lanes on the phase B streets. Pushbuttons PB' are located at the ends of the crosswalks parallel with the phase B movement and are operable to provide pedestrians with guaranteed walk and clearance intervals across the phase B movement.

Detectors D1, D2 are connected to the controller C through detector cable DC1; detectors D3, D4 are connected to the controller through cable DC3. Detectors D5, D6 and D7, D8 are connected to the controller C through cables DC5 and DC6, respectively. Pushbuttons PB are connected to the controller through cable PC, and pushbuttons PB' are connected through cable PC'.

Traffic signals S for all vehicle movements at the intersection are connected to the controller through the signal cable SC. Pedestrian signals PS which direct the pedestrian movement parallel with the phase A movement are connected to the controller through cable WSC. Pedestrian signals PS' which direct the pedestrian movement parallel with the phase B movement are connected to the controller through cable WSC'.

Figure 2A:
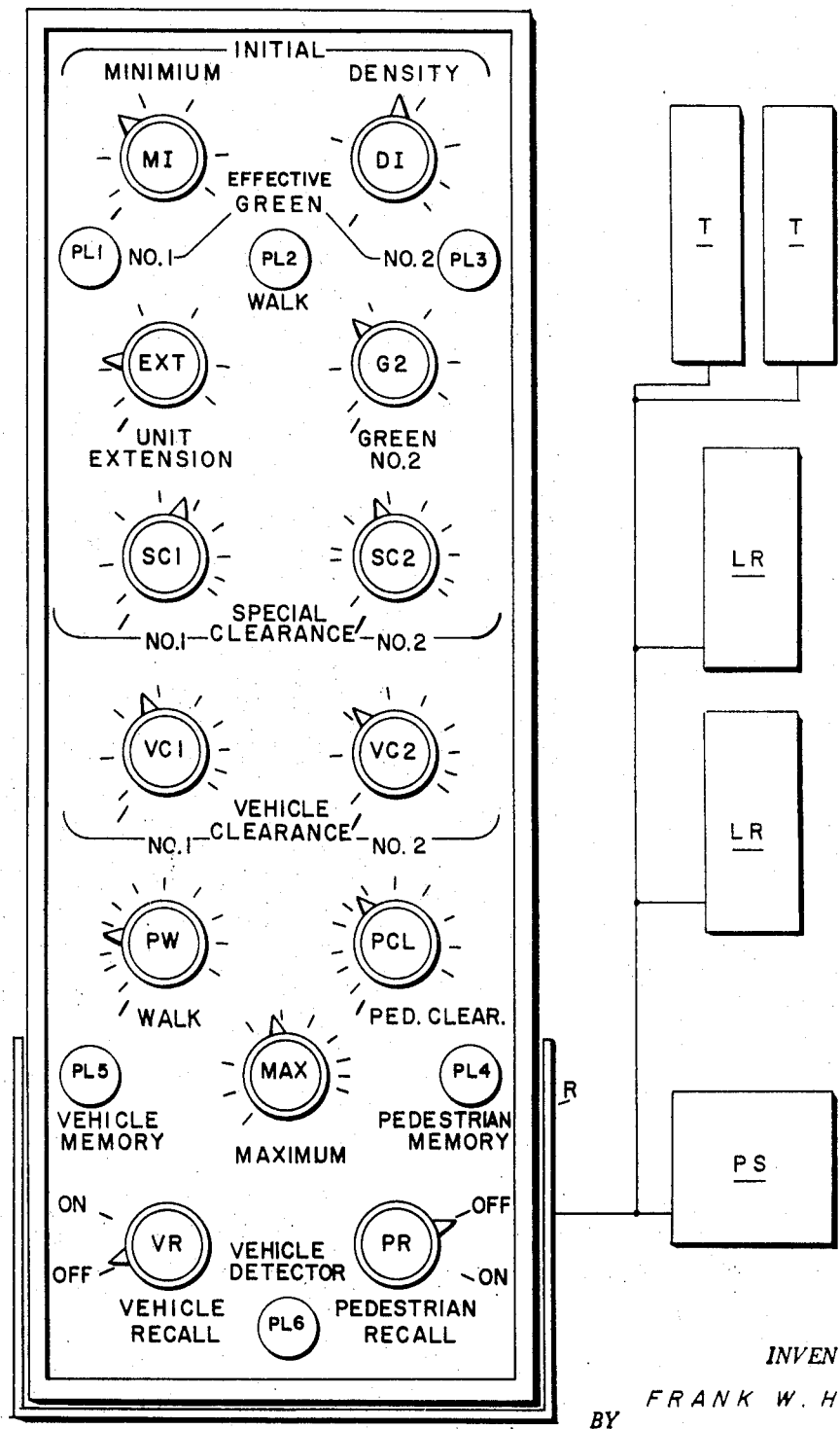
FIGURE 2A is a front view of a preferred form of the invention as embodied in a control rack.
Figure 2B:
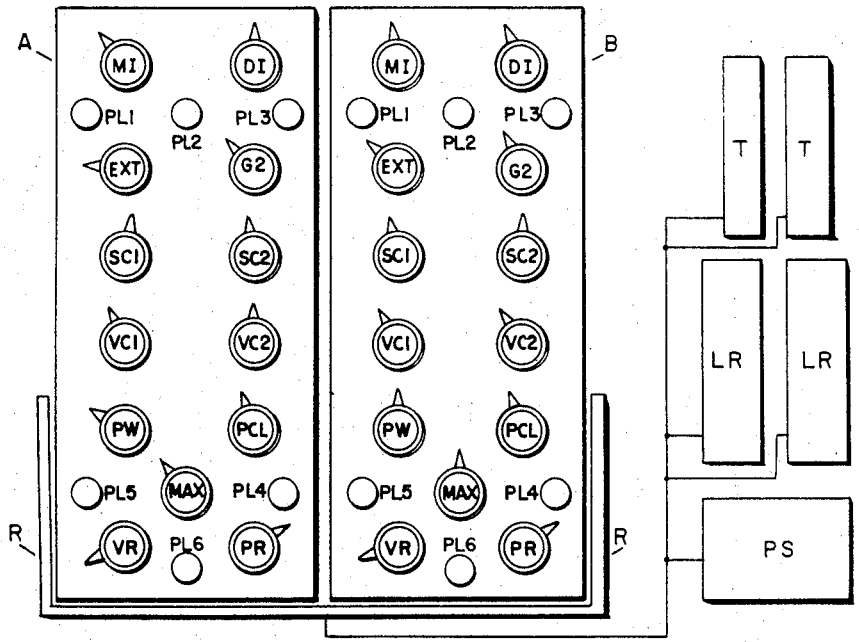
FIGURES 2B and 2C are front views of preferred forms of the invention as embodied in two and three phase controllers.

The controller C is comprised of two vehicle and pedestrian actuable units as shown in FIGURE 2B and includes other circuit controlling apparatus including load relays, power supply, and terminal facilities. The controller is connected to a source of suitable line voltage, as for example 115 volts AC.

Since each of the phases A and B are fully traffic actuated the signal sequence for each phase may be as shown in the lower five lines of FIGURE 3. That is, all eleven intervals provided by each control unit are usable on a single phase. This is one of the advantages of using two actuable units. When only a single unit is employed only semi-actuation is obtainable and the eleven intervals must be divided between the two streets.

FIGURE 1C illustrates a three phase fully actuated intersection. Traffic actuable detectors are located in the approach lanes on each street and pedestrian operable pushbuttons are located at the ends of the crosswalk across each street. The rectangle C represents a three phase fully actuated controller comprised of three of the units of the present invention and may be of the configuration shown in FIGURE 2C. Vehicle actuable detectors D1, D2 are located in the phase A approach lanes; detectors D3, D4 are associated with the phase B movement, and detectors D5, D6 are associated with the phase C movement. Pushbuttons PB', PB, and PB'' are associated with the crosswalks across the phase A, phase B, and phase C movements, respectively.

Detectors D1, D2 are connected to the controller C through detector cable DC1; detectors D3, D4 are connected through cable DC3, and detectors D5, D6 are connected through cable DC5. Pushbuttons PB are connected to the controller through cable PC; pushbuttons PB' are connected through cable PC', and pushbuttons PB'' are connected through cable PC''. The Walk and Don't Walk signals PS for the pedestrian movement across phase B are connected to the controller through cable WSC; pedestrian signals PS' are connected to the controller through cable WSC', and pedestrian signals PC'' are connected to the controller through cable WSC''. Traffic signals S may be located at the center of the intersection and are connected to the controller through signal cable SC.

Figure 2C:
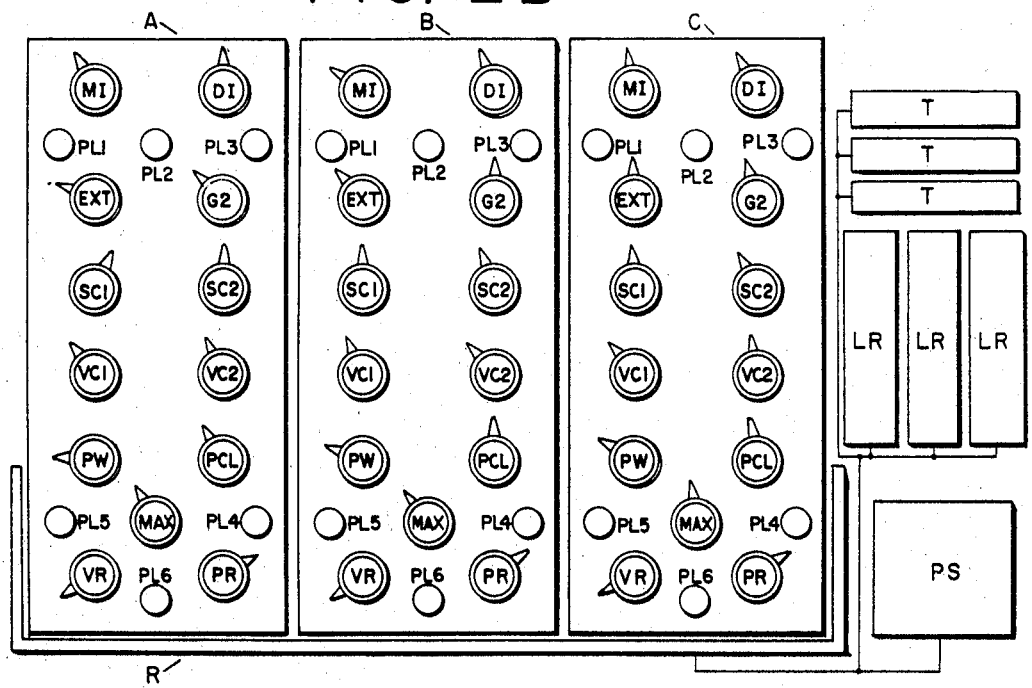

The controller represented by the rectangle C may be the type illustrated in FIGURE 2C and includes three vehicle and pedestrian actuable units of a preferred form described herein. The controller also includes a power supply, terminal facilities, and load relays. The controller is connected to a source of suitable line voltage, as for example 115 volts AC.

Each of the above multiphase movements will be described in greater detail hereinafter.

SEMI-ACTUATED CONTROLLER

A preferred form of the invention is shown in FIGURE 2A. A front view of the control unit is illustrated. The unit rests in or on a rack R and serves to control the load relays illustrated by the rectangles LR. The other terminal facilities T are symbolized by the rectangles labeled T. The power supply is shown at PS. The unit may be employed to control all of the signals at an intersection of the type illustrated in FIGURE 1A.

Mounted on the face of the control unit are eleven interval controlling dials, two recall switches, and six pilot lights. The purpose of each of the internal controlling dials is described hereinafter. The nomenclature for the dials and pilot lights is given in Tables I and II, respectively.

TABLE I.—TIMING INTERVALS CONTROLLED BY DIALS

| Dial symbol | Dial nomenclature | Interval | Step switch position |
|---|---|---|---|
| MI | Minimum initial | Minimum initial | 2 |
| DI | Density initial | Density initial | 2 |
| EXT | Unit extension | Unit extension | 4 |
| VC1 | Vehicle clearance 1 | Amber 1 | 5 |
| SC1 | Special clearance 1 | All red clearance 1 | 6 |
| G2 | Green 2 | Delayed green | 7 |
| VC2 | Vehicle clearance 2 | Delayed amber | 9 |
| SC2 | Special clearance 2 | Advance green or All red clearance | 1 |
| MAX | Maximum | Maximum | 2,3,4 |
| PW | Pedestrian walk | Walk | 2,3,4 |
| PCL | Pedestrian clearance | Don't walk | 4 |

Table I shows the name of the dial, the symbol for the dial, the interval timed by the dial, and the position of the step switch during the interval. The table may be compared with the color sequence chart of FIGURE 3 to correlate the signal sequence with the interval nomenclature. It will be noted that each of the dials controls the timing of one interval which normally corresponds to one step switch position. A particular signal may be energized during a number of intervals or step switch positions. The Green 2 dial, for example, determines the duration of the Green 2 interval, step switch position 7, which in turn determines the delayed green period, shown in FIGURE 3 at the fourth line from the bottom of the chart.

The maximum dial is effective during step switch positions 2, 3, and 4 which correspond to the minimum and density initial interval, the green dwell interval, and the unit extension interval. Dwell intervals which occur during step switch positions 3, 8, 10, and 11 are not shown in Table I because no dial is required to adjust their timing.

It will be noted that the walk interval may time during step switch positions 2, 3, and 4. The walk dial PW is normally set to provide a walk interval of a few seconds duration. The walk timer will therefore normally time out during interval 4, as illustrated in FIGURE 3, bottom line. The pedestrian clearance interval will normally start to time during interval 4.

The purpose for each of the six pilot lights is given in Table II below.

TABLE II

| Symbol | Pilot light nomenclature interval | Step switch positions |
|---|---|---|
| PL1 | Effective green 1 | 2, 3, 4 |
| PL2 | Walk | 2, 3, 4 |
| PL3 | Effective green 2 | 7, 8 |
| PL4 | Pedestrian memory | |
| PL5 | Vehicle memory | |
| PL6 | Vehicle detector | |

Pilot light PL1 is energized during step switch position 2, 3, and 4, which correspond to the Effective Green 1 period. Pilot light PL3 is energized during the Effective Green 2 interval which utilizes step switch positions 7 and 8 and is normally termed the Delayed Green interval. The Walk pilot light PL2 is illuminated during the Walk interval and is extinguished during the guaranteed pedestrian clearance interval and the remainder of the cycle. Pilot PL4 indicates that a pedestrian call has been placed by actuation of pushbutton PB. Likewise, pilot light PL5 is energized when the vehicle detector memory relay is energized and remains energized to indicate that a vehicle has actuated the detector and that the cross street green interval has not yet started. Pilot light PL6 is illuminated by and during each vehicle detector actuation to indicate the rate of detector actuation.

Two switches are provided on the face of the unit. Switch VR is a vehicle recall switch which simulates a call from the cross street detectors and calls the controller to the cross street for at least a minimum interval each cycle. The switch does not simulate a continuous call; its circuit is opened during the unit extension interval to prevent a maximum cross street interval each cycle. Detector actuations are able to extend the density initial interval and the unit extension interval. The switch does not bring in the Walk interval each cycle; the Walk interval is inserted upon demand evidenced by operation of pushbutton PB.

A pedestrian recall switch PR is provided to enter a pedestrian call by simulating a pushbutton actuation. When the switch is in the On position, a pedestrian sequence is inserted once each cycle. This is advantageous at an intersection having a large volume of pedestrian traffic and permits pedestrian movement each cycle.

The nomenclature of the dials shown in Table I is normally employed when the control unit is used to control a single vehicular and pedestrian phase movement. Therefore, the nomenclature may not apply exactly when the control unit is employed to control two phases at an intersection as shown in FIGURE 1A. It is obvious that many of the intervals normally employed to provide timing for the movements on a single phase must be employed in a different manner when it is desired to control two phases of traffic with a single unit. The manner in which this extra phase movement is obtained is described hereinafter.

TWO PHASE FULLY ACTUATED CONTROLLER

A preferred form of the invention employed to control all of the signals at an intersection of the type shown in FIGURE 1B is illustrated in FIGURE 2B. Two of the phase control units are mounted in a rack R and connected to a power supply PS and load relays LR and terminal facilities T. Control unit A is connected through the load relays and terminal facilities to control the signals associated with the phase A vehicle and pedestrian movements. Control unit B is also connected through such load relays and terminal facilities to control the signals for the phase B vehicle and pedestrian movements.

Each of the control units is identical and interchangeable.

The signal sequences obtainable from each of the units A and B are as shown in FIGURE 3. The sequences shown in the lower five lines of the figure are of the type desired at a fully actuated intersection. As shown in FIGURE 3, each of the units provides eleven intervals of control; a total two phase cycle may include twenty-two intervals or step switch positions. It is apparent that the simple intersection shown in FIGURE 2B would not require or use all of these types of signal sequences, but they are available to make the unit compatible with all types of intersection configurations. Figures illustrating a portion of the circuits interconnecting the two controllers A and B are shown in FIGURES 14, 15 and 16.

THREE PHASE FULLY ACTUATED CONTROLLER

Three of the control units A, B, and C are illustrated in FIGURE 2C in a form of the invention as employed at a three phase intersection of the type illustrated in FIGURE 1C.

Unit A in the left hand position of rack R may control all of the signals with the phase A movement; unit B in the center position may control all of the signals associated with the phase B movement; unit C in the right hand position may control all the signals associated with the phase C movement. Control of the vehicle and pedestrian signals is made through load relays LR and terminal facilities T. Power is derived from power supply PS which is also connected to a suitable supply potential.

Each of the control units A, B, and C is identical and may be arranged in any position in the rack. The internal circuits in units A, B, and C are illustrated in the remaining drawings and are described fully hereinafter. The circuits embodied in and particular to a three phase controller are shown in FIGURES 17, 18 and 19.

SIGNAL SEQUENCES

Various of the signal sequences have been discussed above. They will be described more fully with reference to FIGURE 3. The numerals in the line at the top of the chart indicate the position of the step switch during the timing of the respective intervals. The titles at the heads of the columns indicate the name of the interval as it is normally used when the unit is part of a fully actuated controller.

The upper portion of the figure consists of a color sequence chart illustrating the preferred sequence of signals usable at a two street semi-actuated intersection having two vehicle and two pedestrian phases. The center portion of the chart illustrates a less preferred sequence usable at a two street intersection with the pedestrian walk signals parallel with the main street timed simultaneously with the main street right of way signals. The lower portion of the chart illustrates the signal sequences obtainable when the unit is employed as part of a fully actuated controller.

It will be understood that other signal sequences may be obtained by connecting the load relays in different manners or by adding additional load relays to accommodate different signal sequences.

In the color sequence chart a right of way period is indicated by a single horizontal line; a clearance interval is indicated by a cross hatched area, and the remaining stop period is indicated by double horizontal lines. The walk intervals are indicated by a single horizontal line and the pedestrian clearance intervals and Don't Walk intervals are indicated by double horizontal lines.

The signal sequence designated Option 1 is considered to be superior to the sequence designated Option 2. Option 1 provides independently adjustable Walk intervals and guaranteed pedestrian clearance intervals for the cross walks across both the main street and the cross street. Option 2 times the walk and clearance signals for the crosswalks across the main street simultaneously with the main street right of way signals and does not provide a guaranteed pedestrian clearance interval for pedestrian traffic attempting to cross the cross street. The main street amber signal is energized in interval 9 at the same time the pedestrian clearance signal is energized; the duration of the latter signal is therefore determined by the vehicle clearance signal and may not be adequate to ensure safe passage of the pedestrians.

However, with Option 1 it is necessary to time the main street amber signal during the Special Clearance 2 interval which in normal operation is reserved for the Advance Green signal. See sequence at bottom of FIGURE 3. In normal operation the main street amber signal is timed during the Vehicle Clearance 1 or 2 intervals. Most of the description of the control unit given hereinafter is in terms of the standard designation of the intervals. Since the sequence of Option 2 conforms more closely to the standard designation of the intervals, the description is given in terms of Option 2.

CYCLE OF OPERATION, OPTION 1

When the controller is used as a semi-actuated device to control signals at an intersection as shown in FIGURE 1A, the unit normally dwells in its green dwell interval, step switch position 8. The main street green signals are illuminated as are the walk signals W' parallel with main street. When a vehicle actuates one of the detectors D1–D4 or a pedestrian presses one of the pushbuttons PB, the controller is actuated. If the controller is not coordinated with another controller or if it can leave the main street right of way period without disrupting traffic on the main street it leaves its dwell position and advances to the vehicle clearance 2 interval, step switch position 9. The pedestrian clearance interval is timed during this step switch position. At its termination the controller advances rapidly through the red dwell 1 and red dwell 2 intervals, step switch positions 10 and 11, and arrives at the special clearance 2 interval, step switch position 1, where it times the main street amber signal.

At the expiration of the main street amber interval, the controller advances to step switch position 2, where the minimum initial interval and the density initial interval are timed concurrently. The duration of the density initial interval is determined by the number of actuations which occurred on the cross street during the cross street red period. The minimum initial interval is set to provide time to permit a single vehicle to clear the intersection and is provided so that the density initial interval may be set only long enough to accommodate a moving vehicle. This is shorter than would be required to accommodate a vehicle stopped at the intersection.

The controller advances rapidly through the green dwell interval, step switch position 3, and arrives at the unit extension interval which may be extended a presettable time for each vehicle actuating the cross street detectors during this interval. During step switch positions 2, 3, and 4, the cross street green signals are illuminated.

The main street walk signals W are illuminated only if a pedestrian actuation has occured. At the expiration of the walk interval as timed by the special pedestrian timer in the control unit, the walk signals W are extinguished and the Don't Walk signals DW are illuminated for a presettable time. This setting is determined by the amount of time a pedestrian requires to cross the intersection after stepping off the curb at the last moment of the walk interval. At the expiration of the pedestrian guaranteed clearance interval the pedestrian signals do not change; the Don't Walk signals DW continue to be illuminated.

When all of the detector actuations have been answered, or at the expiration of the cross street maximum time, the unit is forced to the vehicle clearance 1 interval, step switch position 5, and the cross street amber signals are illuminated. At the expiration of this interval the controller advances to its special clearance 1 interval, step switch position 6, during which time the main street green signals and the cross street red signals are illuminated. This interval may be employed optionally as an all red clearance interval with the main street green signals not being illuminated until the Green 2 interval, step switch position 7.

The minimum main street green interval is timed during the Green 2 interval. It is normally set sufficiently long to provide adequate time for main street traffic between periods of cross street traffic. At the end of the minimum main street interval the controller advances to the green dwell interval, step switch position 8, where it rests until another actuation occurs on the cross street. The controller thus cannot move rapidly to the cross street portion of the cycle until the minimum main street green period is timed. This prevents cross street traffic from monopolizing the intersection. A vehicle memory circuit and a pedestrian memory circuit are provided to remember vehicle and pedestrian calls during the main street green and caution periods after which the controller answers such calls.

FULLY ACTUATED SIGNAL SEQUENCES

The lower portion of FIGURE 3 illustrates a number of optional signal sequences obtainable from the control unit when it is employed as a single phase unit with one or more other such units at a fully actuated intersection. The first sequence indicates a normal green period which includes the minimum and density initial intervals, the green dwell interval, and the unit extension interval, step switch positions 2, 3, and 4, respectively. At a fully actuated intersection the control unit having right of way dwells in its green dwell interval, step switch position 3, until an actuation occurs on another phase. After an actuation on another phase the subject unit advances to its unit extension interval during which time it is able to retain right of way on the subject phase with continuing detector actuations but only until its maximum timer times out. After the maximum timer times out the unit is forced to relinquish right of way to the unit which has been traffic actuated. If the tie between actuations exceeds the duration of the unit extension interval, right of way is relinquished to the other phase.

The second sequence in the lower portion of FIGURE 3 illustrates a delayed green period which times in parallel with the normal green period except that it continues for a time after the normal green period to permit traffic to move across a wide or divided intersection.

The third sequence illustrates an advance green interval ahead of the normal green period. This advance green interval may be employed to permit turning movements ahead of the normal green period. The interval may instead be used to time an all red clearing interval.

The fourth sequence indicates both an advance green interval and a delayed green period on the same signal. This signal would be energized prior to the normal green signal to permit turning movements and also would time beyond the normal green signal to permit traffic to clear a wide or divider intersection.

The fifth sequence consists of the walk sequence for the unit when it is employed as a single phase control unit. The walk interval commences with the minimum and density initial interval and times through that interval and into the green dwell interval. When the pedestrian timer in the control unit completes timing the walk interval the Walk signal is extinguished and the Don't Walk signal is illuminated for a guaranteed time before right of way is relinquished on the subject phase and awarded to another phase. This prevents turning movements from another phase from interfering with the pedestrian movement while the latter is being completed. The Don't Walk signal is illuminated for a guaranteed period prior to the relinquishing of right of way by the present phase, the guaranteed clearance interval being timed by the pedestrian timer within the subject unit.

Table III below illustrates the sequence of intervals normally timed by the phase unit when it is part of a fully actuated controller. The step switch position is shown in the left hand column and the symbol for the timing dial is shown in the right hand column. The timing dials are shown on the face of the unit in FIGURE 2A.

TABLE III

| Step switch position | Interval | timing dial |
| --- | --- | --- |
| 1 | Advance green interval for left turns or all red clearance interval to all directions. | SC2 |
| 2 | Minimum initial interval | MI |
|  | Density initial interval proportional to number of vehicles stopped during the prior red signal. | DI |
| 3 | Green dwell. For fully actuated controller. |  |
| 4 | Unit extension interval for each actuation on this phase during this interval following an actuation on another phase. Up to the maximum interval. | EXT |
| 2, 3, 4 | Maximum interval. Starts with an actuation on another phase in a fully actuated controller. In a semi-actuated controller, starts at beginning of interval 2. | MAX |
| 5 | Vehicle clearance 1 interval. Amber signal following the normal right of way period. | VC1 |
| 6 | Special clearance 1 interval All red clearance, if required. | SC1 |
| 7 | Green 2 interval. Delayed green for a wide intersection. | G2 |
| 8 | Green dwell and phase select interval. Permits failsafe operation after momentary power failure, and aids in selection of next unit to obtain right of way. |  |
| 9 | Vehicle clearance 2 interval. Amber signal following the delayed green period. | VC2 |
| 10 | Red dwell 1. Normally dwells in this interval until an actuation occurs on this phase. |  |
| 11 | Red dwell 2 and phase overlap control, determines proper overlapping phase amber signal. |  |
| 2A | Pedestrian walk interval. Starts concurrently with the normal right of way period. | PW |
| 4A | Pedestrian guaranteed clearance interval. Must be completed before the vehicle clearance interval may start. | PCL |

Some of the intervals named in Table III above may be eliminated entirely when not desired by turning their potentiometer dial down to the index mark. The index marks are shown in FIGURE 2 below the lowest number in the timing scale adjacent each timing dial. Turning the dial to the index mark substantially eliminates the interval. The step switch advances rapidly through an interval of very short duration. The load relay normally required for such interval is also eliminated to prevent signal light flicker during the substantially eliminated interval. A finite period is required for the interval to insure proper operation of the step switch; too short an interval, as would be obtained if the dial were turned fully counterclockwise, may result in malfunction of the circuit. Therefore, the index mark is supplied to insure proper operation.

A resistor is also provided in the circuit in series with the short timing end of the potentiometer to provide a finite duration to the interval in case the dial is turned down past the index mark.

CONTROL UNIT CIRCUITS

The circuits within the traffic actuable timing and control units illustrated in FIGURES 2A, 2B, and 2C are shown in FIGURES 4A–4D. The figures may be placed together as shown in the small diagram 4E to form a composite circuit diagram.

In its broad aspects, the unit comprises phase allocating means, such as a multiposition multibank step switch, and a number of phase terminating and timing means, such as timing circuits for controlling and timing the step switch through its various intervals. There are four major timing circuits in the unit; the normal timing circuit, the maximum timing circuit, the density timing circuit, and the pedestrian timing circuit.

The normal timing circuit is effective during step switch positions 1, 2, and 4–9. The maximum timing circuit is effective during intervals 2, 3, and 4. The density timing circuit is effective during interval 2. The pedestrian timing circuit is a separate circuit and has its own small step switch which is able to time during step switch positions 2, 3, and 4. Step switch positions 10 and 11 are timed by another unit when the device is used as part of a fully actuated controller. When used by itself, the step switch is advanced through intervals 3, 10, and 11 rapidly by fixed timing circuits within the unit.

Each of the timing circuits includes an electronic control device, such as a gas-filled tetrode, having a plate circuit and plate circuit relay, a screen grid, and a control grid and grid voltage control circuit. The grid control circuit consists of a timing capacitor which is charged during the short time between step switch intervals and which slowly discharges through a normal timing path. During each step switch position a different reducing potential is applied to the timing capacitor to reduce its apparent potential and cause it to permit the tube to conduct at the expiration of the interval. The different reducing potentials are obtained from a number of potentiometers whose adjusting knobs are shown on the face of the unit in FIGURE 2A.

The normal timing circuit is effective during most of the step switch positions and serves to time the majority of intervals. This includes all intervals except the pedestrian walk and clearance intervals, the density initial interval, the maximum interval, and the dwell intervals. The dwell intervals are timed by other units when the unit is part of a fully actuated controller. The unit is also provided with short, fixed time timers which enable the unit to advance rapidly through the dwell intervals when the unit is used by itself as a semi-actuated controller.

The pedestrian timing circuit consists of a separate electronic interval timer which utilizes a small three position step switch to apply different reducing potentials to a resistance capacitance timing circuit connected to the control grid of a thyratron. The pedestrian timing circuit normally dwells in its reset interval which permits the display of a Don't Walk signal to the pedestrian crosswalk across main street. It can be urged from that position by a pedestrian pushbutton actuation which simulates a call from the cross street detector and causes the controller to display and time a cross street right of way period. At the beginning of such period the pedestrian timer inserts and times a walk interval and then a guaranteed clearance interval after which the right of way is returned to the main street.

The density, minimum, and maximum timing circuits each employ similar resistance-capacitance timing networks to control the potential applied to the grid of a tube. The density timing circuit operates through the normal timing tube during the density initial interval. Its timing capacitor receives an increment of charge for each actuation during the time right of way is denied the cross street phase. The duration of its density initial interval is determined by the number of vehicles stopped by the cross street stop signal.

The minimum timer operates during step switch position 2 and times simultaneously with the density timer to establish a minimum time for such intervals.

The maximum timer operates through its own tube and R-C timing circuit but does not have its own plate circuit relay. It conducts through the normal timing plate circuit relay to force the termination of the cross street right of way interval. It also energizes phase calling means, such as a memory relay.

The operation of each of these timing circuits will be described in greater detail after a more general description is made.

CIRCUIT DIAGRAM

Figure 4B:
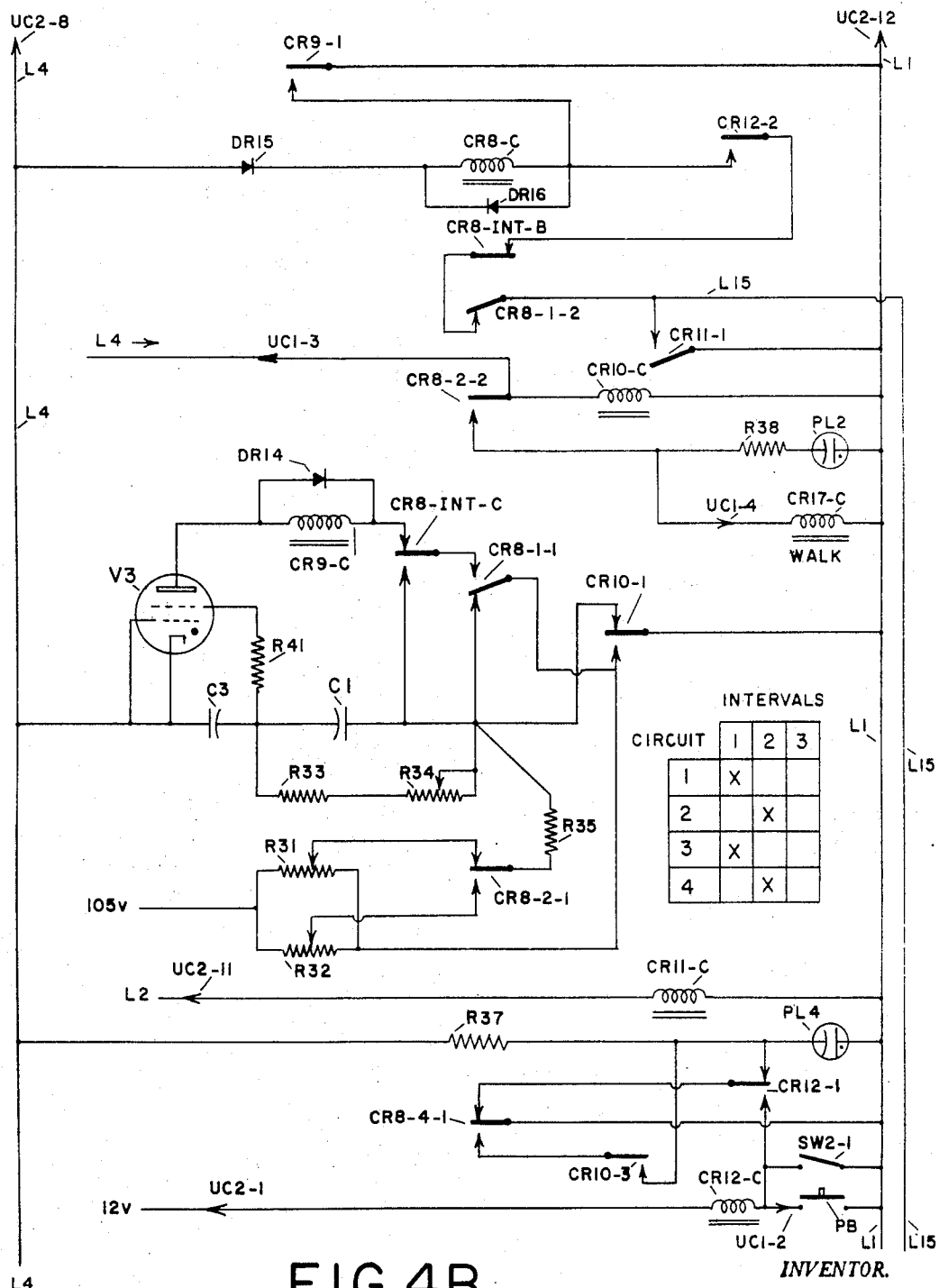
Figure 4C:
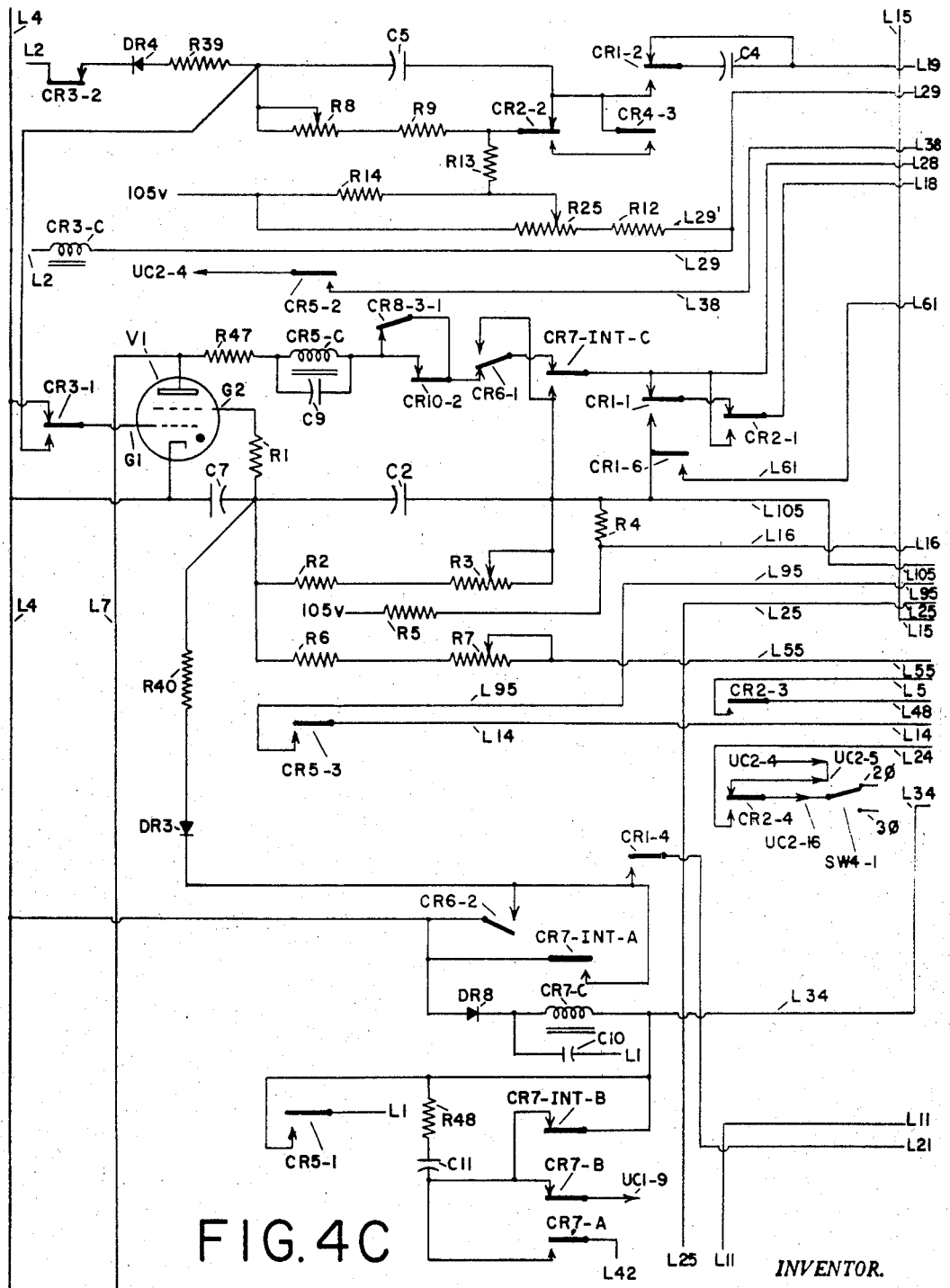

The circuit diagram of the preferred form of the actuable unit is shown in line to line form in FIGURES 4A-4D. Phase allocating means, taking the form of a step switch is illusrtated in FIGURE 4A. FIGURE 4B illustrates the pedestrian timing circuits; the normal and density timing circuits are shown in FIGURE 4C, and the maximum timing circuits are illustrated in FIGURE 4D.

Referring specifically to FIGURE 4A, the phase allocating means or step switch is shown to consist of nine banks of contacts. The phase allocating means, step switch, serves for cyclically and sequentially allocating various intervals, such as go dwell, phase selection and stop dwell intervals, to its associated traffic phase. Each bank contains eleven contacts or position, as numbered across the bottom of the figure. Each bank has a stepping contact or arm, A1-A9, shown near the vertical center of the figure. The first five banks numbering from the bottom upward have shorting type contacts indicated by the double arrows. The shorting type contacts, when stepping, make circuit with the next contact before breaking circuit with previous contact. The upper four banks have non-shorting contacts indicated by the single arrow.

On an actual step switch the stationary contacts are arranged in a 120° arc. The stepping contacts or arms A1-A9 each are made up of three fingers arranged in spaced relationship 120° apart. The fingers, shown at position 8, will next move to the right. When they reach position 11 another group of fingers will approach from the left and move to the right to position 1, shown at the left hand side of the diagram. The stepping contacts or arms A1-A9 will subsequently move to the right through positions 1 through 11.

The spring driven stepping switch in a preferred form of the invention is Type 11, shown in C. P. Clare and Company Sales Engineering Bulletin No. 121 (temporary) FIGURE 1.

Cycle actuating means, such as a step switch actuating coil CR7-C is shown near the lower center of FIGURE 4C. When coil CR7-C is energized it attracts its armature (not shown) which compresses an operating spring (not shown) and when de-energized permits the compressed operating spring to advance the arm A1-A9 one position to the right. While coil CR7-C is energized, it transfers the three sets of interrupter contacts CR7-INT-A, CR7-INT-B, and CR7-INT-C, FIGURE 4C. The contacts are of the A type, B type, and C type, respectively. Contacts of the A type are normally open and close upon actuation. Contacts of the type are normally closed and open upon actuation. Contacts of the C type are double throw and transfer upon actuation. This is the conventional nomenclature for contact stacks. The interrupter contacts are shown in a column above and below coil CR7-C.

The step switch is also equipped with an "off normal" contacts CR7-A and CR7-B. These are auxiliary contacts operated by a cam on the same shaft as the stepping contacts. Their function is limited to operation in only one position of the step switch. Contacts CR7-A are normally open and are closed when the step switch is in position 3. Contacts CR7-B are normally closed and are open when the step switch is in position 3. These contacts make possible the dwell in interval 3.

The timing mechanism illustrated in FIGURE 4C includes an electronic control device, such as normal timing tube V1, and its plate circuit including a relay coil CR5-C and a number of contacts and paths for completing the plate circuit, and its timing circuit including timing capacitor C2 and timing resistors R2, R6 and potentiometers R3, R7. Potential reducing resistors and potentiometers R3, R7. Potential reducing resistors and potentiometers are shown in FIGURE 4A between contact banks 6 and 7.

Four load relay coils Green 1 and 2 and Amber 1 and 2 are shown near the lower right hand portion of FIGURE 4A. They serve to control some of the signals for the phase controlled by this unit. Other external connections are made through the various unit connectors UC1-1 to US2-20. Connection between the mechanisms of FIGURES 4A and 4C are made through the lines shown at the left hand margin of FIGURE 4A.

Before proceeding with a complete description of the circuits found in the traffic actuated control unit of FIGURES 4A-4D, various circuits will be described in simplied manner as an aid to understanding the invention. Some of the timing circuits are shown in simplied form in FIGURES 5-10.

NORMAL TIMING CIRCUIT

Referring to FIGURE 5, the normal timing circuit is comprised of a thyratron tube V1 having a control grid G1, a screen grid G2, a cathode, and a plate. The cathode is connected directly to one of the AC power lines L4 and the plate is connected through the normal timing relay coil CR5-C and one or more relay and step switch contacts to the other AC power line L1. The control grid G1 is connected to line L4 through normally closed contacts CR3-1 and is used only during the density interval. The screen grid G2 is used in a novel manner as a second control grid and is connected to the left hand side of timing capacitor C2 through grid resistor R1. The left hand side of capacitor C2 is connected to line L4 through interrupter contacts CR7-INT-A. The right hand side of capacitor C2 is connected to line L1 through other relay and step switch contacts. Capacitor C2 normally applies sufficient negative potential to the grid G2 to prevent tube V1 from conducting.

The normal timing capacitor C2 has at least one charging circuit and at least one discharge circuit. Its main charging circuit includes interrupter contacts CR7-INT-A and CR7-INT-C both of which are transferred while the step switch relay coil is energized. The complete circuit includes line L4, interrupter contacts CR7-INT-A when closed, rectifier DR3, resistor R40, the left hand side of capacitor C2, the right hand side of capacitor C2, interrupter contacts CR7-INT-C when transferred, line L28, and step switch contacts on bank 8 at positions 1, 5, 6, 7, and 9. Contacts at positions 2 and 4 are connected to line L28 during semi-actuated operation. L1 power is applied to these contacts by arm A8 when the step switch is in any of these seven intervals. Capacitor C2 is fully charged while the step switch operating coil is energized and interrupter contacts -A and -C are transferred as the switch prepares to leave these positions. Other circuits supply a recharging path in other intervals and are described later.

A somewhat lower capacity charging circuit exists through the cathode-to-grid circuit of tube V1. This parallel charging path includes line L4, the cathode of tube V1, the screen grid G2 of the tube V1, grid leak resistor R1, and the left hand side of capacitor C2. Tube V1 acts as a rectifier; when line L1 is positive with respect to line L4, electrons flow to the left hand side of capacitor C2 through the circuit described immediately above. Since lines L1 and L4 are connected to a source of 60 cycle alternating current, power flows during alternate half cycles. The charge built up on capacitor C2 cannot drain off through tube V1 because of the high back impedance of the cathode to grid circuit. This parallel circuit is effective only while the L1 circuit is complete to the right hand side of capacitor C2. Some of the L1 circuits shown in FIGURE 4C are omitted from FIGURE 5 to preserve its simplicity.

The main discharge circuit for capacitor C2 includes resistor R2 and potentiometer R3. The impedance of each of these elements is high and the rate of discharge is low. Control of timing is accomplished by applying an alternating potential to the right hand side of capacitor C2. The AC potential is applied in series with the DC capacitor potential to thereby reduce the potential appearing at the grid G2. The alternating potential is derived from a different timing potentiometer for each step switch position. In step switch position 7, for example, timing potentiometer R28 supplies the alternating potential and determines the duration of the interval.

The circuit is shown near the right hand side of FIGURE 5 and includes line L1, resistor R50, stepping arm A7, a contact at position 7 of bank 7, a line to one terminal of potentiometer R28, the tap of potentiometer R28, a line to a contact at position 7 of bank 6, stepping arm A6, line L16, coupling resistor R4, and the right hand side of timing capacitor C2. This circuit applies alternating potential to the right hand side of capacitor C2 and determines its timing.

The other terminal of timing potentiometer R28 is connected to the 105 volt source. Likewise, resistor R5 is connected between the 105 volt source and L16 and is in the circuit during all intervals. In prior devices an individual resistor was provided for each timing potentiometer; here, one common resistor is utilized with all the potentiometers.

The other potentiometers and timing resistors which are utilized during the other step switch positions are shown in FIGURE 4A and include potentiometers R10, R11, and R26–R30, and resistors R44, R45, and R51–R53.

Through the formerly described circuits the normal timing capacitor C2 receives a full charge each time the interrupter contacts CR7–INT–A and CR7–INT–C transfer. This occurs between each timed interval while the step switch is energized at the expiration of the interval. The path is of sufficiently low impedance and the time of contact closure is of sufficient duration that capacitor C2 assumes a full charge.

The transfer of contacts CR7–INT–C performs an additional function: they interrupt the plate circuit for tube V1 and cause the normal timing relay coil CR5–C to be deenergized. Power in the coil is sustained for a few power line cycles by the charge on capacitor C9. When the normal timing relay coil CR5–C becomes sufficiently deenergized it releases its contacts and the step switch coil is deenergized. When the latter coil is deenergized the step switch operating spring moves the stepping arms one step forward while the interrupter contacts CR7–INT–A and CR7–INT–C are retransferring. Thus, the timing capacitor is recharged while a different timing potentiometer is switched into the timing circuit.

As the different timing potentiometers are switched into and out of the normal timing circuit they are also switched into and out of the power circuit, thus reducing power consumption and heat dissipation problems. Each potentiometer has one lead connected permanently to the 105 volt source and the other lead connected to a step switch contact on bank 7. Stepping arm A7 applies L1 power to each potentiometer in turn through resistor R50. The tap of each potentiometer is connected to a step switch contact on bank 6, and stepping arm A6 applies the reducing potential to the normal timing capacitor through line L16 and coupling resistor R4. Resistor R5 assists in making each of the dials read more linearly.

SHORT TIMING INTERVALS

During the signal intervals which are normally of short duration it is desired that the timing circuit time more rapidly. An additional circuit is provided for that purpose during the vehicle and special clearance intervals. As illustrated in FIGURE 6 an additional discharge path is provided for timing capacitor C2 during step switch positions 1, 5, 6, and 9. The dashed line in FIGURE 6 may be extended upward to connect to the line leading to the left hand side of capacitor C2. The additional discharge circuit includes the left hand side of capacitor C2, resistor R6, potentiometer R7, line L55, contacts at positions 5 and 6 of step switch bank 5, stepping arm A5, and line L1. A parallel portion of the circuit includes line L55, resistor R49, contacts at positions 1 and 9 of step switch bank 2, stepping arm A2, and line L4. The former portion is effective during step switch positions 5 and 6 and the latter portion during positions 1 and 9 to provide a discharge path in parallel with the path including resistor R2 and potentiometer R3.

It is apparent that the potential reducing circuit including the potentiometers connected between step switch banks 6 and 7, FIGURE 4A, is also operative during the short intervals. Potentiometers R26, R11, R29, and R27 are switched into the circuit during step switch positions 1, 5, 6, and 9, respectively.

It will be noted that the negative side of capacitor C2 is discharged toward line L1 potential during intervals 5 and 6 and toward line L4 potential during intervals 1 and 9. It is apparent, however, that the capacitor is being discharged toward L1 potential during all four intervals when it is considered that line L4 connects to line L1 through the electric power service and the secondary of the distribution transformer serving the installation. It is obvious that the service and secondary provide a low impedance path between lines L4 and L1.

This circuitous path is necessary because contacts at positions 1 and 9 are not available on step switch bank 5.

NORMAL TIMING PLATE CIRCUIT

The normal timing pltae circuit is somewhat complex and will be described separately with the aid of the simplified line to line diagram of FIGURE 7.

The purpose of the normal timing circuit is to time the majority of step switch intervals and at the expiration of such intervals to energize the plate circuit relay coil CR5–C which in turn energizes the step switch operating coil CR7–C, FIGURE 4C. The normal timing relay controls the step switch operating coil through normal timing relay contacts CR5–1 shown near the lower center portion of FIGURE 4C.

FIGURE 7 illustrates both the timing and the control portions of the normal timing circuit; the timing portions are shown below line L105 and have been explained above. The control portion constitutes the plate circuit shown above line L105 and is the subject of the present discussion. Since the normal timing plate circuit must be completed during all step switch intervals except interval 3, three paths are provided, each effective during different intervals. Line L28 completes the plate circuit during all intervals except 3, 4, 10, and 11. Line 18 completes the circuit during interval 4, and line L105 completes it during intervals 10 and 11.

During step switch positions 1, 2, 5, 6, 7 and 9 the complete plate circuit includes line L4, the cathode of tube V1, the plate of tube V1, plate circuit resistor R47, normal timing relay coil CR5–C, contacts CR10–2 in parallel with the pedestrian step switch contacts CR8–3–1, stop timing relay contacts CR6–1 in the energized position shown, interrupter contacts CR7–INT–C in the position shown, line L28, contacts at positions 1, 2, 5, 6, 7 and 9 of step switch bank 8, stepping arm A8, and line L1.

The thyratron tube V1 conducts only during the half cycles of alternating line potential when line L1 is positive with respect to line L4. During conduction the normal timing relay coil CR5-C is energized and it operates its contacts CR5-1, FIGURE 4C, which close the L1 circuit to the step switch operating coil CR7-C.

When the step switch coil is energized it operates the interrupter contacts CR7-INT-C which break the plate circuit and cause tube V1 to cease conducting. The normal timing relay coil CR5-C is thus deenergized and its contacts CR5-1 open and deenergize the step switch coil. The step switch operating spring thereupon advances the movable contact arms A1-A9 from the instant step switch position to the next switch position.

While the interrupter contacts CR7-INT-A and CR7-INT-C are transferred to the position indicated by the dashed lines in FIGURE 7 they complete the normal charging circuit to capacitor C2. In the next step switch position, a different timing potentiometer is switched into the circuit to apply a different alternating potential to the left hand side of capacitor C2 to determine the timing of the interval.

During step switch position 3 the normal timing plate circuit is broken because no contact is provided on any of the step switch contact banks for closing the plate circuit during position 3. The step switch operating coil is energized through step switch off normal contacts CR7-A shown at the bottom of FIGURE 4C. These contacts are closed only during step switch position 3 to rapidly energize the step switch operating coil and advance it from position 3 to position 4.

During step switch position 4, the unit extension interval, the normal timing plate circuit includes much of the circuit described above with respect to intervals 1, 2, 5, 6, 7 and 9. A contact is provided at position 4 of step switch bank 8 to complete the plate circuit through detector memory relay contacts CR2-1 in the position shown. The plate circuit includes the same components enumerated above except that the transfer relay contacts CR10-2 are open and the predestrian step switch contacts CR8-3-1 are closed if the pedestrian circuit is not timing. This feature permits the pedestrian timer to take preference over the normal timer during the Walk and Guaranteed Clearance intervals. Detector memory relay contacts CR2-1 are in the position shown in FIGURE 7; the memory relay coil CR2-C, FIGURE 4D, cannot be energized during step switch position 4 because it is deprived of L4 power during step switch positions 2, 3, and 4 by the action of step switch bank 1, FIGURE 4A.

The complete plate circuit during interval 4 includes the plate of tube V1, resistor R47, normal timing relay coil CR5-C, pedestrian step switch contacts CR8-3-1 when the pedestrian timer is not in the timing positions, stop timing relay contacts CR6-1 in the position shown, interrupter contacts CR7-INT-C, a portion of line L28, a line to detector relay contacts CR1-1, a line to detector memory relay contacts CR2-1, line L18, a contact at position 4 of bank 8, stepping arm A8, and line L1. As noted above, contacts CR2-1 are retained in the position shown because the detector memory relay is prevented from becoming energized during the unit extension interval by being deprived of its source of energizing potential through bank 1 of the step switch, FIGURE 4A.

The vehicle detector relay contacts CR1-1 are transferred during each actuation of the cross street detectors to break the normal timing plate circuit and recharge the normal timing capacitor C2 to provide the unit extension feature. The circuit includes line L1, stepping arm A8, a contact at position 4 of bank 8, line L18, detector memory relayl contacts CR2-1 in the position shown in FIGURE 7, vehicle detector relay contacts CR1-1 when transferred, a portion of line L105, and the right hand side of capacitor C2.

During step switch positions 5, 6, and 7 the normal timing plate circuit includes line L28 and contacts at positions 5, 6, and 7 of step switch bank 8. The plate circuit is as described above for step switch positions 1 and 2.

The step switch normally dwells in position 8 when the unit is employed as a semi-actuated controller. The plate circuit is deprived of L1 power; this causes it to dwell in position 8. After a detector actuation on the cross street, a path is completed through the detector memory relay contacts CR2-3, right center portion of FIGURE 4C, to a contact at position 8 of step switch bank 5. The circuit includes in FIGURE 7 line L1, line L48, detector memory relay contacts CR2-3 when closed, line L5, stepping arm A5, a contact at position 8 of bank 5, unit connector UC1-21, a jumper to unit connector UC1'20, and a line to line L28. The remainder of the plate circuit is as described above.

During step switch position 9 the plate circuit is completed through a contact at position 9 on bank 8 and through line L28 as described above.

During step switch positions 10 and 11, the red dwell 1 and 2 intervals, line L28 is again made effective through a jumper installed between unit connectors UC1-6 and UC1-20 associated with contacts at positions 10 and 11 of step switch bank 8. During these intervals the circuit includes line L1, stepping arm A8, contacts at positions 10 and 11 of step switch bank 8, a line to unit connector UC-6, an external jumper to unit connector UC1-29, line L-28, and the remainder of the plate circuit as described above.

It will be noted in connection with FIGURE 7 that the circuits in the right hand portion of the figure not only provide L1 power for the plate circuit during the timing of the various intervals but also provide L1 power for charging capacitor C2 during the time the step switch is energized and contacts CR7-INT-C are transferred. It will be apparent that each of the above described circuits is effective immediately after the interval it has timed to thereby supply a charging path for capacitor C2 through interrupter contacts CR7-INT-C. The L4 portion of the charging path is completed through interrupter contacts CR7-INT-A. When both sets of contacts are in the position indicated by the dashed lines the charging circuit is completed. As the step switch advances to the next interval the charging circuit is broken and a new plate circuit is established.

It will also be appreciated that the various stepping arms A8 are one and the same arm. Likewise, the stepping arms A5 are shown more than once to simplify the diagram and avoid crossover of the lines.

DENSITY TIMING CIRCUIT

The timing circuit for the density initial timing portion of the controller is somewhat similar to the normal timing circuit and is illustrated in FIGURE 8. Timing capacitor C5 shown near the center of the figure is provided with a charging path between line L2 and line L1 in step switch positions 1 and 6-11. The charging circuit is made effective only during those intervals which correspond to the time right of way is halted on the cross street. It will be recalled that the purpose of the density timer is to establish the duration of the initial cross sreet right of way interval as a function of the number of vehicles stopped against the red signal.

The vehicle detector relay coil CR1-C, bottom of FIGURE 4D, is energized whenever one of the cross street detectors D1-D4, FIGURE 1A, is actuated. Relay coil CR1-C serves as a means for providing characteristic signals representative that traffic intends movement along an associated traffic phase. The closure of contacts CR1-2, FIGURE 8, is irrelevant during step switch positions 2-5 because no step switch contacts are provided for these intervals. Intervals 2-5 correspond to the cross street right of way and clearance intervals during which time it is not desired to change the initial interval.

During intervals 1 and 6-11, when it is desired to establish the duration of the density initial interval, the circuit for charging capacitor C5 is completed whenever the vehicle detector relay contacts CR1-2 are closed. The charging circuit is shown in FIGURE 8 and includes line L2, density relay contacts CR3-2 in the position shown, rectifier DR4, limiting resistor R-39, the left hand side of capacitor C5, the right hand side of capacitor C5, vehicle detector relay contacts CR1-2 when transferred, capacitor C4, line L19, contacts at positions 1 and 6-11 on step switch bank 9, stepping arm A9, and line L1. Capacitor C4 is normally discharged through the shorting circuit including contacts CR1-2 in the position shown. When the detector relay contacts CR1-2 transfer they allow capacitor C5 to assure a small amount of charge through capacitor C4. As soon as contacts CR1-2 retransfer they short out capacitor C4 and enable it to permit capacitor C5 to assume another charge during the next detector actuation.

The density timing capacitor C5 thus receives an increment of charge during each detector actuation in intervals 1 and 6-11. In this manner the control unit is able to count the number of cross street vehicles waiting for the green light.

At the first interval in the cross street right of way period, interval 2, the density relay coil CR3-C is energized and contacts CR3-1 transfer to apply the potential appearing at the left hand side of capacitor C5 to grid G1 of tube V1. Contacts CR3-2 open to disconnect the charging circuit. The timing capacitor begins to time out through potentiometer R8 and resistor R9 and normally closed memory relay contacts CR2-2.

To provide an external control for the timing circuit an alternating potential is applied to the right hand side of capacitor C5. The circuit is similar to that employed with the normal timing circuit described above. The potential is not full L1 potential but has a value between L1 potential and 105 volts. The circuit which applies the reducing potential to the right hand side of capacitor C5 includes line L1, steping arm A9, a contact at position 2 of bank 9, line L29, line L29', resistor R12, a portion of potentiometer R25, coupling resistor R13, detector memory relay contacts CR2-2 in the position shown, and a line to the right hand side of capacitor C5. The circuit also includes linearizing resistor R14 and the 105 v. source.

It is apparent that potentiometer R25 and resistor R12 are connected in a voltage dividing circuit. The voltage is taken off at the tap of potentiometer R25 and applied through coupling resistor R13 to the right hand side of capacitor C5 to reduce its apparent potential.

During all intervals except those in which the density relay is energized the grid G1 is maintained at full negative potential by the connection to line L4 through the normally closed density relay contacts CR3-1. The density relay coil CR3-C is shown near the bottom of the figure and is connected between lines L2 and line L29. It is energized during step switch position 2.

MAXIMUM TIMING CIRCUIT

A circuit is provided in the unit to limit the duration of the cross street right of way period and to force the unit to advance to and time at least a minimum main street right of way period before returning to the cross street phase.

The maximum timer is shown in detail in FIGURE 4D. It will be described in simplified form with the aid of FIGURE 9. The circuit consists essentially of a timing tube V2, its plate and grid circuits, and a timing circuit including capacitor C6. The maximum timer operates through the normal timing plate circuit, FIGURE 8, and is connected thereto during the cross street right of way period by the closure of maximum select relay contacts CR4-1, FIGURE 4D.

The timing capacitor C6 is connected between lines L4 and L1 during all intervals except the cross street right of way intervals through the cathode to grid circuit in tube V2 and the normally closed maximum select relay contacts CR4-2. The cathode to grid circuit is effective to charge capacitor C6 continuously during the half cycles of alternating potential when line L1 and the grid of tube V2 are positive with respect to line L4 and the cathode of tube V2.

The circuit includes line L4, the cathode of tube V2, the screen grid of tube V2, grid resistor R15, the left hand side of capacitor C6, the right hand side of capacitor C6, maximum select relay contacts CR4-2, and line L1 This circuit permits current to flow from line L4 to line L1 when the latter is positive with respect to the former. Capacitor C6 is thus charged and maintained charged through all intervals except those in which the maximum select relay coil CR4-C is energized.

The maximum select relay is energized at the beginning of interval 2 when the control unit is used as a semi-actuated controller. It is energized after an actuation on another phase when the unit is used as part of a fully actuated controller. In FIGURE 9 the device is shown as being used as a semi-actuated controller; L1 power is supplied continuously to unit connector UC2-3. This energizes the maximum select relay every cycle during intervals 2, 3, and 4.

Energization of the maximum select relay opens contacts CR4-2 which break the charging circuit for capacitor C6 and permit the discharge circuit to function. The discharge circuit including resistor R16 and potentiometer R17 is connected across capacitor C6 permanently; it discharges capacitor C6 continuously but at a rate lower than it is charged by the grid-to-cathode charging circuit. When the charging circuit is broken, the discharge circuit becomes effective to reduce the potential across the capacitor.

While the capacitor is discharging, a somewhat negative alternating potential is applied to the right hand side of capacitor C6 through the circuit shown in the lower portion of FIGURE 9. The circuit includes line L1, unit connector UC2-3, stepping arm A5, contacts at positions 2, 3, and 4 of step switch bank 5, line L25, a portion of potentiometer R20, coupling resistor R18, and the right hand side of capacitor C6. Another portion of this voltage dividing circuit includes the other portion of potentiometer R20 and the 105 volt source 105 v. Resistor R19 provides a linearizing effect. The combination of the D6 potential from capacitor C6 and the AC potential from the voltage divider network provides a resultant grid potential that continuously rises from a negative value toward a zero value and permits tube V2 to conduct when the maximum interval has expired.

It will be noted that the maximum timing tube V2 does not have a plate circuit relay. The plate of tube V2 is connected through unit connectors UC2-17 and UC2-18, FIGURE 4D, maximum select relay contacts CR4-1, rectifier DR2 and line L7 to the normal timing relay coil CR5-C shown near the top of FIGURE 4C. When the maximum timing circuit times out and permits tube V2 to conduct, it conducts through the normal timing circuit and energizes relay coil CR5-C. Contacts CR5-1 close and energize the step switch to terminate the cross street green period.

Conduction of tube V2 also energizes the detector memory relay coil CR2-C, FIGURE 4D. This circuit will be described later.

PEDESTRIAN TIMING CIRCUIT

The timing circuit for the pedestrian timer is an integral part of the actuated phase unit. The essential elements of the circuit are shown in simplified line to line form in FIGURE 10. The circuit consists of thyratron tube V3, its plate and grid circuits, and the timing circuit including capacitor C1.

Timing capacitor C1 is continuously charged through the circuit including the cathode and grid of tube V3 and transfer relay contacts CR10-1. The circuit includes line L4, the cathode of tube V3, the screen grid of tube V3, grid resistor R41, and the left hand side of capacitor C1, the right hand side of capacitor C1, line L46 to the normally closed transfer contacts CR10–1, and line L1. During the half cycles of alternating line potential when line L1 and the grid of tube V3 are positive with respect to line L4 and the cathode of tube V3, a unidirectional current will flow through capacitor C1, applying a negative charge to its left hand side. Tube V3 is thus biased to prevent conduction.

The charge is maintained on capacitor C1 even while transfer relay contacts CR10–1 are transferred during intervals 2, 3, and 4 to the position indicated by the dashed lines. It will be noted that both stationary contacts which form a part of contacts CR10–1 are connected to line L46 and thence to the right hand side of capacitor C1. This circuit provides a charging path for capacitor C1 during all cross street right of way periods except those following a pedestrian actuation.

This circuit arrangement also provides a recharging path for capacitor C1 between each of the pedestrian intervals. While the pedestrian step switch operating coil is energized at the termination of each pedestrian interval, interrupter contacts CR8–INT–C are transferred to the position indicated by the dashed lines in FIGURE 10. The recharging circuit then includes the right hand side of capacitor C1 and the three groups of contacts in the positions indicated by the dashed lines: CR8–INT–C, CR8–1–1, and CR10–1. The left hand side of capacitor C1 is continuously connected to the cathode-to-grid circuit in tube V3; during the time the step switch operating coil CR8–C is energized capacitor C1 assumes a charge. The circuit parameters are such that capacitor C1 receives an adequate charge during this short interval.

The discharge circuit associated with capacitor C1 includes resistor R33 and potentiometer R34 which are connected in series and are permanently applied across capacitor C1. As in the maximum timer the charging circuit is adequate to charge the capacitor even while the discharge circuit is applied.

As with the other timing circuits an alternating reducing potential is applied to the right hand side of the timing capacitor during the timing intervals. And similarly, a different reducing potential is applied during each different interval. During the walk interval potentiometer R32 is switched into the timing circuit and during the wait interval potentiometer R31 is switched into the circuit. Pedestrian step switch contacts CR8–2–1 perform the switching function.

The plate circuit for tube V3 includes the plate circuit relay coil CR9–C, pedestrian step switch contacts CR8–INT–C and CR8–1–1, and transfer relay contacts CR10–1, all normally in the position shown. The plate circuit is normally open and is not completed until the pedestrian step switch contacts CR8–1–1 and the transfer relay contacts CR10–1 transfer to the positions indicated by the dashed lines in FIGURE 10. Contacts CR10–1 transfer at the beginning of the cross street right of way interval; contacts CR8–1–1 transfer as soon as a pedestrian actuation occurs and the pedestrian step switch is energized from the reset position.

PEDESTRIAN CYCLE

A pedestrian walk interval is inserted in the cycle following a pedestrian actuation. The control unit is first urged to terminate the main street right of way period and subsequently to display a cross street right of way period. During the latter period the pedestrian sequence occurs.

The pedestrian step switch normally resides in its reset position and after pedestrian actuation is advanced to its walk position as soon as the main step switch reaches position 1. In the walk position contacts CR8–1–1 are transferred to the position indicated by the dashed lines but they neither break the charging circuit for capacitor C1 nor complete the plate circuit because contacts CR10–1 are not yet transferred.

When the actuated control unit energizes the cross street right of way signals it also energizes the transfer relay coil CR10–C. Contacts CR10–1 transfer to the position indicated by the dashed line and in cooperation with contacts CR8–1–1 and CR8–INT–C complete the plate circuit for tube V3 and break the charging circuit for capacitor C1. Further, contacts CR10–1 complete the L1 circuit to the walk timing potentiometer R32. Contacts CR8–2–1 are transferred to the lower position during the walk interval and complete the reducing potential circuit through resistor R35 to the right hand side of capacitor C1. The timing of the walk interval is thus initiated concurrently with the beginning of the cross street initial interval.

The complete reducing potential circuit includes line L1, now transferred contact CR10–1, a line to potentiometers R32 and R31, a portion of potentiometer R32, the tap of potentiometer R32, pedestrian step switch contacts CR8–2–1 in the transferred position, coupling resistor R35, and the right hand side of capacitor C1. The normal discharge circuit for capacitor C1 includes resistor R33 and potentiometer R34.

The combination of circuits permits capacitor C1 to discharge and to reduce the negative potential on the grid of tube V3. Tube V3 conducts and energizes its plate circuit relay coil CR9–C through interrupter contact CR8–INT–C in the position shown, through pedestrian step switch contacts CR8–1–1 in the transferred position, through contacts CR10–1 in the transferred position, and line L1.

The plate circuit relay closes contacts CR9–1 shown at the top of FIGURE 4B and they complete the L1 circuit to the pedestrian step switch operating coil CR8–C. While the step switch operating coil is energized it transfers contacts CR8–INT–C to the position indicated by the dashed line in FIGURE 10 where they close the recharging circuit for capacitor C1 and interrupt the plate circuit. Capacitor C1 becomes fully charged and coil CR9–C is de-energized. Rectifier DR14 supplies a unidirectional path for sustaining current through the relay coil.

When relay contacts CR9–1, top of FIGURE 4B, open they de-energize the step switch coil and permit its operating spring to advance the switch to the guaranteed clearance position. In the latter position contacts CR8–2–1 retransfer to position shown in FIGURE 10 and substitute potentiometer R31 for potentiometer R32.

The duration of the guaranteed clearance interval is determined by the setting of potentiometer R31. During this interval and the preceding walk interval the normal timing circuit, FIGURE 7, is prevented from conducting by the opening of contacts CR8–3–1 located in the normal timing plate circuit. This insures that a missetting of the dials cannot cause the premature termination of the guaranteed pedestrian clearance interval.

At the expiration of such interval tube V3 conducts and energizes relay coil CR9–C. Contacts CR9–1, top of FIGURE 4B, close and energize the pedestrian step switch coil CR8–C which causes the transfer of contacts CR8–INT–C. Coil CR9–C becomes de-energized; contacts CR9–1 open and de-energize coil CR8–C and permit the pedestrian step switch to advance to the reset position. Contacts CR8–3–1, FIGURE 7, close and complete the normal timing plate circuit. The main step switch advances to the cross street caution interval and thence to the main street right of way period. The pedestrian cycle is thus completed.

Having described the major timing circuits the remainder of the circuit configuration will now be described.

ACTUATED CONTROL UNIT

As noted above, the actuated control unit consists of a multi-bank step switch and a plurality of control and timing circuits associated therewith to provide a pedestrian and vehicle actuable control unit suitable for use at any type of intersection. The step switch contact blanks and stepping elements are shown in FIGURE 4A. The various timing and control circuits are shown in FIGURES 4B, 4C, and 4D. These circuit diagrams may be arranged as shown in FIGURE 4E to form a composite wiring diagram of the entire control unit.

The interconnections between FIGURES 4A and 4C are so spaced that the drawings may be placed side by side and a direct connection made between the two portions of the circuits. The few connections between the pedestrian and normal timing circuits and between the maximum and normal timing circuits are treated in like manner.

The step switch consists of nine individual banks of contacts, each bank having eleven contact positions identified at the bottom of FIGURE 4A. Each of the banks is provided with a stepping arm A1–A9 which is formed in the shape of a Y, each stepping arm spaced 120° from the others. The stepping arms are shown in FIGURE 4A in position 8 which corresponds to the green dwell 2 and phase select interval. When the step switch operating coil CR7–C, shown near the lower center portion of FIGURE 4C, is energized it compresses an operating spring (not shown). When the step switch operating coil is de-energized it permits the force stored in the operating spring to advance the stepping arms one position. Thus, the arms will next move from position 8 to position 9. After two additional moves the arms will move away from position 11 and another arm will advance from the left into contact with the contacts at position 1. The stepping arms will subsequently move to the right until they reach position 8, at which position they will dwell until another actuation of the detectors or the pedestrian pushbuttons.

As illustrated in FIGURES 4B–4D there are three timing tubes: V1, V2, and V3. Tube V1, FIGURE 4C, is associated with the normal and density timing circuits. Tube V2, FIGURE 4D, is associated with the maximum timing circuit. Tube V3, FIGURE 4B, is associated with the pedestrian timing circuit. Each of the tubes is a gas filled tetrode having a cathode, a plate, a screen grid and a control grid. The control grids of tubes V2 and V3 are connected to the cathode circuit of the respective tubes and are used as conventional screen grids. The screen grid in each tube is used as the control grid because it is found that this configuration is less sensitive to line voltage fluctuations. Tube V1 is controlled by two timing circuits, one connected to the control grid and the other connected to the screen grid. The screen grid is thus employed as an additional control grid during part of the timing cycle and is connected to the cathode circuit during the remainder of the cycle.

Each of the four timing circuits includes a timing capacitor and a charging path and one or more discharge paths. Each tube is provided with a plate circuit containing a plate circuit relay coil and a number of plate circuit control contacts. The object of the timing circuit is to provide sufficient negative potential on the control grid or grids of tubes V1, V2, V3 such that the tubes will not conduct until the expiration of the interval timed by the respective timing circuits.

The timing circuits hereinbefore described comprise a timing capacitor, at least one charging circuit, and at least one discharging circuit. The charging circuit may include the cathode to grid circuit of the associated thyratron. The discharge circuit normally consists of a shunt, including a resistor and a calibration potentiometer. To control timing during the various intervals, the timing potentiometers shown in FIGURE 4A, are switched into the R-C circuit to provide an alternating potential which appears at the control grid of the respective tube in series with the DC potential derived from the timing capacitor. The series potential consists of a DC potential reduced on an exponential curve with an alternating potential superimposed on it. The grid potential is important only during the half cycles of line potential when the plate of the tube is positive with respect to the grid. During half cycles when the plate is negative with respect to the grid, the tube cannot conduct and therefore the grid voltage is unimportant.

To reduce power consumption and lessen the heat dissipation requirement of the unit, each individual timing potentiometer is switched into the circuit only during the interval whose duration it controls. At all other intervals it is switched out of the circuit and does not consume power. This is a distinct advantage over prior controllers which employed continuously connected timing potentiometers which consumed power and added to heat dissipation problems. Since less heat is built up in the unit, the components remain more stable and variation in timing due to temperature change in the components is reduced to a minimum.

Referring to FIGURE 4A, it can be seen that each of the step switch banks is devoted to one or more specific functions. Bank 1 is employed as part of the detector memory circuit and applies power from line L4 through stepping arm A1 to the contacts at positions 1 and 5–11 and thence to line L11 and memory relay coil CR2–C, FIGURE 4D. Bank 2 controls the Green 1 and Amber 1 relays, and in positions 1 and 9 controls the short timing circuit. The Green 1 and Amber 1 relays control the cross street traffic signals when the device is used as a semi-actuated controller as in FIGURE 1A. Bank 3 controls the Green 2 and Amber 2 relays which are employed to control the main street right of way signals at a semi-actuated intersection as shown in FIGURE 1A. Bank 3 is employed for phase selection and phase overlap functions which are used when the unit is part of a fully actuated controller.

Bank 5 includes a maximum relay control circuit in positions 2, 3, and 4 and a short timing circuit in positions 5 and 6. Position 8 is used to advance the unit from its dwell position after cross street detector actuation. Positions 10 and 11 are used to recharge the normal timing capacitor C2 so that it will be fully charged for interval 1. Banks 6 and 7 control the switching in and switching out of the various timing potentiometers R10, R11, R26–R30, and timing resistors R44 and R45. Bank 8 controls the plate circuit for the normal timing tube V1. Bank 9 controls the density timing circuit recharging path during positions 1 and 6–11. A coordination control circuit is effective in positions 2, 3, and 4.

The signal lights S at an intersection of the type shown in FIGURE 1A are controlled through a sequence illustrated in FIGURE 3, Option 2, by load relays represented by the rectangles LR of FIGURE 2A. Each of the rectangles LR symbolizes a group of load relays arranged in a circuit designed to prevent more than one street from receiving a green signal at a time. Some of the load relays within the rectangles LR have their operating coils shown near the bottom of FIGURE 4A; these include the Green 1 and Amber 1 coils and the Green 2 and Amber 2 coils. Other relay coils may be connected to various of the unit connectors UC1–1 to UC1–24 and UC2–1 to UC2–24.

Each of the load relays shown in FIGURE 4A is controlled by a contact on step switch bank 2 or 3. The Green 1 relay coil, for example, is energized by contacts at positions 2, 3 and 4 on step switch bank 2 and controls the cross street green signal at a semi-actuated intersection. The connection between the Green 1 relay coil and the contacts at positions 2, 3, and 4 is made through unit connector UC1–12. The cross street amber signal is controlled by the Amber 1 relay coil which is connected to unit connector UC1–13 and the contact at position 5 on step switch bank 2. The main street green signal is controlled by the Green 2 relay coil which is connected through unit connector UC1–23 to a contact at position 6 of bank 2 through unit connector UC2–19 to contacts at positions 7 and 8 of bank 3. The main street amber signal is controlled by the Amber 2 relay coil which receives power from unit connector UC1–1 and a contact at position 9 on bank 3.

It will be noted that the Green 2 relay coil in FIGURE 4A is not shown connected as described above but is shown connected to unit connector UC2–20 and contacts at positions 2–6 on bank 3. The latter connection is as used when the unit is part of a fully actuated controller and in conjunction with unit connector UC2–19 gives the Delayed Green period shown in FIGURE 3, fourth line from the bottom.

The pedestrian walk and guaranteed clearance signals are controlled by the walk relay coil CR17–C shown near the center of FIGURE 4B. The walk relay coil CR17–C is normally de-energized and in such condition energizes and illuminates the Don't Walk signals DW. During the pedestrian walk interval L4 power derived from the cross street green signal and unit connector UC1–3 is utilized through contacts CR8–2–2 to energize the walk relay coil CR17–C. Contacts on the walk relay energize the Walk signals W, FIGURE 1A. During the guaranteed pedestrian clearance interval the walk relay coil is de-energized and the Don't Walk signals DW are illuminated for at least a guaranteed period. After the expiration of the guaranteed period, the Don't Walk signals DW continue to be illuminated for the remainder of the cycle or until the walk relay is again energized.

The Walk signals W' parallel with the main street, FIGURE 1A, are normally energized while the controller dwells in the main street right of way period. The Don't Walk signals DW' are energized during intervals 6, 7, and 8, Option 1 and 2, FIGURE 3, by a relay coil connected to unit connectors UC1–23 and UC2–19, FIGURE 4A.

CYCLE OF OPERATION

Referring specifically to FIGURE 4A, it will be seen that the step switch resides in position 8, the green dwell and phase select interval. When the controller is used as a semi-actuated device to control traffic in two intersecting directions as shown in FIGURE 1A, it normally dwells in step switch position 8 until a vehicle or pedestrian actuation occurs on the cross street. When the device is used as part of a fully actuated controller the unit may dwell at step switch position 10, its red dwell 1 interval, or at step switch position 3, its green dwell interval. The unit is thus able to dwell in one position when used as a semi-actuated controller, and in either of two other positions when used as a fully actuated controller.

While the step switch is in position 8 the three timing circuits for tubes V1, V2, and V3 are kept in a fully charged condition by circuits to be described subsequently.

During step switch position 8 the normal timing circuit, FIGURE 4C, is permitted to time out rapidly but the normal timing tube V1 does not conduct because its plate circuit is broken at contacts CR2–3, FIGURE 7. The density timing circuit is made ineffective because L4 power is placed on grid G1 of tube V1 to make it the same potential as the cathode which is always connected to line L4. The maximum timing circuit including capacitor C6, FIGURE 4D, is kept in a charged condition through normally closed contacts CR4–2. The pedestrian timing capacitor C1, FIGURE 4B, is kept fully charged through the grid-to-cathode circuit of tube V3 and through contacts CR10–1. The density timing capacitor C5 shown at the top of FIGURE 4C is connected to capacitor C4 and partially charged therethrough each time the detector is actuated.

The first portion of the phase select interval is timed during step switch position 8 through the voltage dividing network consisting of resistors R44 and R45. Resistor R44 is connected to line L1 through stepping arm A7 and resistor R50. Resistor R45 is connected to the 105 volt source. The common terminal of the voltage divider is applied to a contact at position 8, step switch bank 6. The potential derived therefrom is applied through arm A6 and line L16 and through line L16 in FIGURE 4C and coupling resistor R4 to the right hand side of capacitor C2. Thus, capacitor C2 is made to time a very short interval during the first portion of step switch position 8. The plate circuit, however, is open through the memory relay contacts CR2–3 shown near the center of FIGURE 4C. During step switch position 8 the normal timing plate circuit, FIGURE 4C, consists of the plate of tube V1, resistor R47, normal timing relay coil CR5–C, contacts CR10–2 in the position shown, stop timing contacts CR6–1 in the energized position shown, interrupter contacts CR7–INT–C, line L28, and in FIGURE 4A, line L28, unit connector UC1–20, a jumper to unit connector UC1–21, a line to a contact at position 8, bank 5, stepping arm A5, and line L5. Back in FIGURE 4C the circuit includes line L5, memory relay contacts CR2–3, and line L48. In FIGURE 4A the circuit includes line L48, unit connector UC1–7, and a jumper to line L1. A simplified diagram of the above circuit is shown in FIGURE 11.

Referring for a moment to FIGURE 11, it can be seen that at least two conditions are required to advance the step switch from its dwell position 8. These include a detector actuation and closure of memory relay contacts CR2–3, and a closure of the coordinating contacts, CO–ORD, if provided. If no coordinating contacts are provided, a jumper is connected between unit connectors UC1–22 and UC2–2. When coordinating contacts are provided the jumper is removed and the coordinating contacts are connected between these two points. Detector memory relay contacts CR2–3, shown in FIGURE 11 and also near the center of FIGURE 4C, complete circuit for tube V1.

The entire plate circuit is shown in FIGURE 11 and includes the plate of tube V1, resistor R47, normal timing relay coil CR5–C, transfer relay contacts CR10–2 in the position shown, stop timing relay contacts CR6–1 in the position shown, step switch interrupter contact CR7–INT–C in the position shown, line 28, unit connector UC1–20, a jumper to unit connector UC1–22, the coordinating contacts, unit connector UC2–2, line L5, detector memory relay contact CR2–3 when closed, line L48, unit connector UC1–7, and line L1.

In non-coordinated operation, as when connectors UC1–20 and UC1–22 are bridged, the plate circuit will be completed as soon as a detector actuation occurs. In coordinated operation, the plate circuit is not completed after detector actuation and closure of memory relay contacts CR2–3 until the coordinating contacts close. The coordinating contacts may be controlled by a local controller at an adjacent intersection or by a master controller. The former is termed mutual coordination. As soon as the coordinating contacts are closed after a detector actuation occurs after the controller has begun its dwell interval, the plate circuit is completed through the circuit described above. During the half cycles of alternating line potential when line L4 and the plate of tube V1 are positive with respect to line L1 and the cathode of tube V1, the tube conducts and energizes the normal timing relay coil CR5–C. Contacts CR5–1, bottom of FIGURE 4C, close and apply L1 power to the step switch operating coil CR7–C.

When the step switch operating coil is energized it operates the three interrupter contacts CR7–INT–A, –B, and –C. Contacts CR7–INT–C transfer and break the plate circuit for tube V1 and de-energize the normal timing relay coil CR5–C. Contacts CR7–INT–A close and apply power from line L4 to the left hand side of capacitor C2 through rectifier DR3 and resistor R40 to recharge capacitor C2. Contacts CR5–1 open and de-energize the step switch coil. The step switch operating spring advances the arms A1–A9 one position to the right to position 9.

In step switch position 9 the vehicle clearance 2 interval is timed; potentiometer R27 is switched into the circuit to control the timing of normal timing capacitor C2. The timing circuit is as described above in connection with FIGURE 5. The controller energizes the main street amber signal through unit connector UC1–1 and the Amber 2 relay coil. Power is derived from line L4 and is applied through stepping arm A3 to a contact at position 9 of bank 3 and thence to unit connector UC1–1 and the Amber 2 relay coil, which in turn energizes the amber signal for the main street.

During step switch position 9 the additional discharge circuit described in connection with FIGURE 6 is effective. The circuit includes the left hand side of capacitor C2, resistor R6, potentiometer R7, line L55, resistor R49, a contact at position 9 of step switch bank 2, stepping arm A2, and line L4. The circuit provides a discharge path in parallel with the normal timing resistor R2 and potentiometer R3 to reduce the duration of the interval.

At the expiration of the vehicle clearance 2 interval, the potential appearing at the left hand side of capacitor C2 has been reduced sufficiently to permit tube V1 to conduct. Tube V1 conducts through the normal timing relay coil CR5–C and the plate circuit described in connection with FIGURE 7. It includes the plate of tube V1, resistor R47, normal timing relay coil CR5–C, transfer relay contacts CR10–2 in the position shown, stop timing relay contact CR6–1 in the position shown, interrupter contacts CR7–INT–C in the position shown, and line L28.

In FIGURE 4A the circuit includes line L28, a contact at position 9 of bank 8, stepping arm A8, and line L1. During the positive half cycles of line L1 potential, tube V1 conducts through the normal timing relay coil CR5–C which is energized and which closes its contacts CR5–1 to energize the step switch coil CR7–C, FIGURE 4C. The step switch interrupter contacts operate as described above and de-energize coil CR5–C which opens contacts CR5–1 to de-energize the step switch coil. The operating spring advances the stepping arms to position 10, the red dwell 1 interval.

During the red dwell 1 interval, which is of very short duration, a predominately positive alternating potential is applied to the right hand side of normal timing capacitor C2 through coupling resistor R4 and line L16 in FIGURE 4C, and in FIGURE 4A line L16, stepping arm A6, a contact at position 10 of bank 6, unit connector UC1–15, resistor R51, resistor R53, and line L1. Resistors R52 and R53 are connected together in series between the 105 volt supply line L1. The potential appearing at their mid-connection is applied through coupling resistor R51 to the contacts at positions 10 and 11 of step switch bank 6. Thus, both the red dwell 1 and red dwell 2 intervals are timed by this RC combination and are of very short duration.

When the unit is operated as a fully actuated controller with one or more additional units, this external timing circuit is disconnected from unit connector UC1–15 and is not used. Each of the other actuable units is able to time the red dwell 1 and red dwell 2 intervals of the instant control unit while the other units have control.

The step switch therefore advances through both red dwell intervals, positions 10 and 11, and arrives at its special clearance 2 interval, step switch position 1.

SPECIAL CLEARANCE 2 INTERVAL

The interval timed during step switch position 1 may be used to time the main street amber signal as shown in FIGURE 3, Option 1, to time an all red clearance signal as shown in Option 2, to time an advance green interval as shown near the bottom of FIGURE 3, or its dial may be turned down to the index mark and the interval substantially eliminated. Potentiometer R26, FIGURE 4A and dial SC2, FIGURE 2A, control the duration of the interval, and a load relay connected to unit connector UC1–5 controls the signal display.

The timing circuit includes the short timing circuit shown in FIGURE 6, and a normal timing circuit similar to that shown in FIGURE 5 except that potentiometer R26 is substituted for potentiometer R28. At the expiration of the clearance interval the step switch advances to position 2 which corresponds to the minimum initial and the density initial intervals. The two timing circuits time concurrently, one to determine the duration of the density initial interval and the other to set a minimum interval lass than which the period cannot time. Without the minimum timer each increment of time added by the density timer would have to be sufficiently long to permit a stopped vehicle to start up and proceed through the intersection. This setting, multiplied by the number of vehicles stopped, would be too long when a large number of vehicles is stopped and would result in a needlessly long period. The density initial interval is therefore provided to permit the time added per vehicle actuation to be kept to a low value so that traffic may be handled efficiently at the intersection.

The minimum interval is provided to permit timing a single vehicle through the intersection; it is apparent that if no minimum interval timer were provided the density initial timer would have to be turned up to provide sufficient time for a single vehicle. Then, when a number of vehicles actuated the detector during the time right of way is denied, the intial interval would extend beyond the time normally required to permit the passage of a number of vehicles after the vehicles have been allowed to start up and proceed through the intersection.

The density initial interval is timed by the circuit shown at the top of FIGURE 4C and described above in connection with FIGURE 8. The density timing circuit is connected to grid G1 of tube V1 through contacts CR3–1 which are not transferred from the position shown in FIGURE 4C, as shown in simplified form in FIGURE 13. The second grid G2 is connected to the normal timing circuit which includes resistor R2, potentiometer R3 and the source of alternating potential including resistors R4 and R5 and potentiometer R10, FIGURE 4A. With the two timing circuits connected to the respective grids of tube V1, both must be timed out to permit tube V1 to conduct.

Referring for a moment to FIGURE 8, it will be recalled that capacitor C4 permitted the density timing capacitor C5 to accumulate an increment of charge for each detector actuation during the time right of way is denied to the cross street. This charging circuit included line L2, density relay contacts CR3–2, rectifier DR4, resistor R39, the left hand side of capacitor C5, the right hand side of capacitor C5, vehicle detector relay contact CR1–2 when transferred, capacitor C4, line L19, contacts at positions 1 and 6–11 of step switch bank 9, stepping arm A9, and line L1. For each detector actuation and transfer of detector relay contacts CR1–2, capacitor C5 assumes an increment of charge during each of these seven step switch positions. The discharge circuit around capacitor C5 is opened at contacts CR2–2 as soon as the first detector actuation occurs and energizes the detector memory relay coil CR2–6 to transfer relay contacts CR2–2.

At the beginning of the density initial interval the charge on capacitor C5, FIGURE 13, attempts to reduce itself through potentiometer R8 and resistor R9 and the detector memory relay contacts CR2–2. The discharge circuit is completed during step switch positions 2, 3, and 4 which correspond to the cross street right of way period. During such period L1 power is applied through stepping arm A5 to contacts at positions 2, 3, and 4, step switch bank 5, FIGURE 4A, and thence through line L25 in FIGURES 4A, 4C and 4D, through unit connectors UC2–23 and UC2–24, to the maximum select relay coil CR4–C shown near the bottom of FIGURE 4D.

When the maximum select relay CR4–C is energized during step switch positions 2, 3, and 4, the discharge circuit is completed through detector memory relay contacts CR2–2 which are now transferred from the position shown in FIGURE 4C to that shown in FIGURE 13. The discharge circuit includes the left hand side of capacitor C5, potentiometer R8, resistor R9, detector memory relay contacts CR2–2 in the transferred position, now closed maximum select relay contact CR4–3, and a line to the right hand side of capacitor C5. An alternating potential is applied to the right hand side of capacitor C5 through the circuit described in connection with FIGURE 8. This includes in FIGURE 4A, line L1, stepping arm A9, a contact at position 2 of bank 9, line L29, and in FIGURE 4C, line L29, line L29', resistor R12, a portion of potentiometer R25, the tap of potentiometer R25, coupling resistor R13, now transferred contact CR2–2, now closed contact CR4–3, and a line to the right hand side of capacitor C5.

During the density initial interval the density relay coil CR3–C is energized. The circuit includes in FIGURE 4A, line L1, stepping arm A9, the contact at position 2 of bank 9, and L29, and in FIGURE 4C, line L29, density relay coil CR3–C, and line L2. This portion of the circuit is also shown in FIGURES 8 and 13 in simplified form. Density relay contacts CR3–2 open during the density initial interval to disconnect the timing capacitor C5 from its charging circuit. Density relay contacts CR3–1 transfer to disconnect the grid G1 from line L4 and to connect it to the timing capacitor C5.

Tube V1 acts as an AND circuit during step switch position 2. Both control grids must assume an almost zero potential in order to permit V1 to conduct. Thus, both the density timing circuit and the minimum timing circuit must be timed out before tube V1 can conduct. This is a distinct improvement over prior art controllers which required separate tubes for each timing function. Thus two intervals are timed concurrently, the minimum interval being determined by the setting on potentiometer R10 and the density interval timed by the number of actuations occurring during the prior red signal. The density initial interval is timed proportional to the number of vehicles stored on the cross street waiting for right of way. When both of these intervals are timed out, tube V1 is permitted to conduct and energize its plate circuit relay coil CR5–C, FIGURE 4C, which in turn closes contacts CR5–1 to energize the step switch operating coil CR7–C and advance the step switch arms to position 3.

During step switch position 2 the plate circuit for tube V1 is completed through stepping arm A8 and a contact at position 2 of bank 8. The circuit includes in FIGURE 4C, the plate of tube V1, resistor R47, a normal timing relay coil CR5–C, transfer relay contacts CR10–2, stop timing relay contact CR6–1, interrupter contacts CR7–INT–C, and line 28. In FIGURE 4A the circuit includes line L28 and a line to unit connector UC1–20. Within rack R or terminal facilities T unit connector UC1–20 is jumpered to unit connector UC1–22. Within the unit, unit connector UC1–22 is connected to a contact at position 2 of bank 8. The circuit derives L1 power from stepping arm A8 which is permanently connected to line L1.

At the expiration of the combined density and minimum initial interval the step switch is advanced to position 3, the green dwell interval.

GREEN DWELL INTERVAL

When the control unit is operating as a semi-actuated device, interval 3 is of very short duration. The step switch off normal contacts CR7–A, bottom of FIGURE 4A, are closed only in step switch position 3 and are utilized during that position to complete an L1 circuit to the step switch operating coil CR7–C. The circuit includes in FIGURE 4D, line L1 shown near the center of the right hand border, now transferred maximum select relay contact CR4–2 and line L42. In FIGURE 4C, the circuit includes line L42, now closed step switch off-normal contacts CR7–A, interrupter contacts CR7–INT–B, step switch operating coil CR7–C, rectifier DR8, and line L4.

Maximum select relay contacts CR4–2 mentioned in the paragraph above are closed because power is available to the maximum select relay coil CR4–C, FIGURE 4D, from line L25 in FIGURES 4D, 4C, and 4A, and contacts at positions 2, 3, and 4 of bank 5. When the unit is used as a semi-actuated controller, the maximum select relay coil CR4–C is energized each cycle during positions 2, 3 and 4, because L1 power is continuously applied to stepping arm A5 through unit connector UC2–3. When the step switch coil CR7–C is energized through the circuit described above, it operates its interrupter contacts CR7–INT–B which break the L1 circuit to the coil and cause it to de-energize. Capacitor C10 is connected in parallel with the step switch operating coil and is of large capacitance and serves to store energy to retain the coil enrgized for a moment after L1 power is interrupted.

When the step switch operating coil is de-energized it permits the operating spring to advance the step switch arms to position 4 where the unit extension interval is timed. Thus, interval 3 is not actually timed and the plate circuit to tube V1 need not be completed during this interval. Indeed, the plate circuit is deprived of L1 power by the absence of a line to the contact at position 3 of step switch bank 8. The jumper F, FIGURE 4A, is removed for semi-actuated operation.

When the device is used as part of a fully actuated controller the unit dwells in interval 3 until an actuation occurs on another phase. The maximum select relay coil CR4–C, FIGURE 4D, is not energized until such actuation occurs and applies L1 power through unit connector UC2–3 to stepping arm A5. Thus, the maximum select relay contacts CR4–2 remain in the position shown in FIGURE 4D and do not energize line L42 and the step switch operating coil.

Capacitor is recharged during interval 3 so that it will be fully charged and able to time the unit extension interval during step switch position 4. The complete circuit includes in FIGURE 4A, line L4, stepping arm A1, a contact at position 3 of bank 4, and line L21. In FIGURE 4C the circuit includes line L21, vehicle detector relay contacts CR1–4, rectifier DR3, resistor R40, the left hand side of capacitor C2, the right hand side of capacitor C2, vehicle detector relay contacts CR1–6 when closed, and line L61. In FIGURE 4A the circuit includes line L61, unit connector UC1–16, jumper F to unit connector UC1–19, a contact at position 3 of bank 8, stepping arm A8, and line L1. The jumper F is installed only when the unit is used as part of a fully actuated controller.

UNIT EXTENSION INTERVAL

The unit extension interval is provided to time the second portion of the cross street right of way period in proportion to the number of vehicles actuating the detectors during such period. When the device is operated as a semi-actuated controller the unit extension interval is started immediately after the density and minimum initial interval. When the device is part of a fully actuated controller the unit extension interval is not started until an actuation occurs on another phase.

Assuming that the device is operating as a semi-actuated controller, one unit extension interval will be timed automatically immediately after the initial interval since the dwell interval, step switch position 3, is substantially eliminated. Potentiometer R30, FIGURE 4A, controls the duration of timing of the normal timing circuit including capacitor C2 and tube V1. The setting of dial EXT determines the position of the tap on potentiometer R30 and thus the duration of each unit extension interval.

The timing circuit including capacitor C2 and tube V1 is as described above in connection with FIGURE 7. The discharge circuit in FIGURE 4C includes resistor R2 and potentiometer R3, and the potential reducing circuit including resistor R4, line L16, and in FIGURE 4A includes line L16, stepping arm A6, a contact at position 6 of bank 6, resistor R44, a contact at position 6 of bank 7, arm A7, resistor R50, and line L1.

If no further actuations occur during interval 4 the step switch operating coil CR7–C is energized through contacts CR5–1 and advances the stepping arms to position 5.

The timer may be reset during the unit extension interval by detector actuations and closure of vehicle detector relay contacts CR1–4 and CR1–1. The circuit includes in FIGURE 4A, line L4, stepping arm A1, a contact at position 4 of bank 1, and line L21. In FIGURE 4C the circuit includes line L21, detector relay contacts CR1–4, rectifier DR3, resistor R40, capacitor C2, detector relay contacts CR1–1, detector memory relay contacts CR2–1, and line L18. In FIGURE 4A it includes line L18, a contact at position 4 of bank 8, stepping arm A8 and line L1.

This recharging circuit is closed only while one of the vehicle detectors is actuated and while the memory relay coil CR2–C is de-energized and contacts CR2–1 are in the position shown in FIGURE 4C.

Whenever one of the detectors D1–D4 is actuated and the detector relay coil CR1–C is energized, contacts CR1–4 and CR1–1 close momentarily and permit unidirectional power to charge capacitor C2 during the half cycles of alternating line potential when line L1 is positive with respect to line L4. A negative charge therefore accumulates on the left hand side of capacitor C2 during each detector actuation. The impedance of the circuit is low enough to permit rapid and full charge during each actuation. The detector relay memory contacts CR2–1 are kept from transferring during step switch position 4 because the normal source of L4 holding power is broken at bank 1 of the step switch. The detector memory relay holding circuit is not energizable during step switch position 2, 3, or 4 as evidenced by the lack of connections to contacts at these positions in step switch bank 1, FIGURE 4A.

MAXIMUM TIMING PERIOD

The cross street maximum timing period starts at the beginning of interval 2 and continues to time through intervals 2, 3, and 4. The maximum timing circuit described in connection with FIGURE 7 and illustrated completely in FIGURE 4D controls the maximum duration of the unit extension interval. As shown in FIGURE 4D, the transfer of maximum select relay contacts CR4–2 interrupts the recharging circuit for the maximum timing capacitor C6.

It will be recalled that the maximum timing capacitor C6 was charged through the cathode-to-grid circuit of tube V2. It will also be recalled in connection with the description of FIGURE 9 that an alternating potential was applied to the right hand side of capacitor C6 during step switch positions 2, 3, and 4. This circuit is shown at the bottom of FIGURE 9. When the control unit is used as part of a fully actuated controller, L1 power is not applied to stepping arm 45 until an actuation occurs on another phase. This insures that the maximum timer will not start timing at the beginning of interval 2 but will wait until a detector actuation on a phase having a stop signal.

The maximum timer times through tube V2 but it does not have its own plate circuit relay. Its plate circuit conducts through the normal timing relay coil CR5–C as shown in FIGURE 4C. This eliminates the need for a maximum plate circuit relay, reduces the complexity of the circuit, and constitutes an improvement over known circuits.

The maximum timing plate circuit is shown in FIGURE 12. It will be noted that the normal timing tube V1 and the maximum timing tube V2 have their plate circuits connected in parallel through the normal timing relay coil CR5–C, which serves as common interval terminating means for initiating termination of an interval whether it is energized by tube V1 or tube V2. The maximum timing plate circuit is also able to conduct through the detector memory relay coil CR2–C. The normal timing plate circuit is prevented from conducting through the memory relay coil by the action of rectifier DR2. Likewise, rectifier DR5 prevents the external recall circuit shown at the top of FIGURE 4D from energizing the normal timing relay coil CR5–C. Thus, rectifiers DR2 and DR5 serve as circuit means for coupling the phase calling means, i.e., coil CR2–C, with tube V1 and V2 in such a manner that coil CR2–C will be energized only when the tube V2 is conducting current.

The grid control circuits are shown in symbolic form in FIGURE 12 and include the normal timing circuit of grid G1 of tube V1 and the maximum timing circuit for the "control" grid of tube V2. The "screen" grids in both tubes are connected to line L4 as are the cathodes of the tubes. Therefore, when either the normal timing circuit or the maximum timing circuit times out, one of the tubes will conduct. It will be recalled that the grid nearest the cathode is used as a shield grid and the grid nearest the plate is used as the control grid. This is the reverse of normal procedure and nomenclature.

If the normal timing circuit conducts first, indicating that all detector actuations on the cross street have been satisfied, tube V1 will conduct through the normal timing relay coil CR5–C. Rectifier DR2 prevents conduction through the memory relay coil CR2–C. The complete plate circuit includes line L4, the cathode of tube V1, the plate of tube V1, resistor R47, normal timing relay coil CR5–C, transfer relay contacts CR10–2 in the position shown, stop timing relay contacts CR6–1 in the position shown, interrupter contacts CR7–INT–C, detector relay contacts CR1–1, detector memory relay contacts CR2–1, line L18, and unit connector UC1–11. External to the unit, a jumper connection is made between unit connector US1–11 and unit connector UC1–18. Within the unit the circuit includes a line from unit connector UC1–18 to a contact at position 4 of blank 8, stepping arm A8, and line L1. This circuit is also shown in FIGURES 4C and 4A, but the simplified diagram makes the circuit more easy to follow.

Should cross street traffic attempt to hold the cross street right of way beyond the maximum cross street interval, the maximum timing circuit would permit capacitor C6 to discharge sufficiently to cause tube V2 to conduct. The plate circuit for tube V2 consists of the parallel circuit including the normal timing relay coil CR5–C and the memory relay coil CR2–C shown in FIGURE 12. The common portion of the circuit includes line L4, the cathode of tube V2, the plate of tube V2, unit connector UC2–17, a jumper to unit connector UC2–18, and the maximum select relay contacts CR4–1 in the energized condition shown in FIGURE 12. One parallel portion of the circuit includes rectifier DR2, resistor R47, normal timing relay coil CR5–C and the remainder of the circuit enumerated above in connection with tube V1. The other parallel portion of the circuit includes rectifier DR5, memory relay coil CR2–C, and line L1. Power is also supplied through rectifier DR7 and limiting resistor R22 to the pedestrian memory pilot light PL5.

As soon as the memory relay coil CR2–C is energized it transfers contacts CR2–1 located in the normal timing plate circuit. The transfer of contacts CR2–1 has no overall effect on the plate circuit since another path is provided between line L28 and line L18 to replace the path broken by the transfer of contacts CR2–1.

When the normal timing relay coil CR5–C is energized it closes contacts CR5–1 which energize the step switch coil CR7–C. When the step switch coil is energized it operates interrupter contacts CR7–INT–C which break the plate circuit to the normal timing relay coil CR5–6. This de-energizes the normal timing relay and causes contacts CR5–1 to open and de-energize the step switch coil. The step switch advances its stepping arms to position 5 where the vehicle clearance 1 interval is timed. In step switch position 5 the maximum select relay coil CR4–C is de-energized and contacts CR4–1 open to break the plate circuit of tube V2.

Memory relay coil CR2–C remains energized through the holding circuit including rectifier DR7, the memory relay contacts CR2–5 which are now closed, line L11, contacts at banks 1 and 5–11 of step switch bank 1, stepping arm A1, and line L4. Power flows through this circuit to retain the memory relay energized through all step switch positions until positions 2, 3, and 4. During the latter positions the holding circuit is broken to make the memory relay coil responsive to the maximum timing circuit. The memory relay simulates a vehicle detector actuation and causes the controller to operate through another cycle after it times a minimum main street green interval.

VEHICLE CLEARANCE 1 INTERVAL

When the unit extension interval times out due to lack of detector actuations or the maximum interval times out and advances the unit to step switch position 5, the unit times the vehicle clearance 1 interval. The interval is used in both Options 1 and 2, FIGURE 3, to time the cross street amber interval. It is used in a fully actuated controller to time the amber signal after the normal green period.

The normal timing circuit including potentiometer R11 and the fast timing circuit described in connection with FIGURE 6 govern the duration of the interval. Both timing circuits are also shown in FIGURES 4C and 4A. Capacitor C2 discharges through resistor R2 and potentiometer R3, and through the fast timing circuit including in FIGURE 4C, resistor R6, potentiometer R7, line L55 and in FIGURE 4A, line L55, contacts at positions 5 and 6 of bank 5, stepping arm A5, unit connector UC2–3, and jumper S1 to line L1. Alternating potential is also supplied to the right hand side of capacitor C2 through a circuit in FIGURE 4A including line L1, resistor R50, stepping arm A7, a contact at position 5 of bank 7, potentiometer R11, a line from the tap of potentiometer R11 to a contact at position 5 of bank 6, stepping arm A6, line L16, and in FIGURE 4C, line L16, and resistor R4.

At the expiration of the vehicle clearance 1 interval the normal timing tube V1 conducts and energizes relay coil CR5–C which closes its contacts CR5–1 and energizes the step switch operating coil CR7–C. The latter operates its interrupter contacts in the manner described and thereafter advances the stepping arms to position 6.

SPECIAL CLEARANCE 1 INTERVAL

The special clearance 1 interval is timed similarly to the vehicle clearance 1 interval. Potentiometer R29 is substituted for potentiometer R11, FIGURE 4A. The rapid timeout circuit connected to contacts at positions 5 and 6 of step switch bank 5 is identical for both intervals.

It will be noted in the signal sequences of FIGURE 3 that each of the signal indications is the same in the special clearance 1 interval, position 6, as it is in the Green 2 interval, position 7. Therefore, the dial SC1 in FIGURE 2A could be turned down to the index mark and the interval substantially omitted.

The interval is useful as an all red clearing interval between the first and second phase movements and in many applications is used for such purpose.

At the expiration of the interval the step switch operating coil CR7–C is energized as in interval 5 and when de-energized advances the stepping arms to position 7.

GREEN 2 INTERVAL

In step switch position 7 a semi-actuated unit times the main street minimum interval; in a fully actuated controller the unit would time the latter portion of the delayed green period as shown near the bottom of FIGURE 3. Dial G2, FIGURE 2A and potentiometer R28, FIGURE 4A, control the duration of the interval.

The interval is usually of such duration to supply main street traffic with an adequate right of way period between successive cross street periods. It is a guaranteed interval and cannot be reduced by detector actuation. At the expiration of the interval as timed by potentiometer R28 the normal timing relay coil CR5–C is energized and closes contacts CR5–1 to energize the step switch operating coil CR7–C. The latter operates in the manner described above and advances the stepping arms to position 8.

GREEN DWELL AND PHASE SELECT

The first portion of interval 8 is timed very rapidly by the normal timing circuit and the voltage divider consisting of resistors R44 and R45. The step switch is as shown in FIGURE 4A.

During step switch position 8 the normal timing circuit is as shown in FIGURE 7. It will be noted that the plate circuit for tube V1 is broken and can be completed only by closure of detector memory relay contacts CR2–3. Contacts CR2–3 are also shown near the right hand border of FIGURE 4C (but the circuit is not as easy to trace).

The unit therefore dwells in position 8 until a vehicle or pedestrian actuation occurs and the detector memory relay contacts CR2–C are closed. Thus the unit has completed a full cycle of operation.

After the control unit times a minimum main street green interval the detector memory circuit is able to recall the controller to display at least a minimum cross street right of way period after the prior cross stress right of way period has been interrupted by operation of the maximum timer. The recall is effected by completing the plate circuit during step switch position 8. The timing and control circuits employed with the step switch make it a cyclic device which is able to time through the successive intervals and dwell only in step switch position 8 if no actuation has occurred on the cross street. Lack of actuation is evident when the memory relay is de-energized.

Referring again to FIGURE 11, the simplified diagram of the plate circuit for the normal timing tube V1, it is apparent that the detector memory relay contacts CR2–3 will be closed when the detector memory relay coil, CR2–C, FIGURE 12, is energized. Thus, when the coordinating contacts CR-ORD between unit connectors UC1–22 and UC2–2 are closed at the proper time in the cycle, the plate circuit for tube V1 is completed.

The first portion of the green dwell interval, step switch position 8, has been timed by the potential divider consisting of resistors R44 and R45 as was described above at the beginning of this section. The second portion of the dwell interval is long if no actuation has occurred and if the memory relay is not energized. However, if the memory relay is energized and contacts CR2–3 are closed, the second portion of the dwell interval is of substantially zero duration because the step switch advances rapidly through position 8. After moving out of position 8 the step switch times through positions 9, 10, 11, and 1 as described above and arrives at the density initial interval, step switch position 2.

In step switch position 2 the device times the minimum interval concurrently with the density initial interval. If no vehicle actuation has occurred prior to this interval, the density initial interval will time out substantially immediately. However, the minimum timer will timer for whatever interval is set on the minimum dial MI, FIGURE 2A. At the expiration of the minimum interval the step switch advances to position 3 and then advances to interval 4 substantially instantaneously. The unit times through step switch position 3 almost immediately because off normal contacts CR7–A are closed and supply L1 power through maximum select relay contacts CR4–2 and interrupter contacts CR7–INT-B to step switch coil CR7–C. The interrupter contacts CR7–INT-B open as soon as the coil is fully energized and interrupt the coil and cause it to de-energize and advance the step switch to position 4.

In step switch position 4 the unit times one unit extension interval whose duration is controlled by the setting of potentiometer R30. At the expiration of the one unit extension interval, if no detector actuations occurred during the cross street right of way, the unit times out and advances to the vehicle clearance 1 interval, during which the amber signal to the cross street is illuminated. Thereafter the device times through the minimum main street green interval and arrives and dwells in step switch position 8.

Having described most of the circuitry employed with the vehicle actuated control and timing portions of the device, the pedestrian actuated portion will now be described.

PEDESTRIAN CYCLE

The signal sequence and cycle of operation following pedestrian detector actuation will now be described. Reference will be made to FIGURES 1A and 4A–4D.

Assume that the controller is dwelling in step switch position 8 with the right of way signals S illuminated to the main street and the stop signals illuminated to the cross street. The Don't Walk signals DW at the ends of the pedestrain crosswalks across the main street and the Walk signals W' parallel with the main street are also illuminated. Assume now that a pedestrain desires to cross the main street and depresses one of the buttons PB.

Referring to the circuit diagram shown near the bottom of FIGURE 4B, the pedestrian pushbutton PB is located between unit connector UC1–2 and line L1. The pedestrian detector relay coil CR12–C is connected between unit connector UC1–2 and unit connector UC2–1 to which a low voltage such as twelve volts is applied. Operation of the pushbutton PB serves to complete the circuit and energize the detector relay coil CR12–C.

When the pedestrian detector relay coil CR12–C is energized it closes or transfers its three sets of contacts, CR12–1, –2, and –3. Contacts CR12–1 transfer and illuminate the pedestrian detector pilot light PL4 and also supply a holding circuit for coil CR12–C; contacts CR12–2 close and partially complete a circuit to the pedestrian step switch operating coil CR8–C, and contacts CR12–3 complete a circuit to the detector memory relay coil CR2–C, FIGURE 4D. Each of these circuits will be described in detail.

Energization of relay coil CR12–C causes contacts CR12–1 to transfer and remove L1 power from the left hand side of detector pilot light PL4. Transfer of contacts CR12–1 also supplies a holding circuit to the L1 side of relay coil CR12–C. The holding circuit includes line L1, pedestrian step switch contacts CR8–4–1 in the position shown, now transferred contacts CR12–1, relay coil CR2–C, unit connector UC2–1, and the twelve volt supply. The low voltage is supplied by a secondary of a transformer in the terminal facilities. Low voltage is employed to safeguard the pedestrian.

When the pedestrian detector relay is energized, contacts CR12–2 also close. They are shown near the top of FIGURE 4B. Closure of these contacts partially completes an L1 circuit to the pedestrian step switch operating coil CR8–C. The circuit includes line L4, rectifier DR15, maximum interval deactivating means including pedestrian step switch relay coil CR8–C, now closed pedestrian detector relay contacts CR12–2, pedestrian step switch interrupter contacts CR8–INT–B, pedestrian step switch contacts CR8–1–2, and line L15. Line L15 connects through FIGURES 4C and 4A and in the latter figure connects to a contact at position 1 of step switch bank 5. Thus, during step switch position 1, stepping arm A5 is enabled to apply L1 power to the pedestrian step switch operating coil to advance it from the reset position to its walk position. It is to be noted that this circuit is not complete until the main step switch reaches position 1.

When the pedestrian detector relay is energized it also closes contacts CR12–3 shown near the top of FIGURE 4D. Closure of contacts CR12–3 results in the energization of the detector memory relay coil CR2–C.

When the detector memory relay coil CR2–C is energized it closes its contacts CR2–3 shown in the simplified diagram of FIGURE 11 to complete the plate circuit for tube V1. The main step switch will advance from its dwell position, step switch position 8, as soon as the external coordinating contacts CO–ORD close after the detector memory relay contacts CR2–3 close. The purpose of the coordinating contacts CO–ORD is to delay the termination of the main street green interval until the proper time so as to maintain progression along the thoroughfare. At an isolated intersection the contacts may be bridged by inserting a jumper between unit connectors UC1–22 and UC2–2.

When the plate circuit for tube V1 as shown in FIGURE 11 is completed, tube V1 will conduct. The discharge of its RC timing circuit will normally permit the tube to conduct a few moments after the beginning of the interval. The timing of the green dwell interval is determined by the potential derived from the midpoint of the potential divider consisting of resistors R44 and R45. This potential is normally set to provide time out in approximately one-half second.

The plate circuit is as shown in FIGURE 11 and is as described in connection with that figure. The purpose of energizing the detector memory relay is to simulate a call from a cross street detector to cause the unit to move through a cycle of timing.

The step switch in the unit times and advances through positions 9, 10, and 11 and arrives at the special clearance 2 interval, step switch position 1. Stepping arm A5 applies L1 power to the contact at position 1 and thence to line L15. In FIGURE 4B, the application of L1 power to line L15 results in the energization of the pedestrian step switch operating coil CR8–C through the circuit including contacts CR12–2.

The complete circuit includes in FIGURE 4B, line L4, rectifier DR15, step switch operating coil CR8–C, now closed pedestrian detector relay contacts CR12–2, pedestrian step switch interrupter contacts CR8–INT–B, contacts CR8–1–2, and line L15. In FIGURES 4C and 4A the circuit includes line L15, a contact at position 1 of bank 5, stepping arm A5, unit connector UC2–3, jumper S1, and line L1.

As soon as the step switch operating coil is fully energized it operates interrupter contacts CR8–INT–B which open and de-energize the step switch coil. Like the main step switch, the pedestrian step switch advances its cams when its main drive coil CR8–C is de-energized. Thus, when interrupter contacts CR8–INT–B interrupt the circuit the coil becomes de-energized and advances its cams from the reset interval to the walk interval. The walk signals are not energized immediately but are withheld until the main step switch advances to position 2.

When the step switch in the unit times through position 1 and arrives at the minimum and density initial interval, step switch position 2, stepping arm A5 applies L1 power to the contact at position 2 of bank 5. Contacts at positions 2, 3, and 4 are connected to line L25 and thence to the maximum select relay coil CR4–C. The circuit includes in FIGURE 4A line L1, jumper S1, unit connector UC2–3, stepping arm A5, contacts at positions 2, 3, and 4 of bank 5, and line L25. In FIGURES 4C and 4D the circuit includes line L25, unit connectors UC2–23 and UC2–24, maximum select relay coil CR4–C, and line L2.

The maximum select relay coil CR4–C, FIGURE 4D, is energized during each signal sequence to make the maximum timer effective and to provide power at the step switch off normal contacts CR7–A, bottom of FIGURE 4C, to permit the unit to advance through the green dwell interval, step switch position 3. During a pedestrian cycle, however, the maximum timer is disabled by the opening of pedestrian step switch contacts CR8-3-1 in the plate circuit through which the maximum timer conducts. This disables the maximum timer during the pedestrian sequence to guarantee that the pedestrian clearance interval will receive its full time.

During the step switch positions 2, 3, and 4 the cross street green signal is illuminated and L4 power from the cross street green relay is applied to unit connector UC1-3, FIGURE 4B. Transfer relay coil CR10-C is connected between unit connector UC1-3 and line L1 and is energized during the cross street green right of way period. Energization of the transfer relay results in the transfer of contacts CR10-1 which complete the plate circuit for the pedestrian timing tube V3 shown near the center of FIGURE 4B and in simplified circuit diagram in FIGURE 10.

Referring to FIGURE 10, the plate circuit for tube V3 includes line L4, the cathode of tube V3, the plate of tube V3, pedestrian plate circuit relay coil CR9-C, step switch interrupter contacts CR8-INT-C, pedestrian step switch contacts CR8-1-1 transferred to the position indicated by the dashed line, transfer relay contacts CR10-1 in the position indicated by the dashed line, and line L1. While the plate circuit is completed, the timing capacitor recharging circuit is broken, and the capacitor reducing potential circuit is completed.

The pedestrian timing capacitor C1 has its normal charging circuit broken by the transfer of contacts CR10-1. The transfer of relay contacts CR10-1 also applies L1 power to potentiometers R31 and R32. Potential from their taps is applied to the right hand side of capacitor C1 through pedestrian step switch contacts CR8-2-1 and coupling resistor R35.

WALK INTERVAL

The pedestrian Walk interval is started coincident with the start of the minimum interval by the application of L4 power from the cross street green relay as described above. The pedestrian step switch was advanced to its walk position when the main step switch advanced into interval 1. It will be recalled that the walk signal was not illuminated immediately but had to wait until the cross street green relay was energized at the beginning of interval 2. The transfer relay coil CR10-C was energized coincident with the walk relay coil CR17-C and simultaneously started the timing of the walk interval.

The walk interval is thus started during the first portion of the cross street green interval. The duration of the walk interval is determined by potentiometer R32. An alternating potential is applied to the right hand side of capacitor C1 from line L1, now transferred contacts CR10-1, the right hand portion of potentiometer R32, the tap of potentiometer R32, now transferred step switch contacts CR8-2-1, and coupling resistor R35. The normal discharge loop consists of resistor R33 and potentiometer R34.

While the walk interval is timing, pedestrian step switch contacts CR8-2-2 are closed and apply L4 power to the walk relay coil CR17-C through unit connector UC1-4. They also apply L4 power through blocking resistor R34 to pilot light PL2, to indicate that the walk interval is being timed. The detector memory relay coil CR12-C is de-energized at the beginning of the walk interval by the opening of transfer relay contacts CR10-3.

The pedestrian memory pilot light PL4 shown at the bottom of FIGURE 4B is de-energized during the walk interval by the application of L1 power to both of its leads through still transferred contacts CR8-4-1 and still closed contacts CR10-3.

When the walk interval has transpired the potential appearing at the grid of tube V3 becomes sufficiently less negative to permit tube V3 to conduct. Tube V3 conducts through its plate circuit relay coil CR9-C which becomes energized and which operates contacts CR9-1, shown near the top of FIGURE 4B.

When contacts CR9-1 close they apply L1 power to the right hand side of the pedestrian step switch operating coil CR8-C. The pedestrian step switch coil CR8-C is energized and operates its interrupter contacts. Contacts CR8-INT-B are ineffective because no power is available on line L15.

Contacts CR8-INT-C operate to break the plate circuit and to complete the recharging circuit for capacitor C1. When the pedestrian timing plate circuit is broken, relay coil CR9-C is de-energized and contacts CR9-1 are opened to de-energize the pedestrian step switch operating coil CR8-C. The pedestrian step switch advances to its Wait interval 3. The interrupter contacts re-transfer and break the capacitor C1 charging circuit and remake the plate circuit. Pedestrian step switch contacts CR8-2-1 re-transfer to the position shown in FIGURES 10 and 4B and complete the circuit from the guaranteed pedestrian clearance timing potentiometer R31 to the right hand side of capacitor C1. The guaranteed pedestrian clearance interval is thus determined by the setting of potentiometer R31.

GUARANTEED PEDESTRIAN CLEARANCE INTERVAL

When the interrupter contacts CR8-INT-C retransfer to the position shown in FIGURES 10 and 4B they recomplete the plate circuit for tube V3 and open the recharge path for capacitor C1. Capacitor C1 and the discharge circuit including resistors R33 and potentiometer R34, and the AC potential reducing circuit including potentiometer R31, determine the duration of the guaranteed pedestrian clearance interval.

When contacts CR8-2-2 retransfer to the position shown in FIGURE 4B they de-energize the walk relay coil CR17-C and the Walk pilot light PL2. The walk signals are thus extinguished and the don't walk signals are illuminated. They will be illuminated for a fixed time before the main street will again be given right of way. This insures the pedestrian of an exclusive right of way interval.

When the potential appearing at the left hand side of capacitor C1 and at the grid of tube V3 becomes sufficiently less negative or more positive to permit tube V3 to conduct, tube V3 conducts and energizes its circuit relay coil CR9-C. The latter coil causes contacts CR9-1 to close, applying L1 power to the right hand side of pedestrian step switch coil CR8-C. The pedestrian step switch interrupter contacts CR8-INT-C transfer and break the plate circuit to tube V3 and de-energizes the plate circuit relay coil CR9-C. Contacts CR9-1 open and de-energize step switch coil CR8-C. This causes the pedestrian step switch cams to advance from the wait interval to the reset interval.

The stepping of the pedestrian step switch causes no change in pedestrian signal indication. The Don't Walk signals remain energized. The closure of pedestrian step switch contacts CR8-3-1, FIGURE 4C, however, recompletes the normal timing plate circuit shown in FIGURE 4C. The minimum initial timing circuit can be assumed to be timed out because the minimum initial interval is normally much shorter than the pedestrian walk and clearance intervals. The density timing circuit is also timed out because it was assumed that no vehicle detector actuation had occurred prior to the time the pedestrian pushbutton was actuated. If one or more vehicle actuations had occurred during any of the step switch positions 5, 6-11, or 1 the density initial timer would have received some charge, but this would have had adequate time to discharge during the walk and clearance intervals.

Therefore, as soon as the normal timing plate circuit is completed by the closure of contacts CR8-3-1, tube V1 conducts and energizes its normal timing relay coil CR5-C. Energization of the normal timing relay coil causes the closure of contacts CR5-1 and the energization of the step switch operating coil CR7-C. Operation of interrupter contacts CR7–INT–C interrupts the plate circuit but does not recharge capacitor C2. Opening of contacts CR5–1 de-energizes the step switch coil CR7–C which causes the step switch arms to advance to step switch position 3.

During step switch position 3 the off normal contacts CR7–A shown at the bottom of FIGURE 4C apply L1 power from line L42 to the step switch operating coil CR7–C and cause it to be energized. Subsequent operation of the interrupter contacts CR7–INT–B de-energizes the step switch coil and advances the stepping arms to position 4.

In step switch position 4, one unit extension interval is timed as is the normal practice for this interval. At the expiration of the interval, whose duration is determined by the setting of potentiometer R30, FIGURE 4A, the normal timing circuit times out and advances the step switch to position 5 where the vehicle clearance interval for the cross street is timed. The step switch continues to advance through positions 6 and 7 and arrives at the green dwell 2 interval, step switch position 8, where it dwells until further pedestrian or vehicle actuation.

Since the maximum timing circuit was not permitted to conduct during the pedestrian walk or guaranteed clearance intervals, the detector memory relay coil CR2–C is not energized. However, if detector actuations during step switch position 4 had attempted to retain the right of way on the cross street beyond the maximum period, the maximum timing circuit would have been completed at the expiration of the guaranteed pedestrian clearance interval and would have energized the detector memory relay coil CR2–C.

MAXIMUM TIMING CIRCUIT

It is apparent that the maximum interval timing dial MAX could be set shorter than the sum of the Walk and Guaranteed Clearance intervals as set on dials PW and PCL, FIGURE 2A. Without a special circuit to relieve this condition it is envisioned that the main step switch could advance into its cross street clearing intervals and then into the main street right of way period before pedestrians had adequate time to cross the intersection. The novel maximum timing circuit which includes a pedestrian step switch contact prevents this condition.

While in the past the maximum timing interval had to be set longer than the sum of the walk and guaranteed clearance intervals, this was not always desirable. The duration of the maximum interval was pegged to the sum of the walk and clearance intervals, rather than to traffic moving considerations. With the circuit of the invention the maximum interval may be set as short as desired; during a pedestrian sequence the circuit of the invention prevents the maximum timer from having any effect. The walk and clearance intervals may likewise be set as desired.

The duration of the walk interval depends on the amount of time available for such movement. The clearance interval is normally of sufficient duration to permit a pedestrian stepping off the crosswalk at the last instant of the walk signal to adequately clear the intersection before right of way is taken from the cross street and awarded to the main street.

To prevent the actuated control unit from leaving the cross street right of way period while the pedestrian timer is still timing, the novel circuit is employed to break the maximum timing circuit during the pedestrian walk and guaranteed clearance intervals. The circuit includes pedestrian step switch contacts CR8–3–1 shown in FIGURE 4C. They are located in the plate circuit of the normal timing tube V1 and in cooperation with transfer relay contacts CR10–2 serve to break the normal timing plate circuit during pedestrian step switch positions 2 and 3. Because the maximum timer plate circuit conducts through the normal timing relay coil CR5–C, breaking this plate circuit disables both the normal timer and the maximum timer.

When pedestrian step switch contacts CR8–3–1 close at the expiration of the guaranteed pedestrian clearance interval, they remake the plate circuit for tube V1.

The minimum timer and the density initial timer have time to time out during the pedestrian intervals. As soon as the pedestrian step switch moves to its reset position the main step switch advances through step switch positions 2 and 3 and arrives at position 4, the unit extension interval. To advance from step switch position 2 the normal timing relay coil CR5–C is energized and operates contacts CR5–1, which energizes the step switch operating coil CR7–C. Interrupter contacts CR7–INT–C transfer and break the plate circuit of tube V1. The step switch advances to position 3 at which time off normal contacts CR7–A shown near the bottom of FIGURE 4C close and apply line L1 power from line L42 to the step switch operating coil CR7–C. Upon energization of the step switch, contacts CR7–INT–B open to de-energize the step switch coil and cause the advance of the step switch to position 4.

The step switch thereafter times through the vehicle extension interval in position 4 and thereafter times and advances through intervals 5, 6, and 7 and dwells at position 8.

DETECTOR MEMORY HOLDING CIRCUIT

It will be noted in connection with FIGURES 4A and 4B that the pedestrian memory relay coil CR12–C is provided with a holding circuit which is effective during step switch intervals 1 and 5–11 and ineffective during the cross street green intervals 2, 3, and 4. After a pedestrian actuation, relay coil CR12–C remains energized through contacts CR8–4–1 and CR12–1 until the cross street right of way period. The vehicle memory relay coil CR2–C, FIGURE 4D is also provided with a self holding circuit including line L11 which is effective until the cross street right of way period.

The pedestrian memory relay holding circuit is disabled during the walk interval by the operation of pedestrian step switch contacts CR8–4–1. The pedestrian memory circuit is again enabled to remember the pedestrian actuation during the guaranteed clearance interval. However, the walk interval is not called in again until the following cycle.

A pedestrian recall switch SW2–1 is shown connected between line L1 and the pedestrian memory relay coil CR12–C at the bottom of FIGURE 4B. When the pedestrian recall switch SW2–1 is in the closed position it simulates a pedestrian actuation and causes the controller to operate in a cyclic manner and to display and time a pedestrian cycle during each signal cycle. This is a desirable feature for downtown intersections where cyclic operation can be used to advantage and during which a pedestrian cycle is timed during each and every cross street green period.

PEDESTRIAN STEP SWITCH CONTACT DIAGRAM

The rectangular insert in FIGURE 4B shows the pedestrian step switch contact positions during the various intervals. Interval designations are shown in the top row and circuit designations are shown in the left hand column. Intervals 1, 2, and 3 correspond to the reset, walk, and wait intervals. The diagram shows when the contacts for circuits 1–4 are transferred, the X indicating that the contacts are transferred by being raised by the cam.

Each of the four cams controls a set of transfer contacts –1 and a set of normally open contacts –2. The diagram is easily understood when it is realized that all of the pedestrian step switch contacts in the circuit diagrams are shown in the reset intervals, position 1. Contacts CR–1–1, for example, shown near the center of FIGURE 4B, are illustrated in the transferred position; an X in the chart for circuit 1, interval 1 indicates such transfer.

Contacts CR8–3–1, shown near the upper center of FIGURE 4C are shown in the non-transferred condition. The diagram shows that these contacts will be transferred during the walk interval.

Contacts CR8–4–1 shown near the bottom of FIGURE 4B are in the untransferred position in the reset interval; in the diagram a blank in row 4, column 1 confirms that the contacts of circuit –4 are untransferred in interval 1.

TWO PHASE CONTROLLER

A principle use of the traffic actuable phase unit shown in FIGURE 2A and described herein is a part of a multiphase traffic signal controller. The unit may be employed with one or more identical units as a two or more phase controller as illustrated in FIGURES 2B and 2C. Various forms of terminal facilities provide connections with one, two, or three units. The terminal facilities are represented by the rack R, load relays LR, terminal connections T, and power supplies PS in FIGURES 2A, 2B, and 2C.

At a two street intersection such as is illustrated in FIGURE 1B, two of the units are plugged into the terminal facilities side by side to provide fully actuated control for the two intersecting directions of traffic. Each individual unit also controls a pedestrian movement parallel with the vehicle movement for that phase.

The two street fully actuated intersection shown in FIGURE 2B is provided with vehicle actuable detectors D1–D4 in the phase A movement Phase A and detectors D5–D8 in the phase B movement Phase B. The crosswalks parallel with phase A are provided with push-buttons PB which connect to the controller C through cable PC, and with pedestrian signals PS which receive power from controller C through the walk signal cable WSC.

The crosswalks parallel with the phase B movement Phase B are provided with pushbuttons PB' and pedestrian signals PS'. The former are connected to the controller C through pedestrian cable PC' and the latter through walk signal cable WSC'. The vehicular traffic signals S are connected to the controller C through the signal cable SC. Detectors D1, D2 and D3, D4 are connected to the controller C through detector cables DC1 and DC3, respectively. Likewise, detectors D5, D6 and D7, D8 are connected through cables DC5 and DC6, respectively.

As was pointed out above, an important feature of the invention is its adaptability for use singly to control a two street intersection, or with one or more identical units to control fully actuated multiphase intersections. The circuits within the unit are compatible for varied use. For example, the circuits which permit the control unit to dwell in its green dwell 2 interval, step switch position 8, when used as a semi-actuated controller as explained in detail above, are compatible and usable to advance the unit through such green dwell 2 interval when the unit is used with other units to control fully actuated multiphase intersections.

When used with one or more additional identical units the control unit has the faculty for dwelling in a green dwell condition illuminating right of way signals to its phase movement, or in a red dwell condition illuminating stop signals to its phase. Thus, when two such units are used at a two phase fully actuated intersection as in FIGURE 1B, one unit dwells in a right of way award condition and the other unit dwells in a right of way deny condition.

The majority of the timing circuits within the actuable unit are identical for both major applications of the device: semiactuated and fully actuated. The advance green interval, the minimum and density initial interval, the unit extension interval, the vehicle clearance 1 interval, the special clearance 1 interval, the green 2 interval, the vehicle clearance 2 interval, are identical in both applications. The red dwell 1 interval, the red dwell 2 and overlap control interval, the green dwell 1 interval, and the green dwell 2 and phase select interval are somewhat different.

As the names of the intervals imply, some have more than one purpose or function. For example, the green dwell 2 and phase select interval in a semi-actuated controller is employed as a green dwell position. In this position the control unit dwells with a green signal illuminated to main street traffic. Since there is no other phase unit, the phase select portion of the circuit is ineffective. When the control device is part of a fully actuated controller the interval is used primarily for a phase select function. The unit, after completing the timing of its right of way periods, performs a selecting function which determines which other unit will next obtain right of way. It is necessary that the succeeding phase be selected at this interval so that the unit timing out may time an advance clearance interval for the phase assuming control. Since the unit timing out is the only unit timing at this instant, this unit must assume the timing function for the succeeding unit which is in a dwell condition and not yet timing.

The red dwell 2 and overlap control interval, step switch position 11, is also employed in two manners depending upon how the control unit is used. When used singly, as a semi-actuated control unit, the red dwell interval is of short duration and the overlap control portion of the circuit is ineffective because there is no need for a phase overlap with a two phase controller. When the control unit is employed as part of a multiphase controller the phase overlap control portion of the the circuit is utilized if an overlapping phase is desired. An overlapping phase is one during which the signals for that phase are illuminated during two or more other right of way movements.

It is necessary that the overlap control function be executed by the unit relinquishing control because it is the only unit timing at that instant. The unit assuming control of right of way determines whether the overlapping right of way movement is to be continued during the insuring right of way period or whether it is to be discontinued. If the phase unit assuming control is not part of thte overlapping phase, then the caution signal for the overlapping phase must be timed during the special clearance 2 interval which follows. The subject unit is the unit which will control the timing of the next right of way period and it is the only unit which knows which phase will receive this right of way indication; therefore, it is the unit which both determines whether the caution signal will be illuminated for the phase which does not overlap the instant phase and also determines the duration of such caution interval.

TWO PHASE FULLY ACTUATED CONTROL CIRCUITS

At an intersection of the type shown in FIGURE 1B assume that two actuable phase units are employed with the proper terminal facilities and interconnections to provide a two street fully actuated controller as shown in FIGURE 2B. Assume also that one unit A is dwelling in its green dwell 1 interval with the right of way signals illuminated to phase A traffic and that the second unit B is dwelling in its red dwell 1 interval with its stop signals illuminated to phase B traffic. The pertinent circuits will be as shown in FIGURE 14.

Referring now to FIGURE 14, it can be seen that unit B has received a detector actuation because its memory relay contacts CR2–3 are in the closed position. Unit B is dwelling in step siwtch position 10 as evidenced by the position of stepping arm A8. Unit A is dwelling in step switch position 3 as evidenced by the position of stepping arm A5 and has had its maximum select relay coil CR4–C energized through the circuit shown. The maximum select relay contacts CR4–2 have been transferred to the closed condition shown. The step switch off normal contacts CR7–A are in the closed condition because the step switch is in position 3. The step switch operating coil CR7–C is energized through the circuit shown in the lower portion of the diagram. The above named series of contact closures occurs at the instant the detector memory relay coil CR2–C is energized in unit B. This occurs immediately after an actuation of one of the detectors associated with unit B.

The complete circuit begins near the top of the diagram representing unit B and includes line L1, stepping arm A8, a contact at position 10 of bank 8, a line to unit connector UC1–6, an external jumper between unit connectors UC1–6 and UC1–7, line L48, detector memory relay contacts CR2–3 in the closed condition shown, line L5, unit connector UC2–2, an external jumper to unit connector UC2–3, a line to orientation switch SW1–2, a line to unit connector UC2–2 in unit A, an external jumper to unit connector UC2–3, line L5, stepping arm A5, a contact at position 3 of step switch bank 5, line L35, unit connector UC2–23, an external jumper to unit connector UC2–24, line L36, maximum select relay coil CR4–C, unit connector UC2–7, and line L2. This circuit can also be traced on FIGURES 4A and 4C but is shown in the simplified diagram for ease of location.

Another circuit in unit A consists of line L1, maximum select relay contacts CR4–2 in the energized condition shown, line L42, step switch off-normal contacts CR7–A, step switch interrupter contacts CR7–INT–B, step switch operating coil CR7–C, rectifier DR8, unit connector UC2–8, and line L4.

Therefore, when unit B receives a detector actuation and its detector memory relay contacts CR2–3 are closed they complete the above circuit to energize the maximum select relay in unit A which in turn energizes the step switch in unit A. When the step switch coil is fully energized it operates interrupter contacts CR7–INT–B which in turn de-energize the step switch coil. The operating spring advances the off-normal cam which opens off-normal contacts CR7–A to prevent the circuit from reclosing in all intervals except interval 3.

The step switch operating arms A1–A9 in unit A are also advanced to step switch position 4 which corresponds to the unit extension interval. However, the unit extension interval is not timed because the normal timing capacitor C2 is not recharged during the stepping operation. The normal timing capacitor C2 is normally charged while the step switch operating coil is energized by step switch interrupter contacts CR1–INT–C. It will be recalled that the detector memory relay contacts CR2–1 are transferred during positions 2, 3, and 4 and supply L1 power to the movable contact of interrupter contacts CR7–INT–C shown near the upper portion of FIGURE 4C to recharge capacitor C2 during the time the step switch coil is energized. However, since no actuation has been recorded on unit A the detector memory relay will not be energized and the recharging path will not be provided. The unit extension interval is thus substantially eliminated. This prevents unnecessary delay on the phase having no traffic after an actaution has occurred on a phase having traffic.

Unit A continues to time the clearing intervals for phase A and arrives at its green dwell 2 and phase select interval, step switch position 8. The circuits employed during this interval are shown in a simplified diagram, FIGURE 15.

PHASE SELECTION

The circuits employed during the phase select interval are shown in FIGURE 15. Unit A has advanced to its green dwell 2 and phase select interval, step switch position 8. Unit B is still dwelling in its red dwell 1 interval, step switch position 10. The phase calling means in the form of vehicle detector memory relay coil CR2–C in unit B remains energized and phase change over means in the form of contacts CR2–4 remain transferred in their phase change over condition indicating that the detector actuation is still unanswered.

The normal timing circuit in unit A times the green dwell 2 interval whose duration is determined by the potential divider circuit consisting of resistors R44 and R45. These resistors provide a very short interval, nominally one-half second in duration. At the expiration of the interval, tube V1 conducts and energizes phase selection means in the form of relay coil CR5–C.

When the normal timing relay coil CR5–C is energized it closes contacts CR5–1 and CR5–2, FIGURE 15. Closure of contacts CR5–1 completes a circuit to the step switch operating coil CR7–C in unit A. Closure of contacts CR5–2 completes the L1 circuit to the step switch operating coil CR7–C in actuated unit B.

The former circuit includes in unit A, line L1, normal timing relay contacts CR5–1 when closed, step switch operating coil CR7–C, rectifier DR8, and line L4. The latter circuit includes in unit A, line L1, stepping arm A8, a contact at position 8 of bank 8, line L38, normal timing relay contacts CR5—2 when closed, and unit connector UC2–4. A jumper connects unit connector UC2–4 with unit connector UC2–16 in unit B. In unit B the circuit includes a line from unit connector UC2–16 to the detector memory relay contacts CR2–4, line L24, a contact at position 10 of bank 4, stepping arm A4, line L34, step switch operating coil CR7–C, rectifier DR8, and line L4.

The circuits described immediately above permit unit A to energize the step switches in both unit A and unit B at the same time. Both circuits are de-energized simultaneously by the action of interrupter contacts CR7–INT–C, FIGURE AC, which open the plate circuit and de-energize relay coil CR5–C. Contacts CR5–1 and CR5–2 open simultaneously and permit the units to advance to positions 9 and 11, respectively. In position 9, unit A times the vehicle clearance 2 and overlap amber interval. In position 11, unit B controls the overlap signal sequence.

It is apparent that with a two phase controller there is no opportunity for using an overlapping phase signal sequence. However, the units are compatible and usable for multi-phase operation and therefore are provided with means to control and time signal sequences which overlap two other phase movements.

PHASE OVERLAP CONTROL

Referring to FIGURE 16, circuits are shown in the rectangle representing unit B which are used to control the overlap amber select relay and the overlap green control. Inasmuch as this is a two phase intersection, the overlap control is not used. However, the control units are compatible for use within multiphase intersections and circuits are provided for overlap control where desired.

Unit A is shown timing the vehicle clearance 2 and overlap amber interval, step switch position 9. The vehicle clearance 2 interval is used to display an amber signal after the delayed green or the Green 2 right of way period which may, for example, be employed at a wide intersection. It is apparent that the Green 1 signal will be extinguished prior to the time the Green 2 signal is extinguished. The green 1 signal may be placed at the near edge of a wide intersection and the Green 2 signal may be placed near the median or in the center of a divided thoroughfare to permit clearing movement during the latter portion of the green interval. When unit A completes timing the vehicle clearance 2 interval and its normal timing relay coil CR5–C is energized and contacts CR5–1 and CR5–3 are closed.

Closure of contacts CR5–1 completes an L1 circuit to the step switch operating coil CR7–C in unit A. Closure of contacts CR5–3 completes an L1 circuit to the step switch operating coil in Unit B. The latter circuit starts near the top of the rectangle representing unit B and includes line L1 at unit connector UC1–7, now closed detector relay contacts CR2–3, and a line to unit connector UC2–2. Unit connectors UC2–2 and UC2–3 are jumpered. Another jumper connects unit connector UC2–3 in unit B to unit connector UC2–2 in unit A. A jumper connects unit connectors UC2–2 and UC2–3. In unit A the circuit includes unit connector UC2–3, line L5, stepping arm A5, a contact at position 9 of bank 5, line L95, normal timing relay contacts CR5–3, and a line to unit connector UC2–13. Unit connectors UC2–13 are jumpered together on all units.

In unit B the circuit includes unit connector UC2–13, line L14, a contact at position 11 of bank 4, stepping arm A4, line L34, step switch operating coil CR7–C, rectifier DR8, and line L4.

Another circuit in unit A includes L1, normal timing relay contacts CR5–1, step switch operating coil CR7–C, rectifier DR8, and line L4. When the normal timing relay coil CR5–C is energized in unit A at the termination of the vehicle clearance 2 interval, contacts CR5–1 and CR5–3 are closed. The former energize the step switch operating coil in unit A and the latter energize the step switch operating coil in unit B through the circuit elements enumerated above.

Interrupter contacts CR7–INT–C on the step switch in unit A, FIGURE 4C, interrupt the normal timing plate circuit and de-energize relay coil CR5–C and cause contacts CR5–1 and CR5–3 to open, thereby de-energizing the step switches in both units simultaneously. The step switch in unit A is advanced to position 10, its red dwell 1 position, where it remains until an actuation occurs on phase A. The step switch in unit B is advanced to step switch position 1, special clearance 2 interval, where it assumes complete control and times an advance green interval, and then a minimum and density initial interval, and then advances to its green dwell 1 interval, step switch position 3, where it remains until an actuation occurs on the other phase.

It is apparent that the circuits within units A and B are identical and therefore when an actuation occurs on phase A the sequence will be the same as occurred after an actuation on phase B as described above.

THREE PHASE CONTROLLER

Another important use of the vehicle and pedestrian actuable unit of the invention is for the control of a multiphase intersection as exemplified by the three phase intersection of FIGURE 1C. Three of the control units of the invention may be grouped together in a rack R as shown in FIGURE 2C and connected together and to terminal facilities T, load relays LR, and power supply PS to control all of the vehicle and pedestrian signals at the intersection.

One configuration of a three street fully actuated intersection is illustrated in FIGURE 1C; the three conflicting phase movements Phase A, Phase B, and Phase C are provided with detectors D1, D2 and D3, D4, and D5, D6, respectively. The three groups of detectors are connected to controller C through detector cables DC1, DC3, and DC5, respectively. Vehicular traffic control signals S are connected to controller C through signal cable SC.

Each of the streets is provided with pedestrian crosswalks, pushbuttons, and pedestrian signals. Pushbuttons PB and pedestrian signals PS are associated with the phase A movement which is predominantly a left turning movement and permit pedestrians to cross the phase B street; pushbuttons PB″ and signals PS″ are associated with the phase B left turning movement and permit pedestrians to cross the phase C street; pushbuttons PB′ and signals PS′ are associated with the phase C left turning movement and permit pedestrians to cross the phase A street. It is apparent that the right turning movement on each respective phase will be withheld while the conflicting pedestrian movement is timed.

Pushbuttons PB and pedestrian signals PS are connected to controller C through cables PC and WSC, respectively. Likewise, Pushbuttons PB′ and signals PS′, and pushbuttons PB″ and signals PS″ are connected to controller C through cables PC′ and WSC′, and PC″ and WSC″, respectively.

The control unit illustrated in FIGURE 2C may be connected to dwell with the unit which was last actuated displaying its right of way signal and the other units displaying their stop signals. The unit actuated last will dwell in its green dwell interval, step switch position 3, and each of the remaining units will dwell in their red dwell 1 interval, step switch position 10.

A common calling circuit is used to indicate that a detector actuation has occurred on one of the phases not having right of way. Such a calling circuit is shown in FIGURE 17. A study of the circuit diagram reveals that unit B is dwelling in step switch position 3 and that units A and C are each dwelling in step switch position 10. Thus, the phase B movement has right of way and the other movements are denied right of way.

The phase calling means in the form of detector memory relay contacts CR2–3 in unit A, FIGURE 17, are shown in the energized condition indicating that a vehicle or pedestrian actuation has occurred on phase A. While unit A is in step switch position 10 it applies L1 power to unit connectors UC2–2 and UC2–3 which are connected to identical terminals in all other units. Switch SW1–2 is provided in the interconnecting circuit to stall the controller in phase A when it is first connected or reconnected.

As soon as detector relay contact CR2–3 close and apply L1 power to the calling circuit the phase actuating means in the form of maximum select relay coil CR4–C is energized in unit B. Contacts CR4–2 close and apply L1 power through off-normal contacts CR7–A to the cycle actuating means in the form of step switch operating coil CR7–C. Application of L1 power to unit connectors US2–2 and UC2–3 in unit C has no effect. Note also that closure of detector memory relay contacts CR2–3 in unit C would also have energized the phase actuating means, i.e., the maximum select relay coil CR4–C, in unit B.

When contacts CR4–2 in unit B close they energize the cycle actuating means, i.e., the step switch operating coil CR7–C. The circuit includes line L1, maximum select relay contacts CR4–2 in the closed position shown, line L42, step switch off-normal contacts CR7–A, step switch interrupter contacts CR7–INT–B, step switch operating coil CR7–C, rectifier DR8, unit connector UC2–8 and line L4.

The calling circuit noted above includes in unit A, line L1, stepping arm A8 of the cycle allocating means, a contact at position 10 of step switch bank 8, a line to unit connector UC1–6, an external jumper to unit connector UC1–7, line L48, now closed detector memory relay contacts CR2–3, line L5, unit connector UC2–2, a jumper to unit connector UC2–3, an interconnection to switch SW1–2, an interconnection to unit connector UC2–3 in unit B, line L5, stepping arm A5, a contact at position 3 of bank 5, a line to unit connector UC2–23, a jumper to unit connector UC2–24, line 36, maximum select relay coil CR4–C, unit connector UC2–7, and line L2.

When the cycle actuating means, i.e., the step switch operating coil CR7–C is energized it operates its interrupter contacts CR7–INT–B which open and de-energize the coil. The operating spring thereupon actuates the cycle allocating means, i.e., it advances the stepping arms to position 4 and opens the off-normal contacts CR7–A. This circuit is thus disabled until the step switch again reaches position 3. In position 4 the step switch does not time the usual unit extension interval because the normal timing capacitor C2, FIGURE 4C, is not recharged because the phase B detector circuits have not been actuated.

Unit B advances rapidly through interval 4 and subsequently times the vehicle clearance 1 interval, the specific clearance 1 interval, the green 2 interval, and advances to the green dwell and phase select interval, step switch position 8. The unit is shown in this position in FIGURE 18.

PHASE SELECTING CIRCUIT

The phase selecting circuit is illustrated in FIGURE 18. Unit B has advanced to its phase select interval, step which position 8 and units A and C remain in position 10. Unit A remains traffic actuated; its phase change over means is in its phase change over condition, i.e. its detector memory relay contacts CR2–4 remain in the energized condition shown. Unit C has not been traffic actuated as evidenced by the fact that its phase change over means is in its normal condition, i.e., its detector memory relay contacts CR2–4 are in the de-energized position.

In step switch position 8, the phase select circuit is completed. It originates in the actuated unit, unit B, and connects through the next unit, unit C, and to any subsequent units, and then connects to unit A. The complete circuit includes in unit B, line L1, stepping arm A8, a contact at position 8 of bank 8, normal timing relay contacts CR5–2 when closed, and unit connector UC2–4. In rack R a jumper connects unit connector UC2–4 to unit connector UC2–16 in unit C. In unit C the circuit includes a line to detector memory relay contacts CR2–4, and a line to unit connector UC2–5. A jumper bridges unit connectors UC2–5 and UC2–4.

In rack R a jumper bridges unit connector UC2–4 in unit C to unit connector UC2–16 in unit A. In unit A the circuit includes a line to detector memory relay contacts CR2–4 shown in the energized condition, line L24, a contact at position 10 of bank 4, stepping arm A4, line L34, step switch operating coil CR7–C, rectifier DR8, and line L4 of unit connector UC2–8.

Another circuit in unit B includes line L1, phase advance means having a normal condition and a phase advance condition and taking the form of relay contacts CR5–1, step switch operating coil CR7–C, rectifier DR8, and line L4 at unit connector UC2–8. When the normal timing circuit completes timing the very short phase select interval, contacts CR5–1 and CR5–2 close and energize the step switch coils in units B and A, respectively. Interrupter contacts CR7–INT–B associated with the step switch in unit B interrupt the normal timing plate circuit and de-energize the normal timing relay, which opens contacts CR5–1 and CR5–2, de-energizing the step switch coils in both units simultaneously. The operating springs associated with both step switches advance the stepping arms in units A and B simultaneously. Unit B advances to step switch position 9 where it times the vehicle clearance 2 interval. The step switch in unit A moves to position 11, its red dwell 2 and overlap control interval. It is apparent that the step switch operating coil CR7–C in unit C is not energized.

The circuit cannot backfeed into unit A or C through unit connectors UC2–4 because the normal timing relay contacts CR5–2 in both units are open.

An important feature of the above phase select circuit is that the unit which has not been traffic actuated is omitted entirely from the sequence. Prior controllers stepped rapidly through the undesired sequence and required to relay to open the right of way signal circuits and to hold the stop signal energized during the skipping sequence. The prior art method wasted time and caused needless wear and tear on the device.

PHASE OVERLAP CONTROL

After the simultaneous advancement of the step switches in units A and B to intervals 11 and 9, respectively, the circuits are as shown in FIGURE 19. Unit B times its vehicle clearance 2 interval in position 9; unit A is in its overlap control interval and through contacts at banks 2 and 3 controls the overlap amber signal. Unit C remains in its red dwell 1 interval step switch position 10.

As was stated previously, an overlapping phase is one which is permitted while two or more other phases are permitted. An $A+B$ overlap phase receives right of way while either phase A or phase B receives right of way. Overlap phase $B+C$ times while phase B or phase C times.

The phase not included in the overlapping phase is connected to control the amber signal for such overlapping phase, and the unit relinquishing right of way is connected to time such amber signal.

Assuming that a $B+C$ overlapping phase is employed at an intersection controlled by units A, B, and C of FIGURE 19, unit A will control the traffic signals for the overlapping phase and either unit B or unit C will time the overlapping amber signal.

While unit A dwells in position 10, L4 power will be applied to unit connector UC2–21 to energize an overlapping green signal relay. After unit A has been traffic actuated and thereafter has been advanced to step switch position 11, L4 power will also be applied to unit connector UC1–14 to energize an overlapping amber signal relay. The latter relay switches signal power from the overlapping green signal to the overlapping amber signal. The duration of the amber clearance interval is timed by the unit relinquishing control, in this case unit B.

At the expiration of the vehicle clearance 2 interval, the normal timing relay coil CR5–C, FIGURE 4C, is energized in unit B and contacts CR5–1 and CR5–3 are closed. The former energize the step switch operating coil CR7–C in unit B and the latter energize coil CR7–C in unit A. Power cannot reach coil CR7–C in unit C because the step switch in that unit is still in position 10.

The former circuit includes in unit B, line L1, normal timing contacts CR5–1, step switch operating coil CR7–C, rectifier DR8, ad line L2 at unit connector UC2–8.

The latter circuits includes in unit A, line L1 at unit connector UC1–7, line L48, now closed detector relay contacts CR2–3, and line L5 to unit connector UC2–2. An external jumper connects unit connectors UC2–2 and UC2–3. An external jumper connects unit connector UC2–3 in unit A through switch SW1–2 to unit connector UC2–2 in unit B. Another jumper bridges unit connectors UC2–2 and UC2–3. In unit B the circuit includes line L5, stepping arm A5, a contact at position 9 of bank 5, line L95, normal timing relay contacts CR5–3 when closed, and a line to unit connector UC2–13.

Unit connectors UC2–13 in all units are interconnected. In unit A the circuit includes unit connector UC2–13, line L14, a contact at position 11 of bank 4, stepping arm A4, line L34, step switch operating coil CR7–C, rectifier DR8, and line L4 at unit connector UC2–8.

At the expiration of the vehicle clearance 2 interval, the step switch in unit B is advanced to its red dwell 1 interval, step switch position 10, and unit A is advanced to its special clearance 2 interval, step switch position 1. Unit B dwells in position 10 until after it is again traffic actuated, unit A times its intervals 1, 2, 3 and dwells in its green dwell interval, step switch position 3.

The circuits within each of the three units are identical and a similar sequence will occur after an actuation on phase B or phase C.

An actuation on a phase not having right of way energizes the maximum timer in the unit having right of way. Each unit, upon gaining right of way, times the advance green interval, then the density initial interval proportional to the number of actuations occurring during the time right of way was denied this phase. The minimum interval times concurrently with the density interval. At the expiration of both intervals the unit times one unit extension interval in step switch position 3 and then dwells in that position until an actuation occurs on another phase.

As soon as an actuation is registered on another phase it energizes the maximum select relay in the first unit and advances its step switch to position 4. If an actuation should occur at this instant on the first phase it would cause the vehicle detector relay to recharge the normal timing capacitor and initiate the timing of another unit extension interval. Continued detector actuations on the first phase would hold the right of way on that phase until the maximum interval expired. At its expiration the unit is advanced to interval 5 where it times the vehicle clearance interval; thereafter, it times the other clearance intervals and in position 9 advances the called unit to position 11, and then in position 10 advances the called unit to position 1. In position 1 the called unit assumes complete control.

SUMMARY OF PEDESTRIAN CYCLE

The pedestrian step switch normally resides in its reset interval. When one of the pedestrian pushbuttons is depressed it completes a circuit which energizes pedestrian signal developing means taking the form of detector relay coil CR12–C for representing that pedestrian traffic intends movement parallel to the associated vehicle calling phase. Contacts CR12–2 close and partially complete a circuit to the step switch coil CR8–C. The circuit is not completed until the main step switch arrives at its position 1, at which time L1 power is applied to the pedestrian step switch coil CR8–C. The step switch advances to its walk interval but the walk signal is not illuminated and the walk timer is not started until the main step switch moves into interval 2.

At the beginning of the cross street green period transfer relay coil CR10–C is energized through contacts CR8-2-2. Contacts CR10-1 transfer and since contacts CR8-1-1 have already been transferred, they complete the plate circuit to tube V3. At the same time, contacts CR10-1 also apply L1 power to the walk potentiometer R32. Potential from the tap of potentiometer R32 is applied through contacts CR8-2-1 and coupling resistor R35 to the right hand side of capacitor C1. This alternating potential reduces the potential appearing at the grid of tube V3. At the expiration of the walk interval tube V3 conducts and energizes its plate circuit relay which in turn energizes the step switch into the wait interval. During the transfer, contacts CR8–INT–C complete the recharging path to capacitor C1 and permit it to recharge completely. During the guaranteed pedestrian clearance interval the AC voltage from potentiometer R31 is applied to the right hand side of capacitor C1. At the expiration of the clearance interval tube V3 conducts and energizes its plate circuit relay which in turn energizes the step switch into the reset interval. Reclosing of contacts CR8-3-1 re-establishes the normal and maximum timing plate circuit and the main step switch assumes control. The cycle is complete.

IMPROVED DETECTOR RELAY CIRCUIT

An improved circuit is applied to vehicle detector relay coil CR1–C shown near the bottom of FIGURE 4D. The circuit includes a full wave rectifier bridge connected between the 12 volt source available at unit connector UC2–1 and the detectors D1, D2 and line L1. The lighter and smaller foreign and domestic vehicles and the higher speeds permitted today cause detector actuations of very short duration. This has resulted in loss of calls in prior art controllers; this difficulty is remedied with the present circuit.

In effect, a pulsating direct current is allowed to flow through the vehicle detector relay coil CR1–C whenever either detector D1 or D2 is actuated. During the half cycles of alternating line potential when line L1 is positive with respect to line L4 and the 12 volt supply, and when a detector is actuated, power flows from the 12 volt source and unit connector UC2–1, through rectifier DR13, through vehicle detector relay coil CR1–C, rectifier DR12, unit connector UC1–17, detector D1 or D2, and line L1. When line L4 and the 12 volt supply are positive with respect to line L1, current flows from line L1, through the detector, through unit connector UC1–17, rectifier DR11, vehicle detector relay coil CR1–C, and rectifier DR10 to unit connector UC2–1. Thus, while the detector or detectors are actuated a pulsating direct current flows through the detector relay coil. This permits smoother operation and is superior to alternating current operation. It is equivalent to direct current operation.

STOP TIMING

A stop timing circuit is provided in the unit to permit external control of the timing intervals. Power is normally applied to line L2 and stop timing relay coil CR6–C during normal operation. Contacts CR6–1 and CR6–2 are shown in FIGURE 4C in the energized condition.

When it is desired to stop the timing of the unit power is removed from line L2 and coil CR6–C is de-energized. Contacts CR6–1 transfer and contacts CR6–2 close and together complete the recharging circuit for normal timing capacitor C2.

It is apparent the stop timing circuit is effective only while the normal timing capacitor is timing the interval. Thus, the walk, guaranteed clarance, density initial, and maximum intervals are not affected.

The stop timing circuit may be utilized whenever it is desired to stop the timing of the unit in an appropriate interval. Such use includes use with railroad preemptors, fire lane preemptors, emergency equipment, or other devices.

FAILSAFE OPERATION

It will be apparent that an undesirable condition could develop if power should fail momentarily or for a time after a unit has been traffic actuated and caused the unit having right of way to time its clearance intervals and advance to its dwell condition without advancing the actuated unit to its right of way awarding position. The control units would all dwell in a red condition if the detector memory relay in the actuated unit lost its holding circuit through a power interruption. A failsafe circuit is provided to prevent this all red condition.

The phase select interval, step switch position 8, serves to stall or dwell the unit which is relinquishing control in its final green interval, if the memory relay in the actuated unit becomes de-energized. This permits the unit which is timing out to retain right of way and after an actuation on another phase to award right of way to the actuated phase after timing the clearance interval to the phase losing right of way.

OVERLAP FEATURE

Following the phase select interval the overlap control function is performed. In position 9 the unit losing control times the clearance interval for the non-overlapping phase as determined by the unit gaining control. The unit demanding control is the only unit which knows what phase will next receive right of way. If the next phase is not part of the overlapping sequence, its caution signal must be energized and timed concurrently with the caution signal with the main phase losing right of way. Thus, the unit gaining control determines which overlap phase caution signal is timed, and the unit losing control times such caution signal.

An actuated phase may retain right of way indefinitely as long as there is no traffic on the other phases. As soon as an actuation occurs on another phase the maximum timer is started in the unit having right of way. When a gap in traffic permits the extension timer to time out, the unit relinquishes control to the actuated unit. The new unit times a density initial interval determined by the number of vehicles demanding right of way.

The right of way period for each traffic phase thus varies with traffic volume on that phase from a minimum period to a maximum period. A minimum period follows a single vehicle detector actuation. The period is lengthened by additional actuations up to a maximum period established by the maximum timer.

The invention is capable of timing eleven vehicle intervals and two pedestrian intervals. When employed as part of a fully actuated controller, the large number of intervals permits at least three types of right of way periods: a normal green period, an advance green interval, and a delayed green period. When employed as a semi-actuated device it may time two types of right of way periods to each traffic phase: an advance green interval and a normal green period. The unit can therefore time nonstandard sequences and can control different number of phases. The controller also provides signal sequences supplied previously by advance green times, pedestrian interval times, and minor movement controllers. The controller may be used to replace two phase semi-actuated, two phase fully actuated, three phase semi-actuated, three phase fully actuated, pedestrian timers, minor movement and parent controllers, and master coordinated two and three phase controllers, both pretimed and semi-actuated.

The pedestrian feature of the invention makes possible the inclusion of walk and guaranteed clearance intervals within the normal sequence. A separate circuit including a three position step switch and two adjustable R-C circuits times the intervals. The pedestrian sequence is included only upon demand. The sequence occurs within the right of way period for the vehicle movement parallel with the pedestrian crosswalk. The pedestrian timing circuit reduces the number of interconnections normally required to a parallel phase vehicle timing unit and makes it unnecessary to supply a separate timing unit.

A controller embodying the invention may consist of a housing having a rack into which one or more of the units may be inserted. The rack and each of the control units are provided with connectors which permit the units to be connected into the terminal facilities which include AC and DC power supplies, interconnections between the standard units, and connections with load relays which control the intersection traffic signals.

With the proper type of terminal facilities of plug-in units may be used in any of the following manners:

(1) Individually, as a two phase semi-actuated vehicle and pedestrain controller.

(2) With another identical unit as a two phase fully actuated controller.

(3) With two other identical units as a three phase fully actuated controller.

(4) With a coordinating unit and a non-traffic actuable timing unit as a two phase semi-actuated controller coordinated with a master controller.

(5) With another identical unit and a coordinating unit and a non-actuable timing unit as a three phase semi-actuated master coordinated controller.

(6) With one or more identical units as a special movement controller.

Two important features of the control unit are its ability to be employed individually or in combination with one or more identical units to control a wide variety of fully traffic actuated intersections, and its ability to be used with a compatible coordinating and timing unit to control a variety of semi-actuated intersections under the supervision of a master controller.

Other features of the unit result from the inclusion of unit selector and unit transfer circuits which permit the unit having control to select and transfer control to a unit demanding control. The one unit has complete control and the other units dwell in a dormant condition.

Another feature is the unit's ability to time and control a wide variety of signal sequences. It is capable of timing a large number of intervals, some concurrently and some consecutively. The intervals may be utilized in different manners and with various combinations of load relays to obtain a wide variety of signal sequences.

I claim:

1. In a traffic control system for controlling the operation of traffic signal means displaying traffic signals including at least one go signal to at least three traffic phases, and wherein each said phase is a traffic actuatable phase having traffic detection means associated therewith for detecting traffic in said phase; the improvement for directly transferring control of a go signal display allocated to one of said phases to an actuated one of said phases, wherein said system includes for each one of said phases:

means for cyclically allocating said traffic signal displays including at least one go signal display to said associated phase;

calling means controlled by said associated detector means for completing a calling circuit representative that said associated phase is traffic actuated;

phase change over means having a normal first condition and a second phase change over condition, said phase change over means controlled by said associated detector means so as to be in its second condition when said associated phase is traffic actuated;

phase selection switching means controlled by any one of said calling means associated with said other phases, for providing a phase selection signal, when any one of said other phases is traffic actuated; and, separate actuating means for each said associated cyclical allocating means, said separate actuating means controlled by its said associated phase change over means and any one of said phase selection signals arising from one of said other phases for actuating said associated cyclical allocating means to initiate allocation of a said go signal display when said associated phase change over means is in its second condition and in response to a said phase selection signal, whereby allocation of a go signal display is directly transferred from one of said phases to a said actuated phase.

2. In a traffic control system for controlling the operation of traffic signal means displaying traffic signals including at least one go signal to at least three traffic phases, and wherein at least two of said phases are traffic actuatable phases having traffic detection means associated therewith for detecting traffic in said actuatable phases; the improvement for directly transferring control of a go signal display allocated to one of said phases to an actuated one of said phases, wherein said system includes:

means associated with each said phase for cyclically allocating said traffic signal displays including at least one go signal display to said associated phase;

calling means associated with each actuatable phase and controlled by said associated detector means for completing a calling circuit representative that said associated phase is traffic actuated;

phase change over means associated with each actuatable phase and having a normal first condition and a second phase change over condition, said phase change over means controlled by said associated detector means so as to be in its second condition when said associated phase is traffic actuated;

phase selection switching means controlled by any one of said calling means associated with any one of said actuatable phases for providing a phase selection signal, when any one of said actuatable phases is traffic actuated; and, separate actuating means associated with each phase for actuating its said associated cyclical allocating means, said separate actuating means controlled by its said associated phase change over means and a said phase selection signal for actuating its said associated cyclical allocating means to initiate allocation of a go signal display to said associated phase when said associated phase change over means is in its second condition and in response to a said phase selection signal, whereby allocation of a go signal display is directly transferred from one of said phases to a said actuated phase.

3. In a traffic control system as set forth in claim 1, wherein each said calling circuit completed by an associated said calling means has an output circuit for carrying a calling signal, said output circuits being connected together in common for carrying a calling signal for initiating actuation of said phase selection switching means.

4. In a traffic control system as set forth in claim 1, wherein said phase selection switching means has associated therewith phase selection circuit means, said phase selection circuit means having:
   an input circuit and an output circuit for carrying a said phase selection signal;
   said phase selection switching means being interposed between said input and output circuits;
   said input circuit adapted to be coupled to a source of energy; and,
   said phase selection switching means controlled by any one of said phase calling means to complete a circuit between said source and said output circuit, whereby a said phase selection signal is carried by said output circuit.

5. In a traffic control system as set forth in claim 4, wherein each said phase is a traffic actuatable phase and said output circuit of said phase selection circuit means is coupled to each of said separate actuating means through the phase change over means associated with each said separate actuating means in a predetermined order, whereby the first of said phase change over means in said predetermined order that is in its second condition passes a said phase selection signal from said output circuit to its associated separate actuating means to initiate allocation of a go signal display to that associated phase.

6. In a traffic control system as set forth in claim 4, wherein said system includes a said phase selection circuit means associated with each phase and wherein said separate actuating means for each phase is coupled to and controlled by its said associated said phase selection circuit means for actuating its said associated cyclical allocating means to terminate allocation of a said go signal display to said associated phase.

7. In a traffic control system as set forth in claim 2, wherein each said go signal display includes a go dwell interval followed by a phase selection interval and that one of said phases is normally allocated a go dwell interval while said other phases are each allocated a stop display, and wherein said system further includes:
   second switching means associated with each said phase, each said second switching means being controlled by any one of said calling means for completing an energizing circuit for its associated separate actuating means, whereby said associated cyclical allocating means is actuated to allocate a said phase selection interval go signal display to its associated phase.

8. A traffic phase control unit adapted for use in a traffic control system employing at least three said units for controlling the operation of traffic signal means displaying traffic signals including at least one go signal to at least three phases, and wherein at least two of said phases are traffic actuatable phases having traffic detection means associated therewith for detecting traffic in said phases; said unit comprising:
   means for cyclically allocating said traffic signal displays including at least one go signal display to said associated phase;
   calling means controlled by an associated detector means for completing a calling circuit representative that said associated phase is traffic actuated;
   phase change over means having a normal first condition and a second phase change over condition, said phase change over means controlled by said associated detector means so as to be in its second condition when said associated phase is traffic actuated;
   phase selection circuit means having an input circuit and an output circuit, switching means interposed between said input circuit and said output circuit, said input circuit adapted to be coupled to a source of energy, and said switching means adapted to be controlled by a said calling means in any one of said like units to complete a circuit between said source and said output circuit, whereby a phase selection signal is carried by said output circuit; and,
   actuating means for said associated cyclical allocating means and coupled to said associated phase change over means and adapted to be coupled to a said phase selection output circuit of one of said like units and controlled by said phase change over means and any one of said phase selection signals arising from one of said like units for actuating said associated cyclical allocating means to initiate allocation of a go signal display to said associated phase when said associated phase change over means is in its second condition and in response to a said phase selection signal, whereby allocation of a said go signal display is directly transferred from one of said phases to a said actuated phase.

9. In a traffic control system for controlling the operation of traffic signal means displaying traffic signals including at least one go signal to at least three traffic phases, and wherein at least two of said phases are traffic actuatable phases having traffic detection means associated therewith for detecting traffic in said actuatable phases; the improvement for directly transferring control of a go signal display allocated to one of said phases to an actuated one of said phases, wherein the system comprises:
   separate actuatable means for each phase for sequentially allocating a plurality of traffic signal displays including at least one go signal display to said phase;
   calling means for each actuatable phase and controlled by said associated detector means for completing a calling circuit representative that said associated phase is traffic actuated;
   phase change over means for each actuatable phase and having a normal first condition and a second phase change over condition, said phase change over means controlled by said associated detector means so as to be in its second condition when said associated phase is traffic actuated;
   phase selection circuit means controlled by any one of said calling means associated with any one of said actuatable phases for providing a phase selection signal, when any one of said actuatable phases is traffic actuated; and,
   each said separate actuatable means being coupled to its associated said phase change over means and to said phase selection circuit means in such a manner to be actuated by a said phase selection signal only when its said associated phase change over means is in its second condition so as to initiate allocation of a said go signal display to said associated phase, whereby allocation of a said go signal display is directly transferred from one of said phases to an actuated one of said phases.

10. In a traffic control system as set forth in claim 9, wherein each said calling circuit completed by an associated said calling means has an output circuit for carrying a calling signal, said output circuits being connected together in common for carrying a calling signal for initiating actuation of said phase selection circuit means.

11. In a traffic control system as set forth in claim 9, wherein said phase selection circuit means includes:
- an input circuit and an output circuit for carrying a said phase selection signal;
- switching means for coupling said input circuit to said output circuit;
- said input circuit adapted to be connected to a source of voltage potential; and,
- said switching means being controlled by any one of said phase calling means to complete a circuit between said input and output circuits, whereby a said phase selection signal is carried by said output circuit.

12. In a traffic control system as set forth in claim 10, wherein said output circuit of said phase selection circuit means is coupled to each of said separate actuatable means through the phase change over means associated with each said separate actuatable means in a predetermined order, whereby the first of said phase change over means in said predetermined order that is in its second condition passes a said phase selection signal from said output circuit to its associated separate actuatable means to initiate allocation of a go signal display to that associated phase.

No references cited.

THOMAS B. HABECKER, Primary Examiner

U.S. Cl. X.R.

315—232, 239; 317—142; 340—309.1